TIMER TM

CONTROL PANEL CP

Nov. 8, 1966
E. LEONARD ETAL  3,284,774
INFORMATION TRANSFER SYSTEM
Filed March 19, 1962
29 Sheets-Sheet 10
FIG. 10
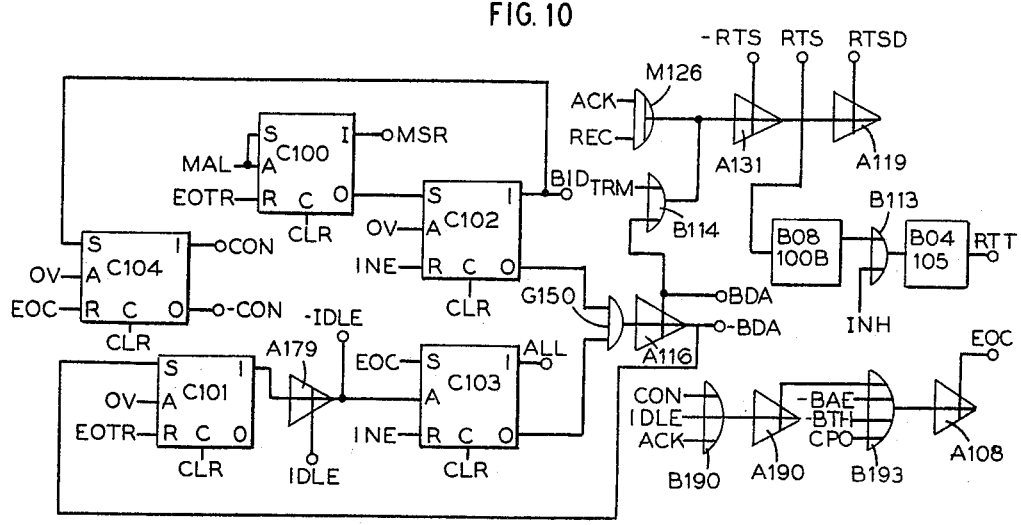
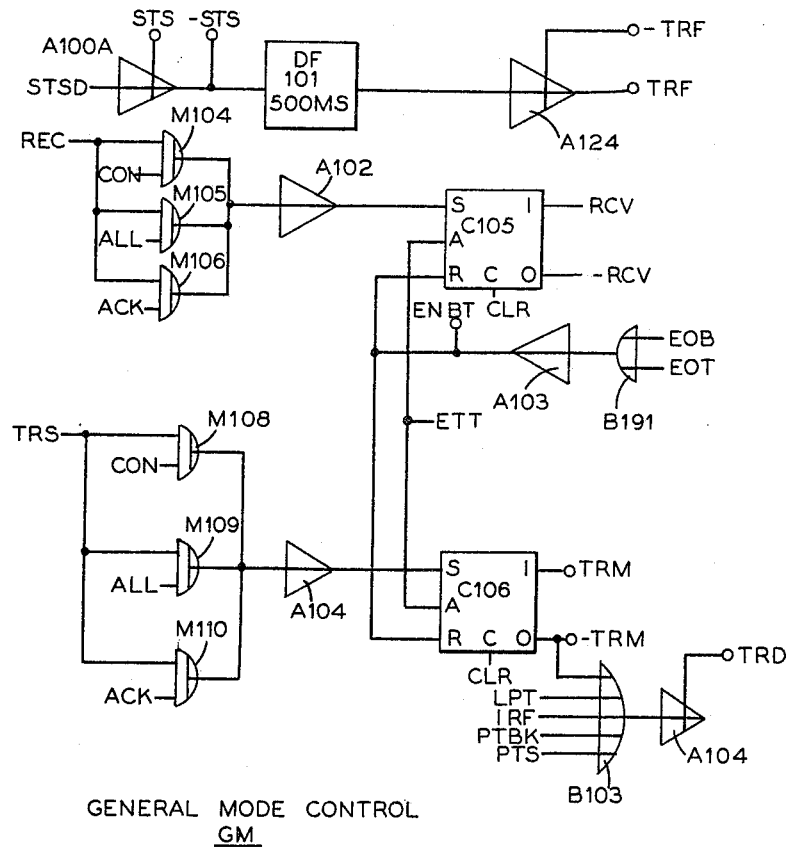
GENERAL MODE CONTROL
GM Nov. 8, 1966  E. LEONARD ETAL  3,284,774
INFORMATION TRANSFER SYSTEM
Filed March 19, 1962  29 Sheets-Sheet 12

FIG. 12  B BUFFER BB

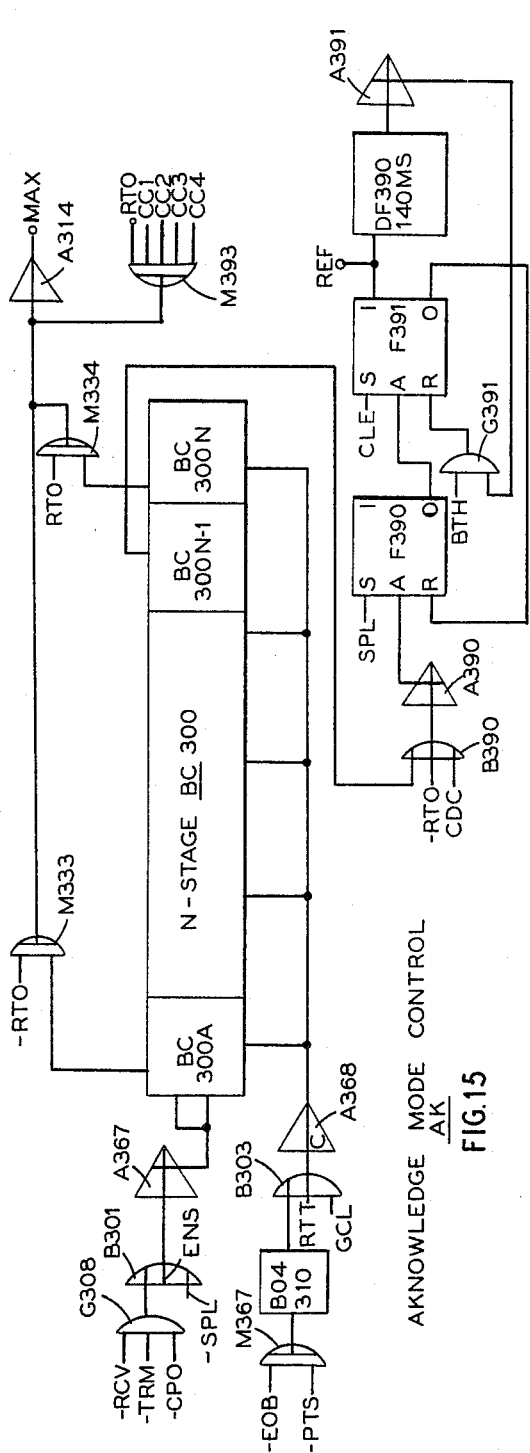
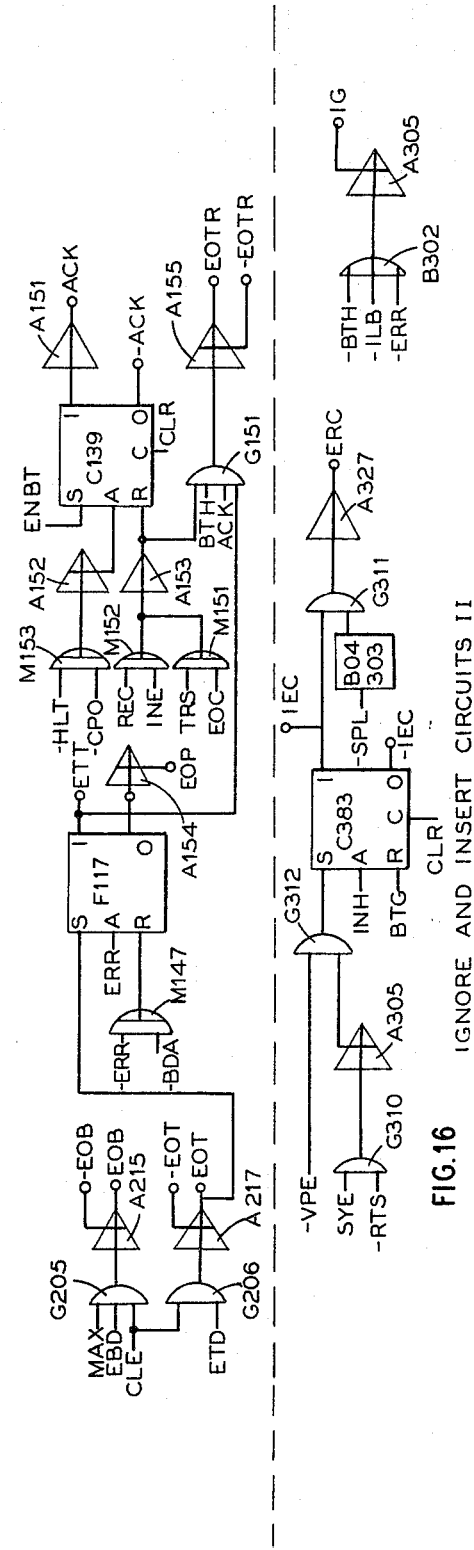
Nov. 8, 1966  E. LEONARD ETAL  3,284,774
INFORMATION TRANSFER SYSTEM
Filed March 19, 1962  29 Sheets-Sheet 14
FIG.15 AKNOWLEDGE MODE CONTROL AK
FIG.16 IGNORE AND INSERT CIRCUITS II

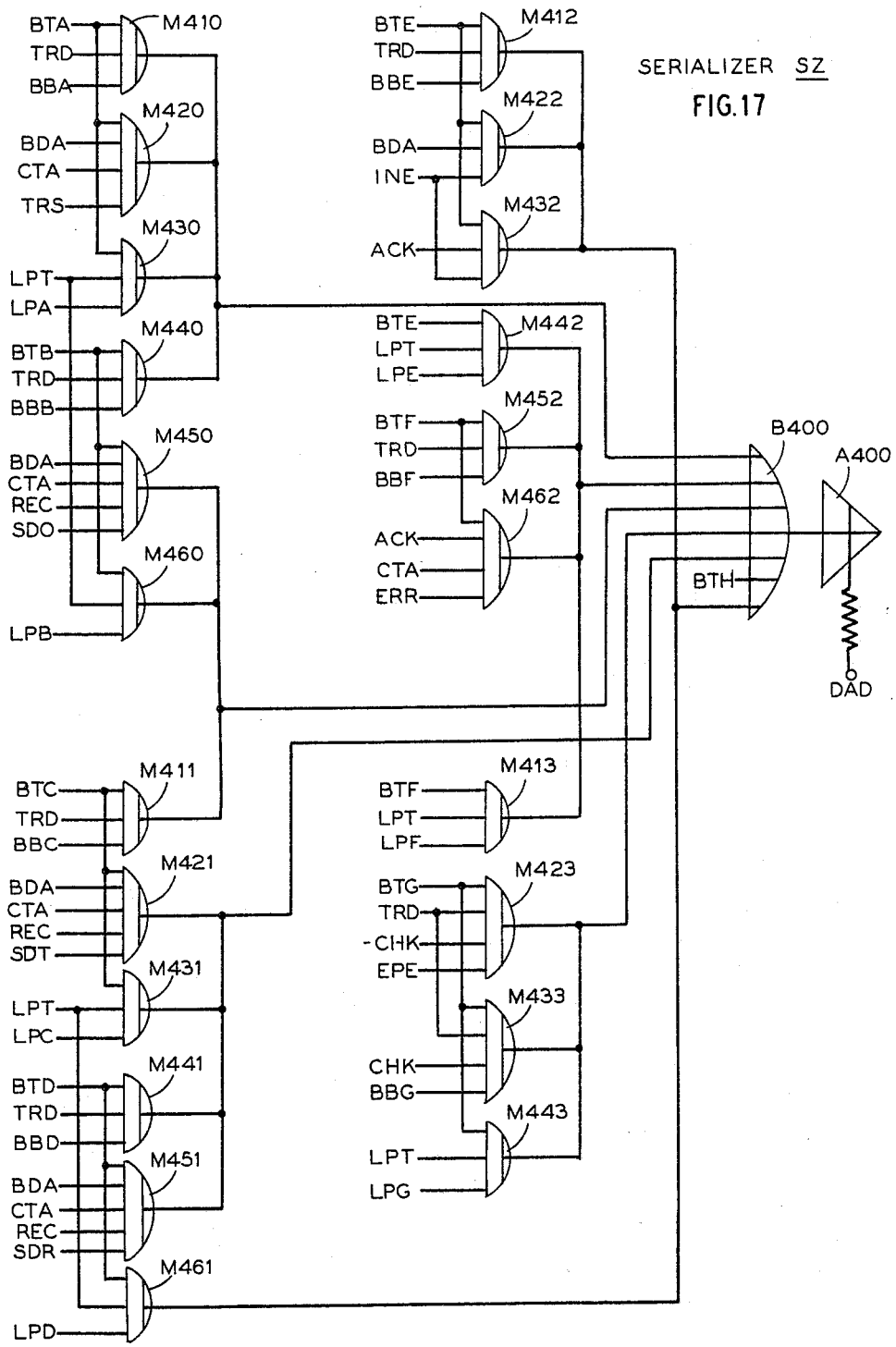

FUNCTION ASSIGNOR FA

ERROR AND CLEAR CIRCUITRY EC

READER CONTROLS RC

RECORD COUNTER RK

FIG. 22 PARITY CIRCUITRY PC

SEARCH-EDIT CIRCUITS SE

Nov. 8, 1966  E. LEONARD ETAL  3,284,774
INFORMATION TRANSFER SYSTEM
Filed March 19, 1962  29 Sheets-Sheet 24
FIG. 26A
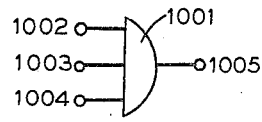
FIG. 26B  GATE 1001
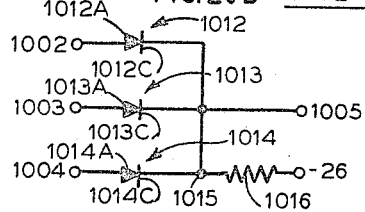
FIG. 27A
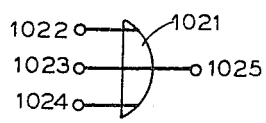
FIG. 27B  BUFFER 1021
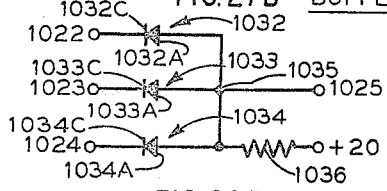
FIG. 28A
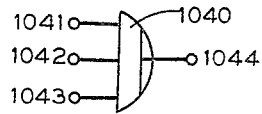
FIG. 28B  MIXER GATE 1040
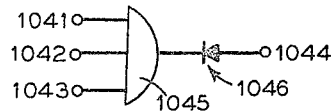
FIG. 29A
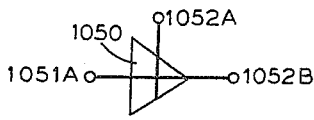
FIG. 29B
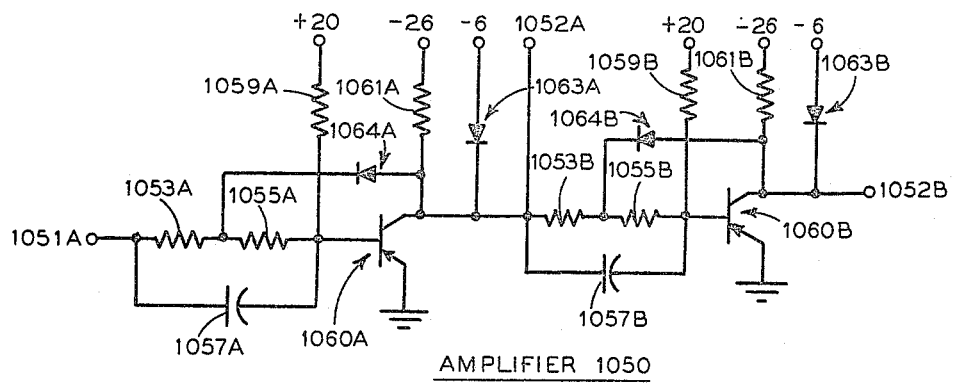
AMPLIFIER 1050

Nov. 8, 1966   E. LEONARD ETAL   3,284,774
INFORMATION TRANSFER SYSTEM
Filed March 19, 1962   29 Sheets-Sheet 25

COUNTER RESET 1070

COUNTER 1090

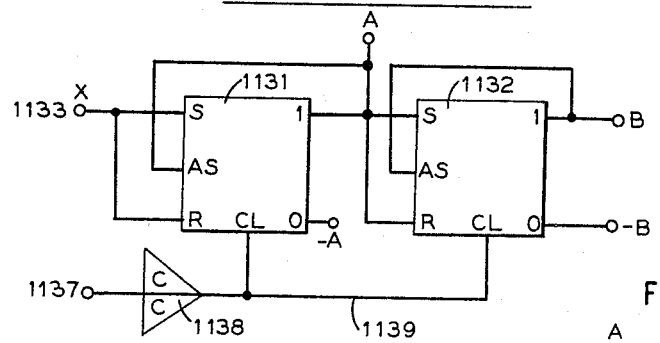
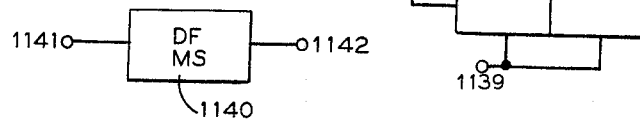
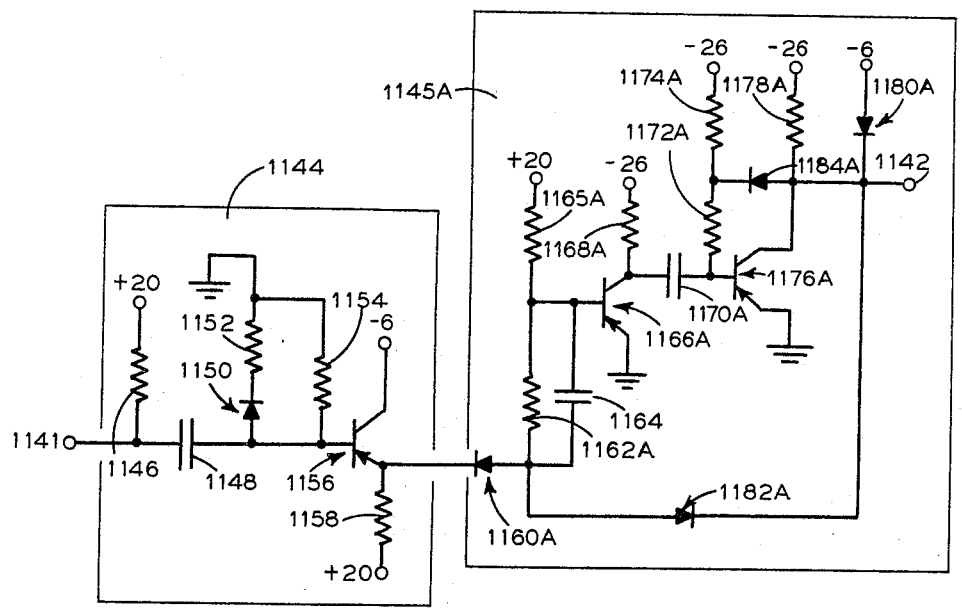

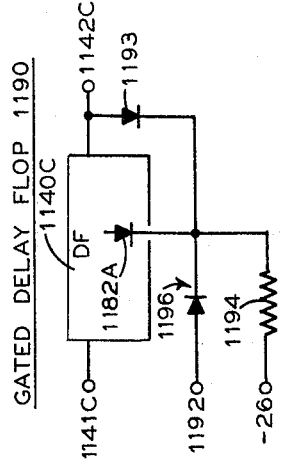
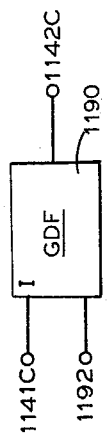
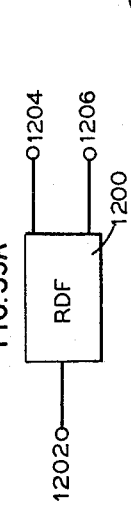
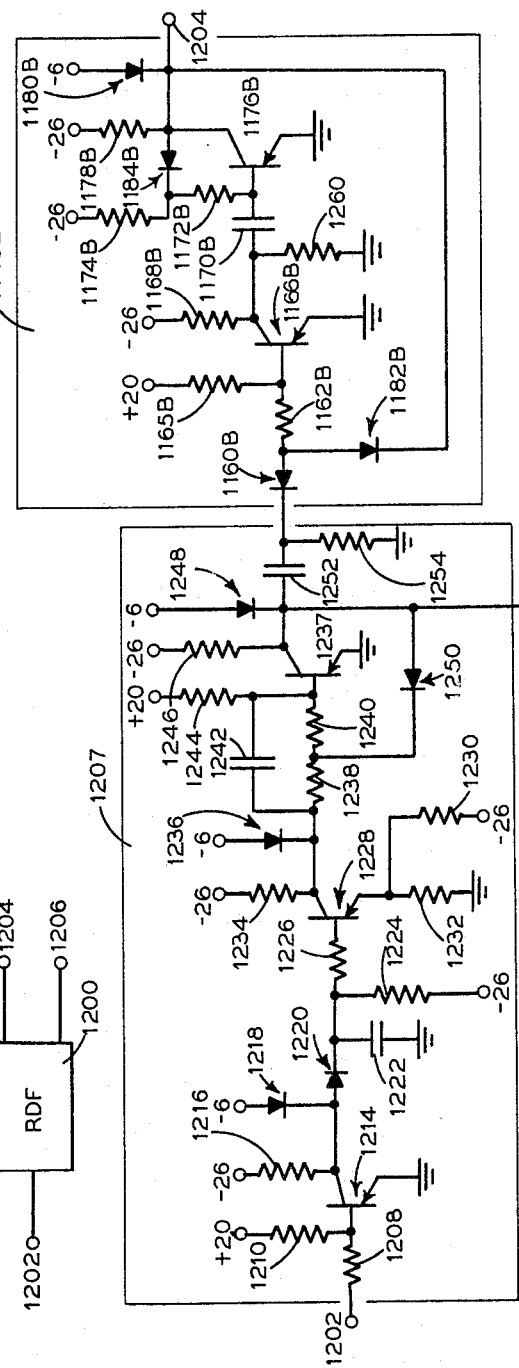

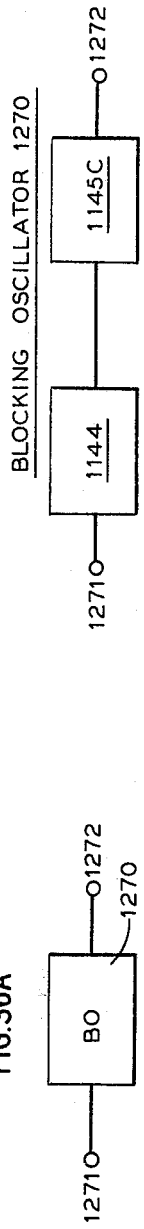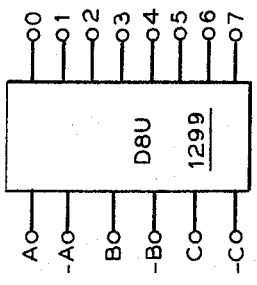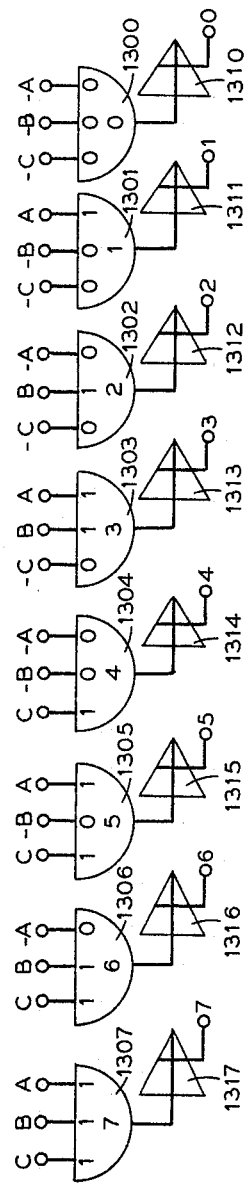

PARITY CHECKER 1320

United States Patent Office 3,284,774
Patented Nov. 8, 1966

3,284,774
INFORMATION TRANSFER SYSTEM
Eugene Leonard, Sands Point, Edward M. Richards, East Northport, Miles Skrivanek, Jr., Glenwood Landing, Edgar Wolf, Floral Park, and Marvin Shapiro, Huntington, N.Y., assignors to Digitronics Corporation, Albertson, N.Y., a corporation of Delaware
Filed Mar. 19, 1962, Ser. No. 180,435
18 Claims. (Cl. 340—172.5)

This invention pertains to information transfer systems and more particularly to systems for transmitting units of information comprising binary digits represented by signals serially between remotely located stations.

Heretofore, digital information was transmitted between remote stations over private telephone or telegraph lines. These systems have several serious limitations in view of the ever increasing need for high speed and long distance transmission of information between cities or even across the continent. In the first place, the rate of information transfer over these lines was exceedingly slow and generally in the order of about ten characters (alphabetic letters, decimal digits, punctuation marks, etc.) per second. Secondly, such systems, because of their extremely slow transmission rates increase the cost per unit of information transmitted. In addition, a great deal of time is required to transmit messages and in some cases, because of the immediacy for the need of the information, it is impossible to transmit the message in the required time.

Another disadvantage of such systems is lack of means for detecting and checking for errors in the transmitted information. Formerly, the type of information was such that errors could be tolerated. However, present day data handling systems demand virtually error-free information or at least means which indicate that an error is present in the information. Finally, such systems often required the physical presence of an operator at each station to prepare the equipment for receiving or transmitting information.

There has become recently available telephone equipment which permits the transfer of data over conventional telephone lines and which enables direct dialing of a receiving or transmitting station and then transfer of the information via the present telephone system through switchboards and exchanges to a subscriber set at a remote installation. Such apparatus removes the necessity for, and reduces data transmission cost in relation to privately owned or leased telephone or telegraph lines since the user pays only for the on-line-time. However, such telephone equipment is unreliable as regards accuracy of the information transferred. It is well known that conventional telephone lines are quite often noisy. During voice communication, the noise on a line is quite often of no consequence since the conversing parties can either repeat the garbled words or can mentally decipher their meaning. Also, when the parties sense a noisy connection, they can disconnect and initiate a new connection.

However, when digital information is transferred over these lines, the noise can destroy units of information or can introduce errors into the units of information.

Furthermore, in contrast with voice communication the transmitted coded information cannot be readily followed from context, aurally or otherwise. In this sense, the opportunity to disconnect and reconnect is not available. Therefore, if the telephone line is noisy, the user will be paying for the time he is on the line, whether or not useful information is being transferred.

It is desirable in the ideal, that the telephone line user pay only for the time during which useful information is being transmitted.

It is accordingly a general object of the invention to provide an improved information transfer system which permits the transmission of a maximum amount of reliable information in a minimum period of time at a minimum cost.

It is another general object of the invention to provide apparatus for high speed data transmission over public lines wherein only the bandwidth of the line limits the data transfer rate.

It is a further general object of the invention to provide apparatus requiring a minimum amount of human intervention and in particular requires only an operator at a central station and no operators in full time attendance at remote stations.

In order to obtain maximum flexibility in information transfer systems it is desirable that each station be capable of both receiving and transmitting. However, where the apparatus at both stations is the same, it is necessary to indicate which of the stations is to operate as a transmitter and which is to operate as a receiver. In this manner, it is necessary to have an operator only at one station.

It is accordingly a general object of one aspect of the invention to provide apparatus which permits the arbitrary transfer of information in either direction along a communication link connecting two stations.

It is a more specific object of this aspect of the invention to provide apparatus at first and second stations, each capable of transmitting or receiving and for transferring control signals between the stations to indicate which station will transmit and which will receive.

Briefly, in accordance with this aspect of the invention, information transfer apparatus is provided which includes a first and second station connected by signal transfer means. The first and second station each include an input means, an output means and a control means, which are connected to the signal transfer means. Means in the control means of the first station initiate either a transmit or receive operation and send a control signal to the second station to indicate that the second station is to enter the complementary transfer operation, that is, if the first station is to be a transmitter, the control signal will indicate that the second station is to be a receiver and vice versa.

A feature of this aspect of the invention is the provision of apparatus to disconnect the stations from the signal transfer means when there has been an erroneous indication of the roles of the first and second stations.

A further feature of this aspect of the invention is the provision of apparatus for the receiving station to indicate to the transmitting station what the transmission rate is to be.

In such information transfer systems, it is highly desirable to divide the units of information into a plurality of units which constitute a block of units of information. Most information processing systems are geared to handle the information in blocks. In addition, it is convenient to divide the information into blocks so that if retransmissions are required because of the transfer of erroneous characters, it is only necessary to retransmit a given block instead of the entire message. However, presently available transfer systems arbitrarily fix the block length at a predetermined number of characters. In many instances, this rigid fixing of the block length is extremely undesirable. For example, the units of information such as bits, numerals or characters in a message are generally by their nature initially divided into words or records where a record constitutes quite often an arbitrary number of units of information. The units of information of the record are all mutually interrelated. For example, the word or record may be an entire sentence or may be the billing information for a particular customer. Therefore, when absolute time intervals or fixed numbers of units of information are set up to establish a block, some of the records may require two blocks. Such an arbitrary splitting leads to complicated editing operations at a data processor.

It is accordingly a general object of another aspect of the invention to provide apparatus for dividing the units of information into blocks while maintaining the integrity of the records of information in the blocks.

It is a more specific object of this aspect of the invention to divide the units of information into blocks which contain only complete records.

It is a further object of this aspect of the invention to provide blocks of information which may contain a variable integral number of records.

Briefly, in accordance with this aspect of the invention, a system is provided for serially transmitting units of information that are grouped into words or records. Each record includes at least one unit of information indicating such as an end of word or record marker that it is a block or record. The apparatus for grouping the records in the blocks, comprises means for generating a time interval and means for sensing for the record units of information. Block signals are generated by means responsive to the time interval generating means and the record unit of information sensing means to generate the block signal upon the occurrence of a record unit of information after the end of the time interval.

A feature of this aspect of the invention is the provision of means for counting units of information to determine the time interval. Thus if the transmission rate changes, the number of units of information in a block is unaffected.

In information transfer systems which include two remote stations, it is often desirable that the information be transmitted in bursts. That is, the units of information are transferred in blocks. One block is transferred and the transmission stops until the receiving station sends back a signal to the transmitting station to cause the transfer of the next block. Such a transfer is highly desirable since it provides means for periodically testing the reliability of the transmission link connecting the stations. In particular, if the link opens, little time is wasted in attempting to transfer information which is not received. Such a system also permits the return of control signals which can cause the retransmission of a block whenever an error is detected in the received information even if the link never opens but only becomes noisy.

It is accordingly an object of another aspect of the invention to provide apparatus for accomplishing such a result.

In accordance with this aspect of the invention, a system for transferring messages consisting of units of information that are serially transferred and grouped into blocks, comprises a first station including an input means and a second station including an output means. The stations are connected by a signal transfer means. Means at the first station initially activate the input means to transfer the units of information. Means at the first station indicate the end of a block to deactivate the input means to terminate the transfer of units of information. Means at the second station transmit control signals to the first station at the end of the block to reactivate the input means so that further units of information may be transferred.

It should be noted that if the control signal is not received, then the input means does not transmit the next block. Therefore, if there is a faulty line condition, the control signal will not be received and the first station may be disconnected from the signal transfer means.

A feature of this aspect of this invention is the generation of a second control signal at the second station when an error is detected in the received information. When the second control signal is received by the first station, the block that had just been transmitted is retransmitted.

In some information transfer systems, the input means includes a record medium which stores the units of information serially. The record medium is then moved in a forward or reverse direction past a transmitting means which senses the units of information and transfers them as sensed. In such a system, the units of information are grouped into records which include at least one record unit of information at the end of the record and a plurality of data units of information. In order to ensure that there is an error-free transmission of information, it is quite often desirable to divide the records into blocks and to transmit each block stepwise. That is, one block is transferred. Then it is determined whether there has been an error in the block transferred. If an error is detected, the block will be retransmitted.

It is accordingly an object of a further aspect of the invention to provide such apparatus.

More particularly, this aspect of the invention contemplates a system for serially transferring information consisting of data units of information which are grouped into records with a record unit of information at one end of the record and a plurality of data units of information. The system comprises input means which include a record medium of storing in a serially available manner the units of information to be transferred and means for causing the record medium to serially transfer the units of information in a first or second and reverse direction. Control means are provided for initially causing the input means to serially transfer in the first direction. Means are also provided for generating a time interval and for sensing for the record units of information during the transfer. Counting means accumulate a count of the record units of information sensed. Means indicate when a block of information has been transmitted, that is when the first record unit of information is sensed after the end of the time interval. The counting means temporarily stores the count representative of the number of records transferred in the block. Other means are provided for sensing for errors in the units of information transferred in the block. If an error has been detected, means cause the record medium to move in the reverse direction and serially transfer the information. While the record medium is serially transferring in the reverse direction, the record units of information are again sensed and as each record unit of information is sensed a deaccumulation of the stored count in the counting means is performed. This deaccumulation continues until the stored count reaches its previous initial value. At this time, a control signal is generated for causing the input means to stop transferring in the reverse direction and to start transferring in the first direction.

A further feature of the invention is the provision of a remote receiving means which includes the error sensing means so that if an error is detected in the received information at the remote receiving means, the remote receiving means transmits a control signal which causes the retransmission.

A further feature of this aspect of the invention is means for recording the number of times a retransmission is performed and for terminating the transfer if the retransmissions exceed a predetermined number.

Quite often the information transfer system includes an output device in which the units of information are recorded serially. If some of the records contain erroneous units of information, it is desirable at a later time to edit the received information so that only records are present which contain error-free information.

It is accordingly a general object of another aspect of the invention to provide apparatus for performing this function.

It is a more specific object of this aspect of the invention to provide apparatus for transferring information in blocks comprising a plurality of records wherein it is possible to delete sequentially received plurality of blocks when there is erroneous information in the blocks.

Briefly, in accordance with this aspect of the invention, apparatus is provided for handling messages consisting of units of information that are serially transferred and grouped into records wherein a plurality of records constitute a block. The apparatus includes: means for serially transmitting the units of information; means for receiving and storing the units of information serially on a storage medium; counting means for accumulating the count of the records transferred in each block; and detecting means for detecting errors in the units of information transferred. When an error is detected, means responsive to the counting means insert a record count in the block to indicate the number of records in the block.

According to a feature of this aspect of the invention, means are also provided for receiving the blocks so transferred and for sensing for the record count to prevent the receiving of a number of records indicated by the record count number.

In single wire information transfer systems, wherein the units of information are represented by coded combinations of signals of a first and second kind, it is necessary to establish the positional significance of the signals with respect to each other in the unit of information. In other words, if the unit of information is represented by a coded combination of binary digits it is necessary to determine which of the binary digits is the least significant digit of the character and which is the most significant bit position of the character. Presently used systems generally prefix the unit of information by a signal having a greater time duration than the remaining signals representing the positions of the character. Apparatus is then provided for detecting this difference in signal duration and when detected an indication is given that the first position of the character is occurring. However, because of the equality of the line and the tolerances in the apparatus the signals have generally a phenomenom called jitter. That is, the leading or trailing edges of the signal are not consistently spaced. As the rate of transmission goes up the jitter problem becomes excessive and it is necessary to incorporate into the apparatus complicated means for compensating for such variations. In spite of these compensating means a point is generally reached where the jitter problem cannot be solved. When this point is reached, the upper limit of data transmission is reached and consequently the rate of information transfer is accordingly limited.

It is accordingly a general object of this aspect of the invention to provide synchronizing apparatus which is reliable at exceedingly high information transfer rates.

It is another object of this aspect of the invention to provide synchronizing apparatus which easily and reliably indicates the relative significance of each of the signals in the units of information that are transferred.

Briefly, in accordance with this aspect of the invention, apparatus is provided for establishing the positional significance of units of information consisting of coded combinations of $n$-bits in series, represented by signals of a first and second kind, wherein the first transferred unit of information consists of $(n-1)$ bits represented by signals of the first kind, and the bit at one end of the unit of information, represented by a signal of the second kind. The other units of information consist of a bit at the same end as the odd bit and is represented by a signal of the second kind. The remaining bits are represented by coded combination of signals of the first kind. At the receiving station an $n$-stable state means which changes stable states as each bit is received, generates a bit position indicating signal whenever it is in the $m$th stable state. Presetting means are provided for presetting the $n$-stable state means to the $p$th stable state. Means which are responsive to the $n$-stable state means activate the pre-setting means whenever the bit position indicating signal is absent and a signal of the second kind is received.

In an information transfer system where the information is transferred between first and second stations remote from each other, it is necessary to insure that the systems operate in synchronism with each other. This necessity is especially critical when the units of information are represented by coded combinations of signals which are of the non-return-to-zero type. In such a type of information transmission, where the units of information are basically combinations of binary digits, the signals only change character whenever the binary digits change value. Therefore, if the unit of information is represented by a plurality of binary digits of one type followed by several binary digits of the second type, it may be impossible to distinguish how many binary digits of the first type are present before the transition occurs.

It is accordingly a general object of this aspect of the invention to provide apparatus for generating sampling pulses for reliably sampling bits of information represented by signals shifting between two levels at very high rates.

It is a more specific object of this aspect of the invention to provide an improved sampling pulse generator which generates sampling pulses that are in synchronism with the signals representing the binary digits in units of information.

Briefly, in accordance with this aspect of the invention, apparatus is provided for generating pulses for sampling bits of information represented by a signal shifting between two levels and having a transmission rate of $n$ bits per second. The apparatus includes first means for generating a pulse for each signal level transition. Second means are provided for generating a signal alternating between two characteristics and having a natural frequency substantially equal to $2n$ cycles per second. Third means are responsive to the second means for generating first and second series of pulses having frequencies of $n$ cycles per second. First and second bi-stable means are included which are responsive to the first means and to the first and second series of pulses to generate first and second waveforms having durations related to the time between the received bits of information and the time between successive pulses in the second series of pulses. Means are provided for comparing these first and second signals to generate a control voltage which is fed to the second means to change the frequency of a second means in accordance with the difference in time duration of said waveforms. The second series of pulses is the sampling pulses for sampling the signals representing the bits of information.

A feature of this aspect of the invention is a controlled and correctable relaxation oscillator which generates the signal alternating between different characteristics and having a natural frequency substantially equal to $2n$ cycles per second.

A further feature of the invention is the signal comparing means for generating the control signal that controls the frequency of the relaxation oscillator.

One method of checking for errors in the transmission of information is to insure that count of the number of bits of a particular type in each of the units of information is always even or odd. Such an error detecting scheme is called vertical parity checking. A second method is to check the longitudinal parity of a group of units of information that are transmitted in parallel. In longitudinal parity checking the count of the number of bits in the same bit position of each unit of information for all the units of information in the group is maintained either odd or even.

Heretofore, longitudinal parity checking has been used only where the units of information are transferred with their bits in parallel. However, when the units of information are transmitted with their bits in series, longitudinal parity checking has not been performed.

It is accordingly, a general object of a further aspect of the invention to provide means for checking for longitudinal parity in units of information wherein the bits of the units of information are transmitted serially.

Briefly, in accordance with this aspect of the information, apparatus is provided in a system for serially transmitting units of information wherein each unit of information is a coded combination of bits represented by signals, said units of information being grouped into records. Parity generating means is provided comprising first means adapted to receive the units of information serially with the bits in parallel in a plurality of bit positions. Second means are provided for accumulating the parity of the bits included in each bit position to form a longitudinal parity unit of information consisting of a plurality of bits equal to the bit positions, as the units of information are serially received by the first means. Third means serially transmit the units of information with their bits in series, and fourth means are provided for transmitting the longitudinal parity unit of information with its bits in series at the end of each record.

Other objects, features and advantages of the various aspects of the invention will be apparent from the following detailed description when read with the accompanying drawings wherein:

FIGURE 5 shows the flow of signals between various units of the transmitter during the Acknowledge, Retransmit and Disconnect modes;

FIGURE 10 shows by logical symbols the general mode control GM;

FIGURE 15 shows the logical diagram for the acknowledge mode control AK;

FIGURE 16 shows logically the ignore and insert circuits II;

FIGURE 17 shows in logical symbol form the serializer SZ;

FIGURES 26A and 26B show respectively the logical symbol and the schematic diagram for a gate;

FIGURES 27A and 27B show respectively the logical symbol and the schematic diagram for a buffer;

FIGURES 28A and 28B show in logical symbols a mixer gate;

FIGURES 29A and 29B show respectively the logical symbol and the schematic diagram for an amplifier;

FIGURES 32A and 32B show the logical symbols for a two stage binary counter;

FIGURES 33A and 33B show the logical symbol and the schematic diagram for a representation delay flop;

FIGURES 34A and 34B show the symbols for a gated delay flop;

FIGURES 35A and 35B show the logical symbols and schematic diagram for a retriggerable delay flop;

FIGURES 36A and 36B show by means of logical symbols a "blocking oscillator" of the system;

FIGURES 37A and 37B show the block symbol and the logical details of a decoder of the system.

TABLE OF CONTENTS

Figure 1:
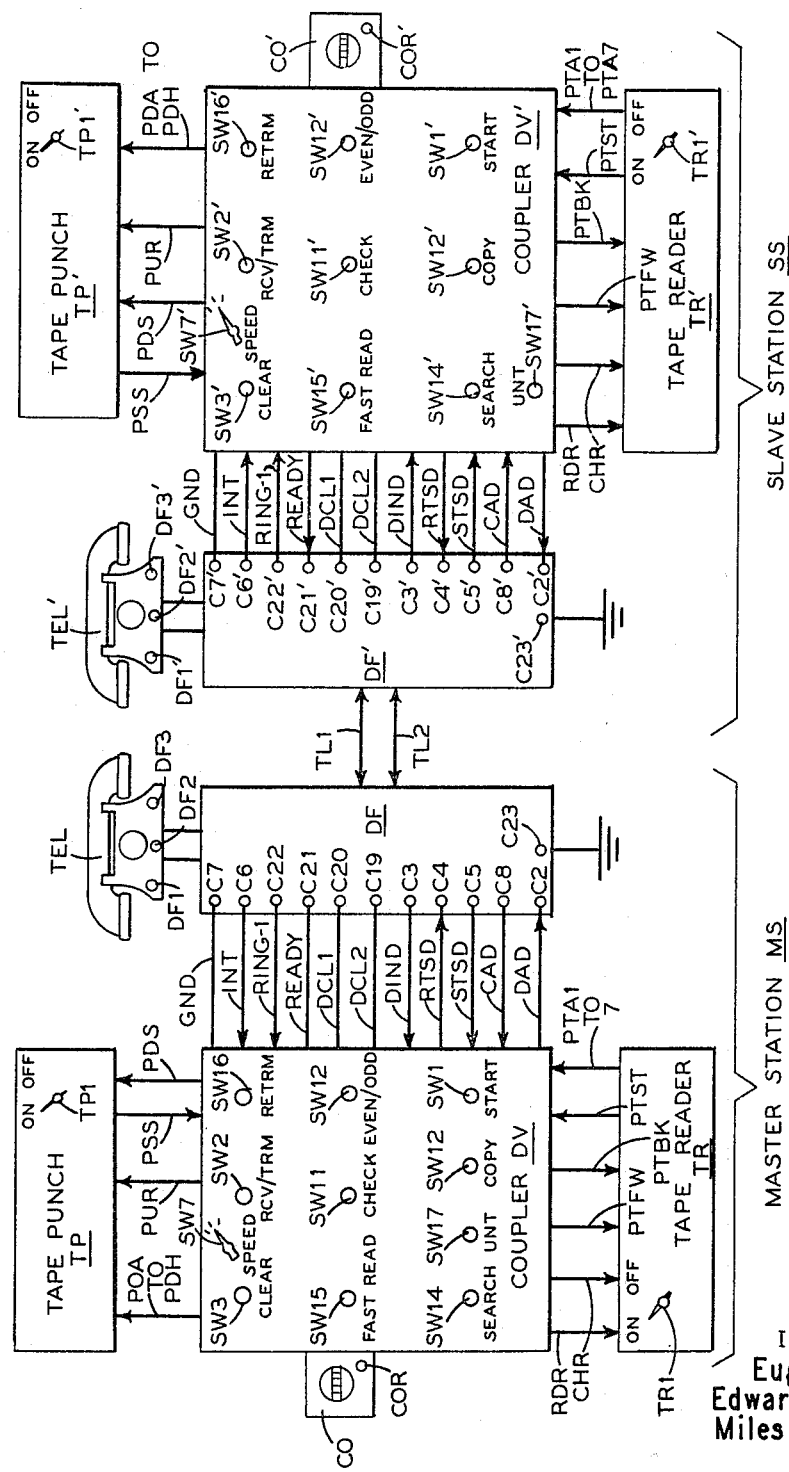
FIGURE 1 is an overall system diagram of an information transfer system in accordance with the invention.

| Title | Figure | Column |
|---|---|---|
| General Structure of Information | | 9 |
| Signal List | | 10 |
| Overall System | 1 | 13 |
| General Description of the Blocks of the System | | 19 |
| Bid and Connect Modes of the Master Station MS | 2 | 21 |
| The Idle and Allow Modes of the Slave Station SS | 3 | 24 |
| Transmitter.—Transmit Mode; Parity Check; Insertion of Ignore Characters; and End of Block Detection | 4 | 25 |
| Transmitter.—Acknowledge Mode, Retransmit Mode and Disconnect | 5 | 27 |
| Receiver.—Receive Mode, Parity Check; Ignore; Acknowledge Mode; and Disconnect | 6 | 30 |
| Search Edit Operation | 7 | 34 |
| Detailed Description of the Blocks of Figures 2 to 7 | | 36 |
| Timer TM | 8 | 38 |
| Control Panel CP | 9 | 42 |
| General Mode Control GM | 10 | 44 |
| A Buffer AB | 11 | 46 |
| B Buffer BB | 12 | 48 |
| End Circuitry ED | 13 | 49 |
| Retransmit Controls RT | 14 | 50 |
| Acknowledge Mode Control AK | 15 | 52 |
| Ignore and Insert Circuits II | 16 | 53 |
| Serializer SZ | 17 | 53 |
| Function Assignor FA | 18 | 54 |
| Error and Clear Circuitry EC | 19 | 56 |
| Reader Controls RC | 20 | 58 |
| Record Counter RK | 21 | 60 |
| Parity Circuitry PC | 22 | 62 |
| C Buffer CB | 23 | 63 |
| Search Edit Circuits SE | 24 | 64 |
| Appendix: | | |
| Controlled Multivibrator | 25 | 66 |
| Tape Punch TP | | 69 |
| Tape Reader TR | | 69 |
| Mechanical Counter | | 69 |
| Transceiver DF | | 69 |
| Description of Symbols | | 70 |
| Gate | 26 | 70 |
| Buffer | 27 | 72 |
| Mixer Gate | 28 | 72 |
| Amplifier | 29 | 73 |
| Counter Reset | 30 | 74 |
| Counter | 31 | 74 |
| Binary Counter | 32 | 76 |
| Monostable Multivibrator Type Circuits | | 77 |
| Delay Flop | 33 | 78 |
| Gated Delay Flop | 34 | 79 |
| Retriggerable Delay Flop | 35 | 80 |
| Blocking Oscillator | 36 | 81 |
| Decoder | 37 | 82 |
| Parity Checker | 38 | 82 |
| Conclusion | | 84 |

GENERAL STRUCTURE OF INFORMATION

The information, throughout the system, is represented by binary units or bits, conveniently indicated by one (1) and zero (0). In different portions of the system, the indicia representing the bits is different. For example, when the information is recorded on paper tape, a binary one is indicated by the presence of a hole and a binary zero by the absence of a hole. In the couplers, a binary one is indicated by a negative voltage, generally by minus six volts; and a binary zero is represented by the absence of a negative voltage, generally, zero volts. In the telephone line connector and over the telephone lines, a binary one is represented by a first frequency signal, generally twenty-two hundred cycles per second and a binary zero is represented by a second frequency signal, generally twelve hundred cycles per second.

The binary units are in coded combinations which are called characters. Generally, a codded combination of eight binary units represents the basic character. However, on paper tape, the characters may be represented by a seven bit combination which is transferred bits-in-parallel, characters-in-series or by a five bit combination, which is transmitted bits-in-parallel, characters-in-series. In a seven bit code, the six least significant bits represent information and the most significant bit represents parity. In a five bit code, the five bits represent information. Associated with each character on the paper tape, is a sprocket hole.

In the telephone equipment, the characters comprise coded combinations of eight bits which are transmitted serially. The six least significant bits represent a unique character; the most significant bit, which is always a binary one, is in a sense a synchronizing bit, and the second most significant bit is a parity bit. Within the couplers which connect the paper tape devices to the telephone equipment, the characters are converted between bits-in-parallel representation and bits-in-series representation. The direction of conversion will depend on the direction of character flow. If the characters are flowing from a paper tape device to the telephone equipment, the bits-in-parallel representation of the characters will be converted to a bits-in-series representation, and vice versa.

The characters or units of information are grouped into units of varying length which are called words records. The records are grouped into units of variable integral numbers of records called blocks. The entire number of characters or blocks transmitted at one time will be considered as a message.

Generally, the characters will be numeric characters or numbers, alphabetic characters or letters, punctuation characters, and control characters. The coded combinations of bits representing the numbers, letters and punctuation characters may be according to any currently available codes such as Teletype code, Univac code, IBM code, etc. The control characters are unique combinations of bits which occur at particular times during the message to activate particular control operations in the couplers.

The control characters can be divided into two classes: those preceding, not associated with, the actual transmission of data (mode characters) and those incorporated in the transmitted data (format characters). The mode characters are generally transmitted at the start of transmission and in the intervals between the transmission of blocks. The format characters are generally part of the records that are transmitted. Table 1 summarizes the mode characters. It should be noted that the least significant bit is on the right and during bits-in-series transmission occurs first in time.

TABLE 1

| | |
|---|---|
| 10000000 | Reference character |
| 10000001 | Receive information |
| 10000010 | Transmit information at 100 c.p.s. |
| 10000100 | Transmit information at 150 c.p.s. |
| 10001000 | The output device will be a punched card unit |
| 10010000 | End of Mode |
| 10100000 | Error |

The role of these mode characters is hereinafter more fully described.

Table 2 summarizes the format characters which also have their least significant bits on the right and are considered to occur first in time.

TABLE 2

| | |
|---|---|
| 1P011111 | First Character FST |
| 1P000010 | End sentinel Character ENA |
| 1P010001 | End sentinel Character EMA |
| 1P001001 | Ignore Character IG or IGR or IBC |
| 1P110111 | Parity Error Character ERC or ECD |

The bit represented by P will be a one or zero in accordance with the type of vertical parity employed.

The first character FST is always present at the start of a message. A first three-character combination of the ENA and EMA characters always precedes the first FST character at the start of a message and is always present at the end of every record to indicate the end of the record. A second three-character combination of ENA and EMA is always present at the end of a message to indicate the end of the message. The functions of the remaining characters are associated with error indications and will be discussed more fully hereinafter. A typical Message on the telephone line may take the following form: ENA; EMA; ENA; FST; 9; 8; ERC; P; Q; ENA; EMA; ENA; P; SP1; SP2; 9; 8; . . .; P; Q; ENA; EMA; ENA; LP; SP1; SP2; EMA; ENA; EMA.

It should be noted that the particular serial combination of characters ENA; EMA; ENA indicates the end of a record. ERC will only be present if a transverse parity has been detected in one of the characters. LP is a character indicating the vertical parity of the block. SP1 will be a space, unless an error was detected in the block and then SP1 will contain an IG character indicating that the block should be ignored. SP2 will always be a space and is provided to permit the insertion of a number indicative of the number of blocks received by the receiver during the transmission of a record if an error is detected. The serial combination of characters EMA; ENA; EMA indicates the end of the message.

In the following set of descriptions, only the primary purpose of the signals will be discussed for the sake of clarity. In addition, only those particular units of the system that are immediately pertinent will be included in the drawings. Similarly, there will be no specific regard to the polarity of the signals and, in fact, the signal and the line carrying the signal will have the same designation.

SIGNAL LIST

Only those signals are listed which are fed between blocks of the system. Those used only internal to a block are not included in the list even if they are given specific reference number designations within the block. Several signals which are listed do not include the blocks of use because they are used almost universally throughout the system. These signals are the general clearing and timing signals.

Figure 8:
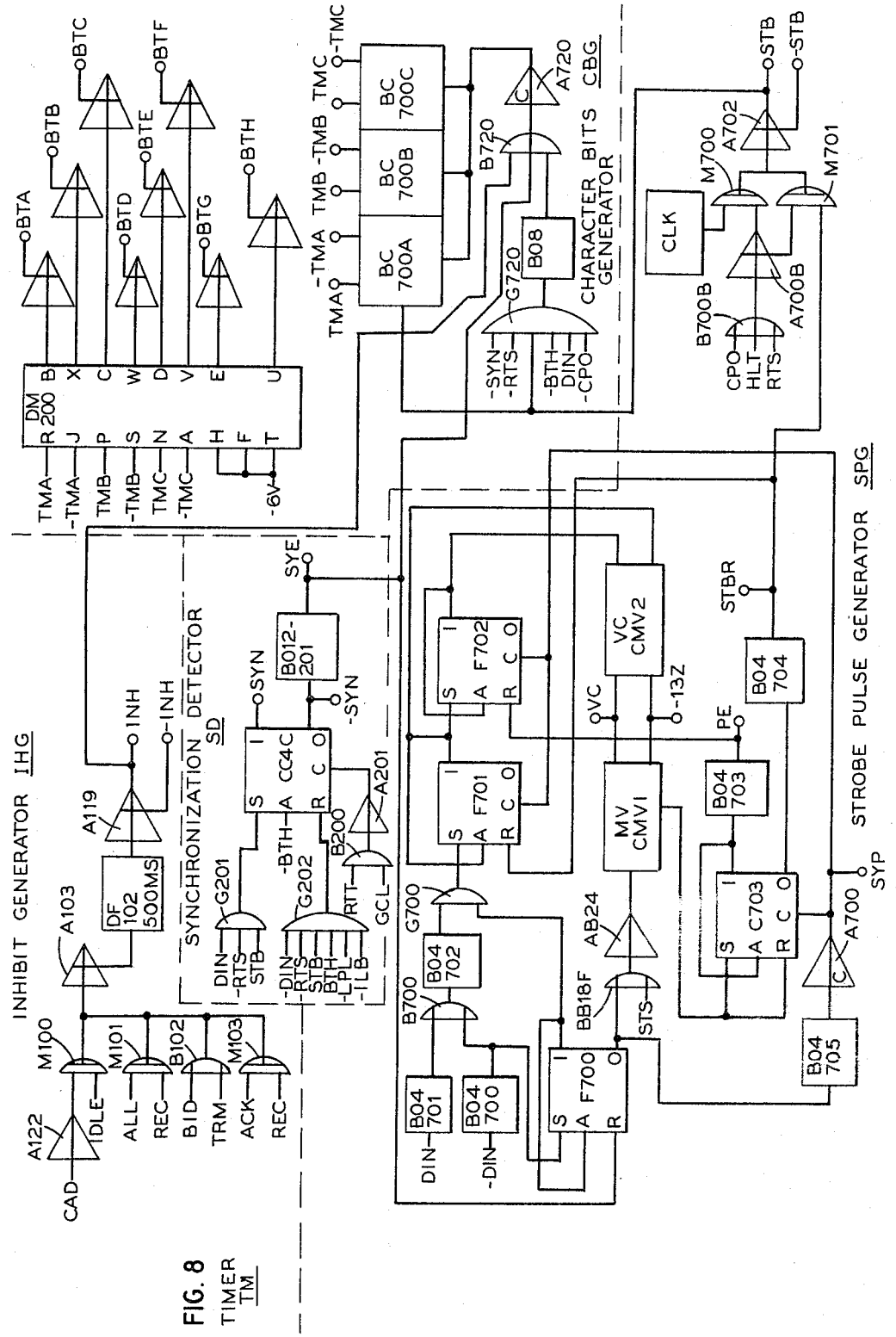
FIGURE 8 shows the timer TM in logical symbology.
Figure 9:
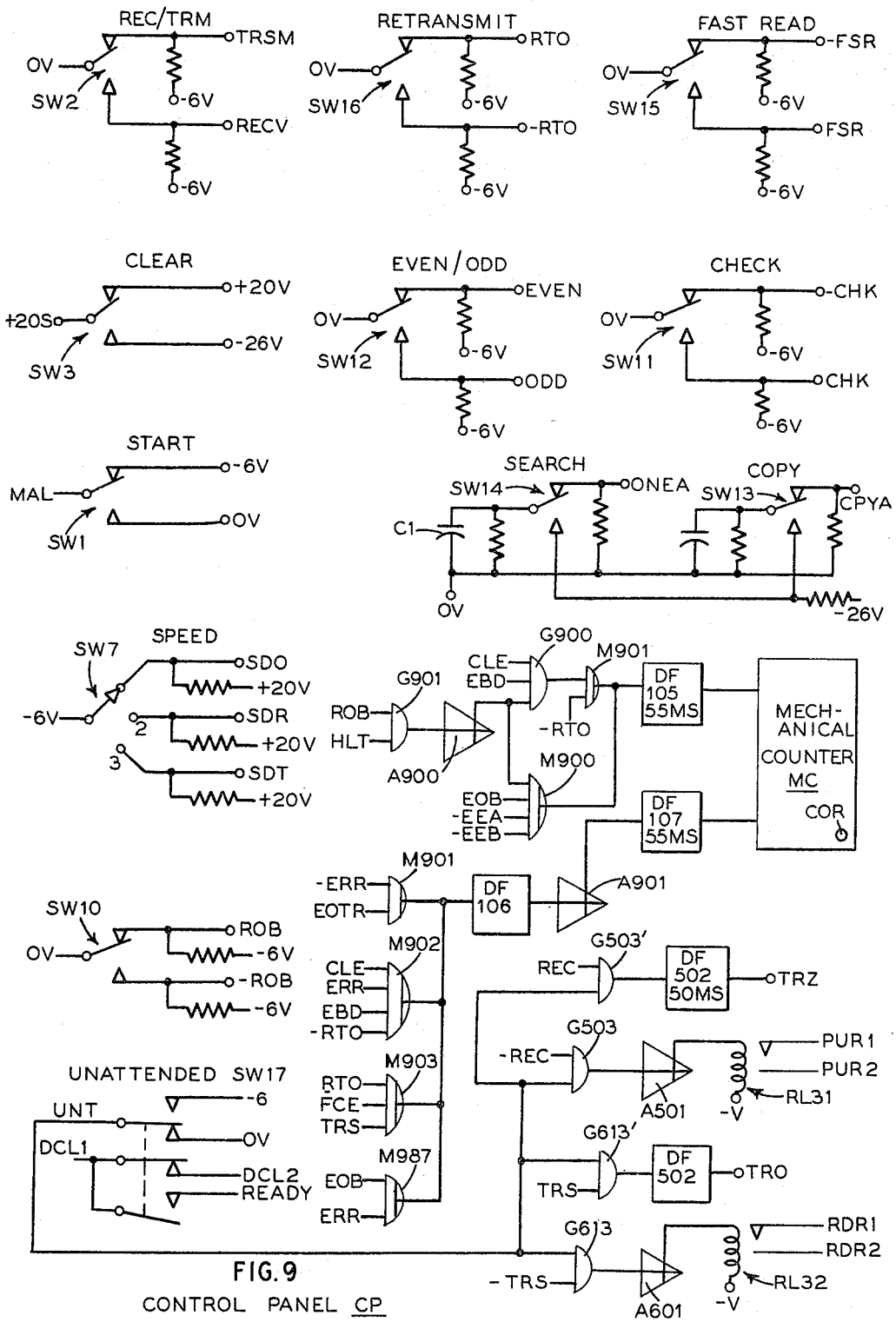
FIGURE 9 shows the logical symbol representation of the control panel CP.
Figure 11:
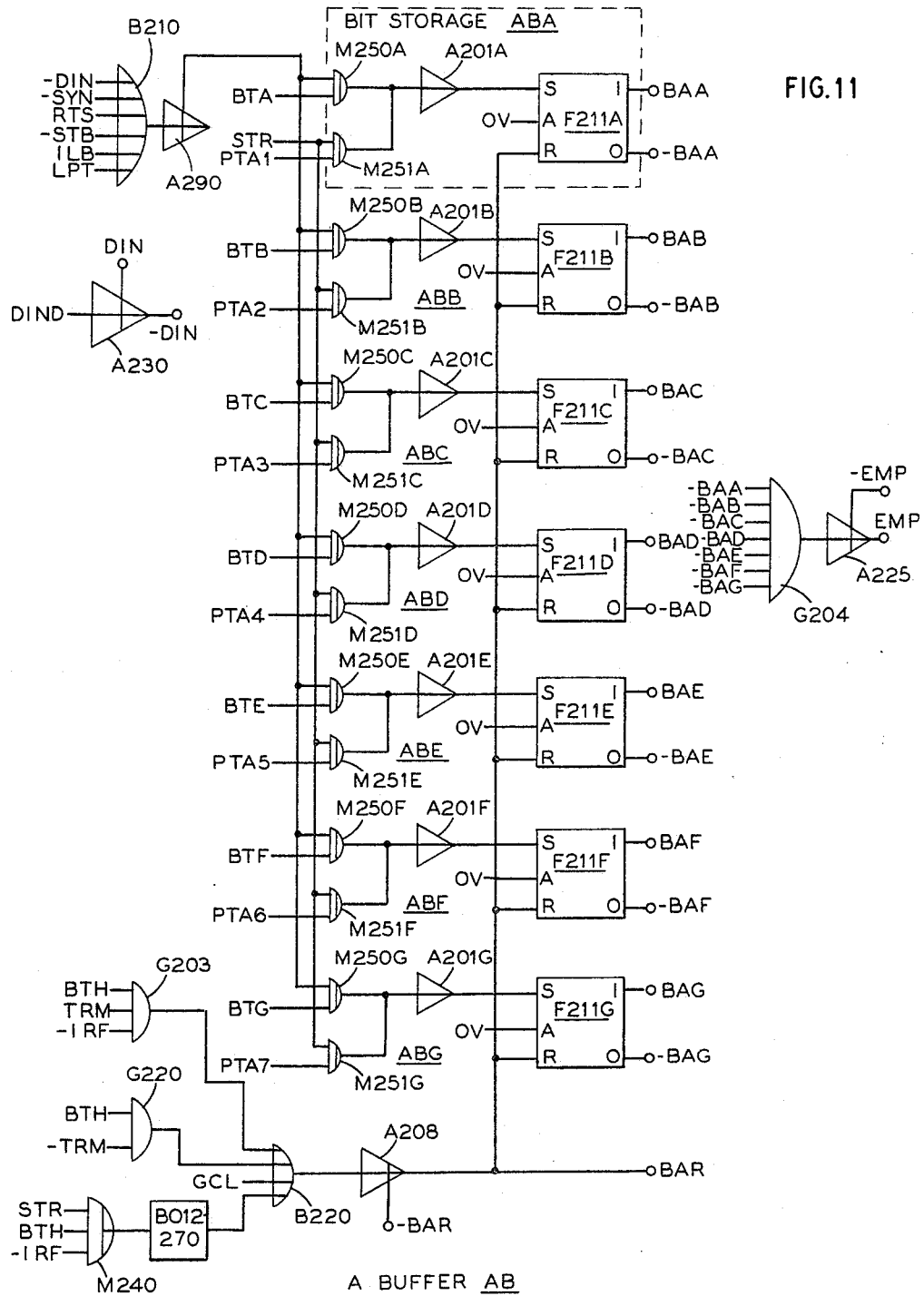
FIGURE 11 is a logical diagram of the A buffer AB.
Figure 12:
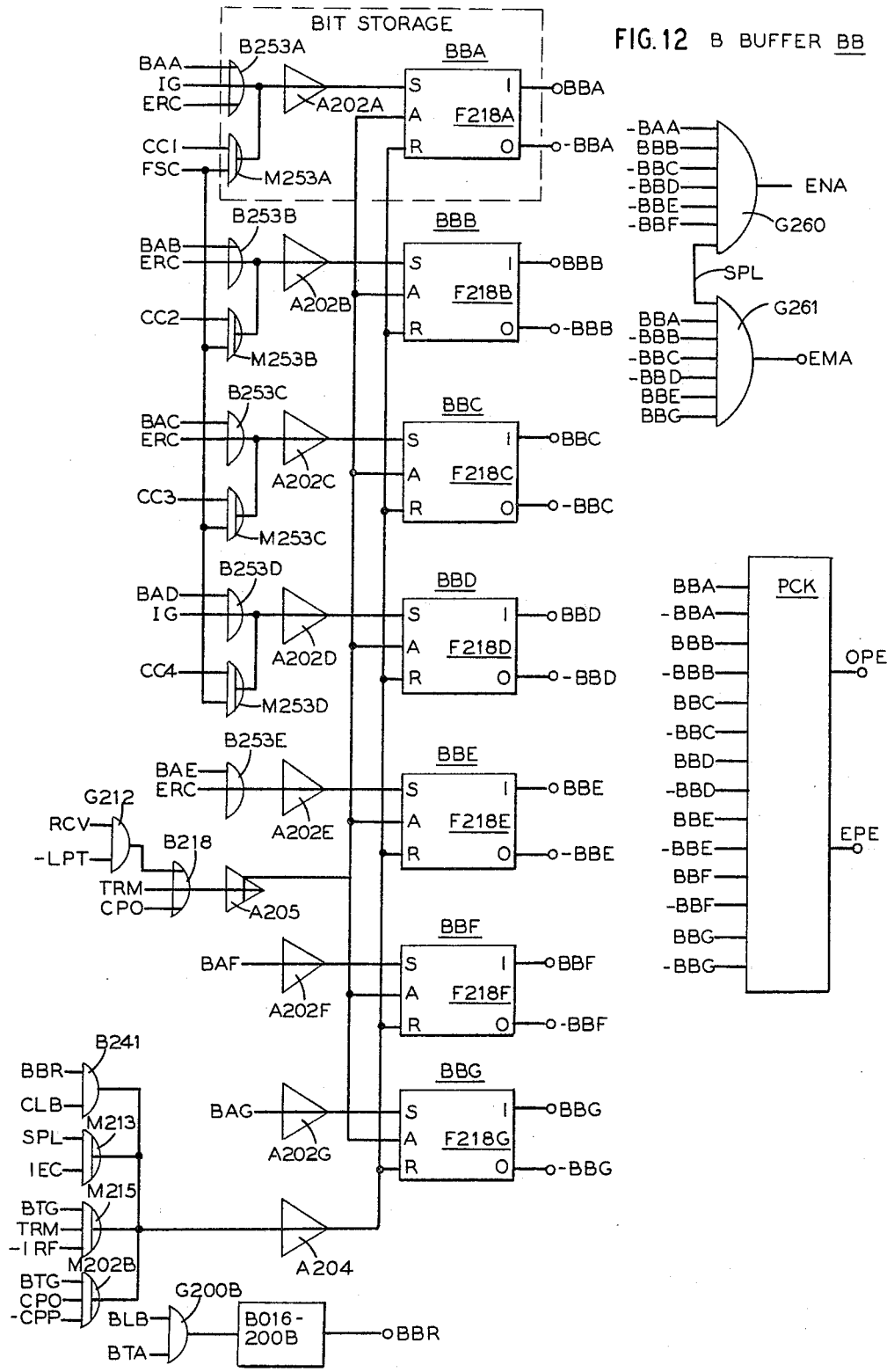
FIGURE 12 is a diagram, using logical symbols, of the B buffer BB.
Figures 13, 14:
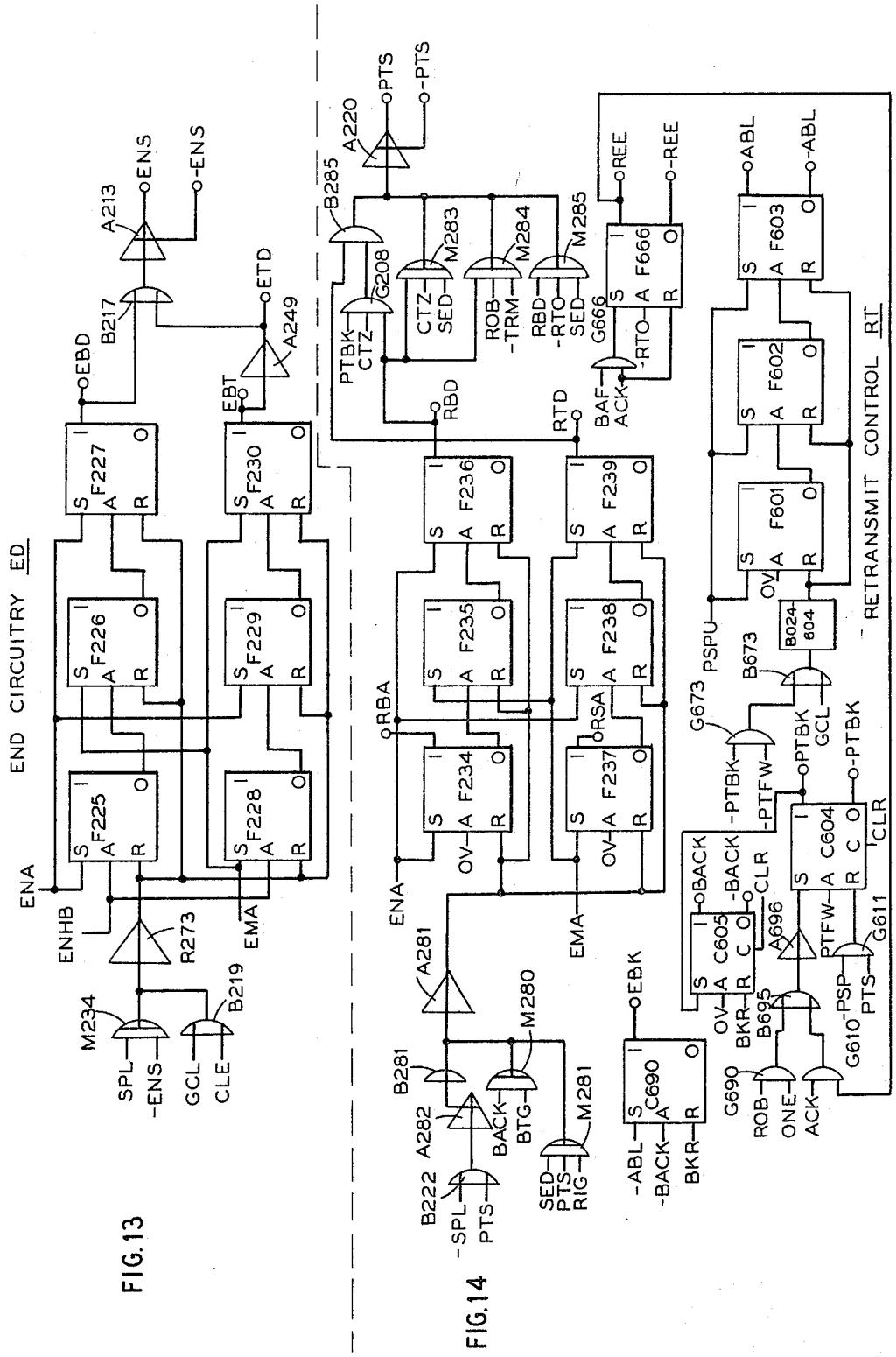
FIGURE 13 shows the end circuitry ED in logical symbology.
FIGURE 14 shows by logical symbology the retransmit control RT.
Figure 18:
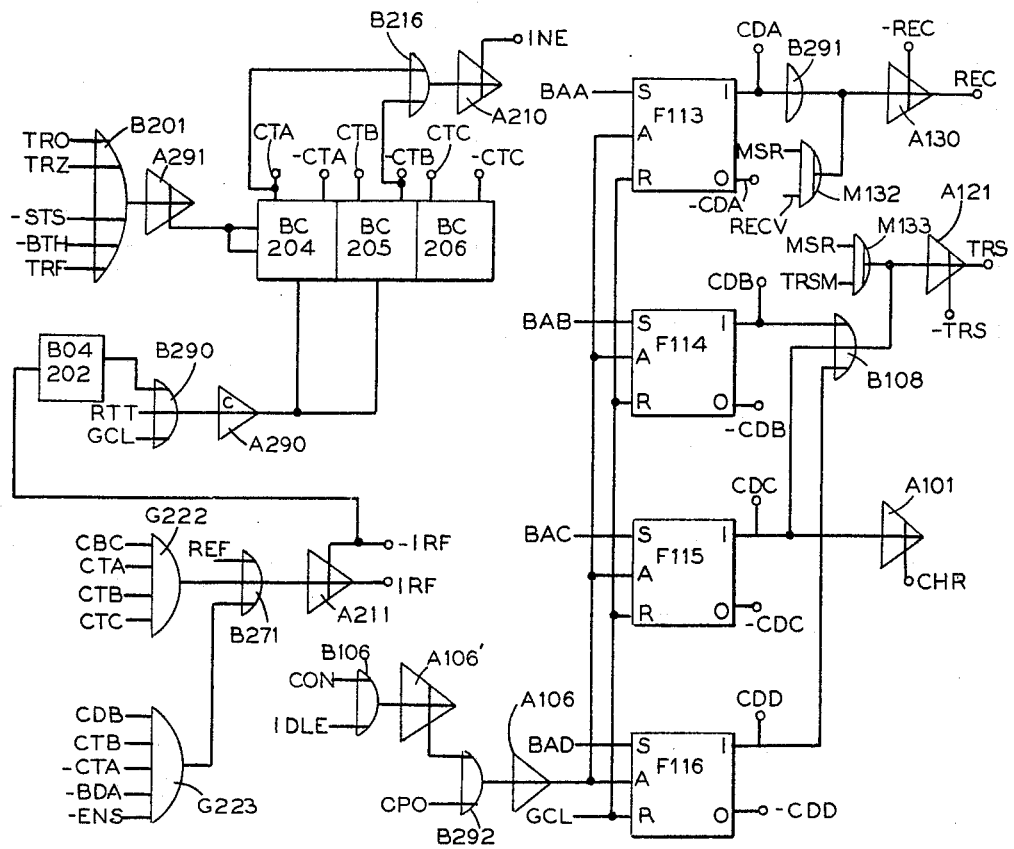
FIGURE 18 is the logical diagram for the function assignor FA.
Figure 19:
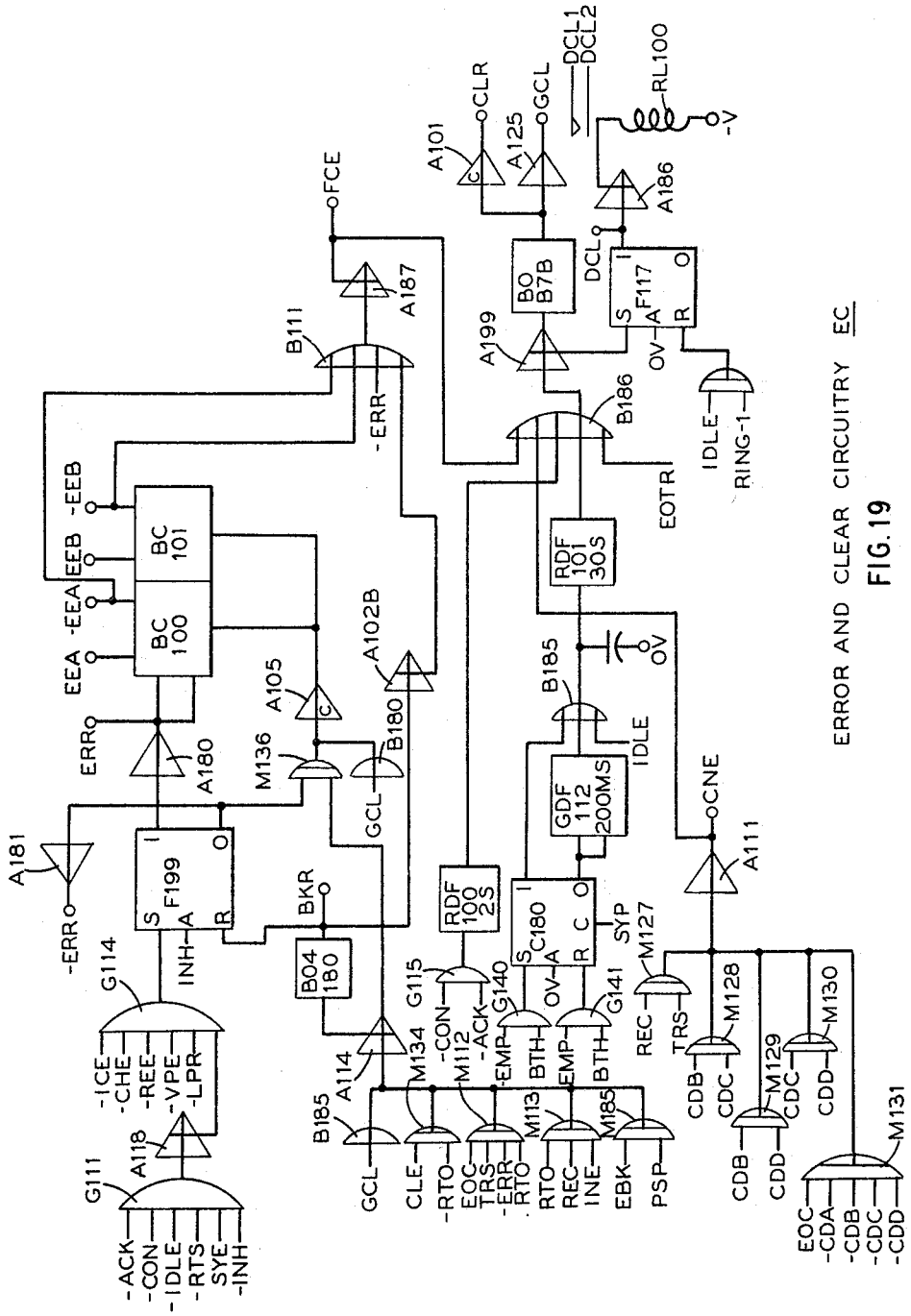
FIGURE 19 is the logical diagram for the error and clear circuitry EC.
Figure 20:
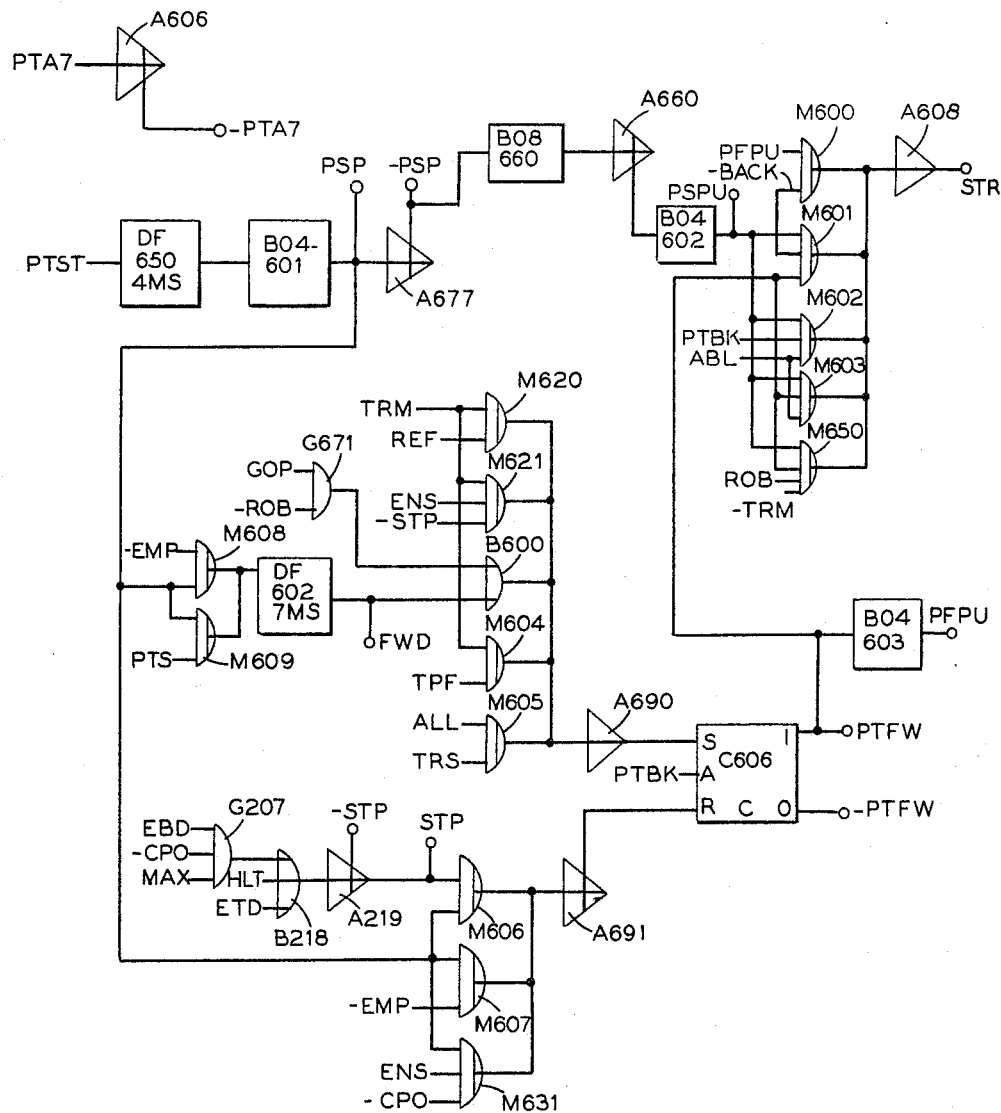
FIGURE 20 shows in logical form the reader controls RC.
Figure 21:
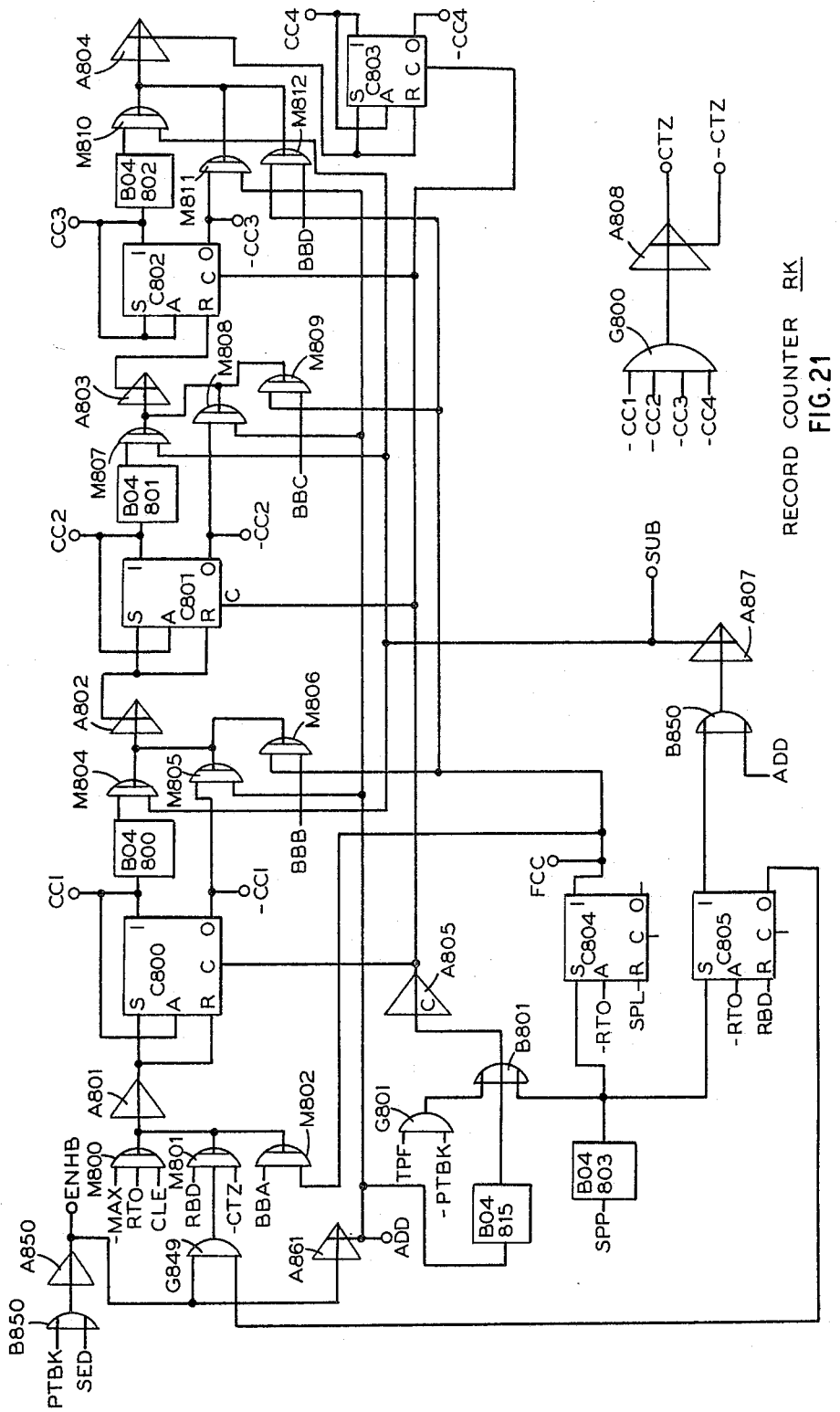
FIGURE 21 shows by logical symbols the record counter RK.
Figure 22:
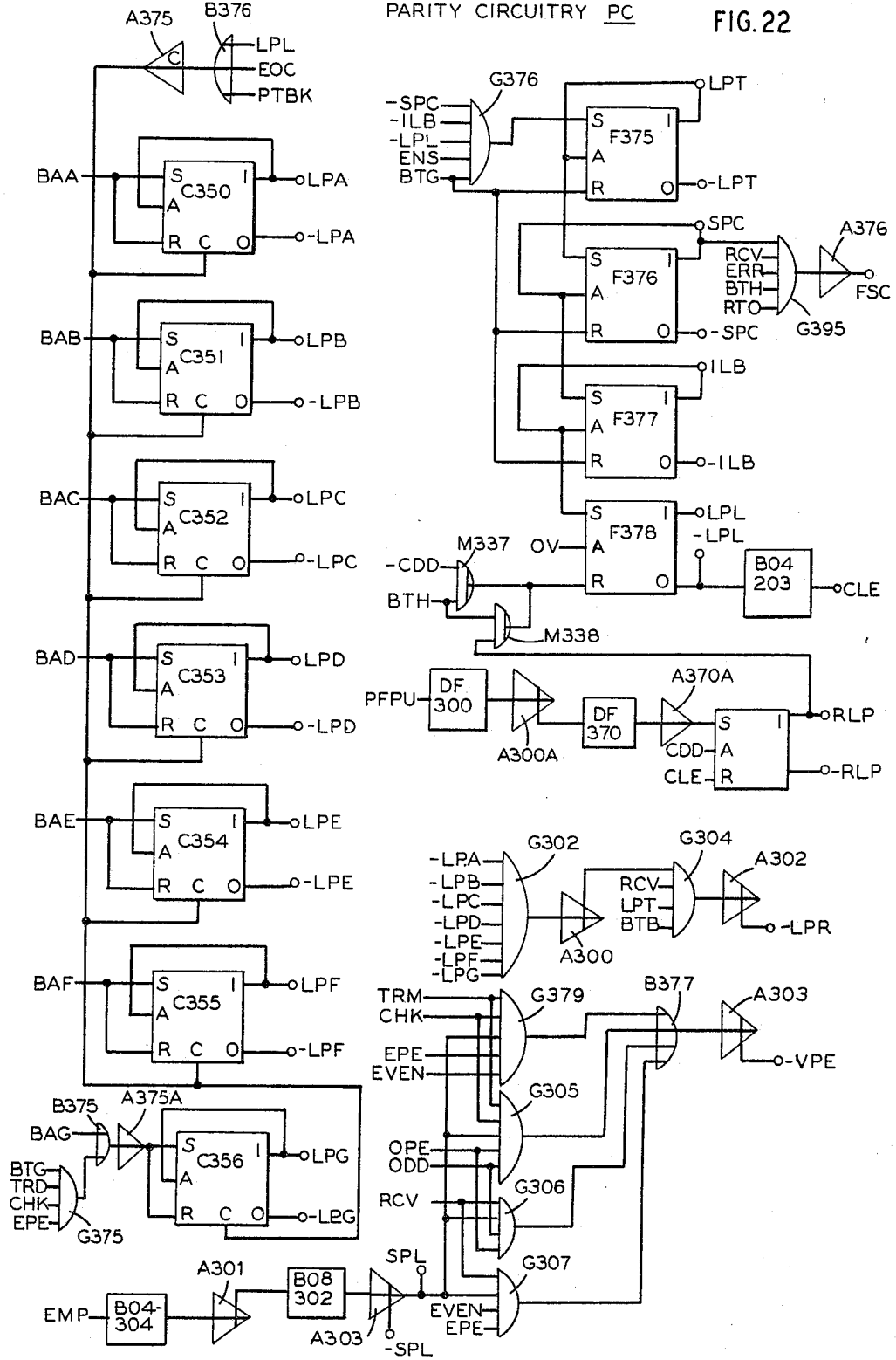
FIGURE 22 shows the parity circuitry PC in logical form.
Figure 23:
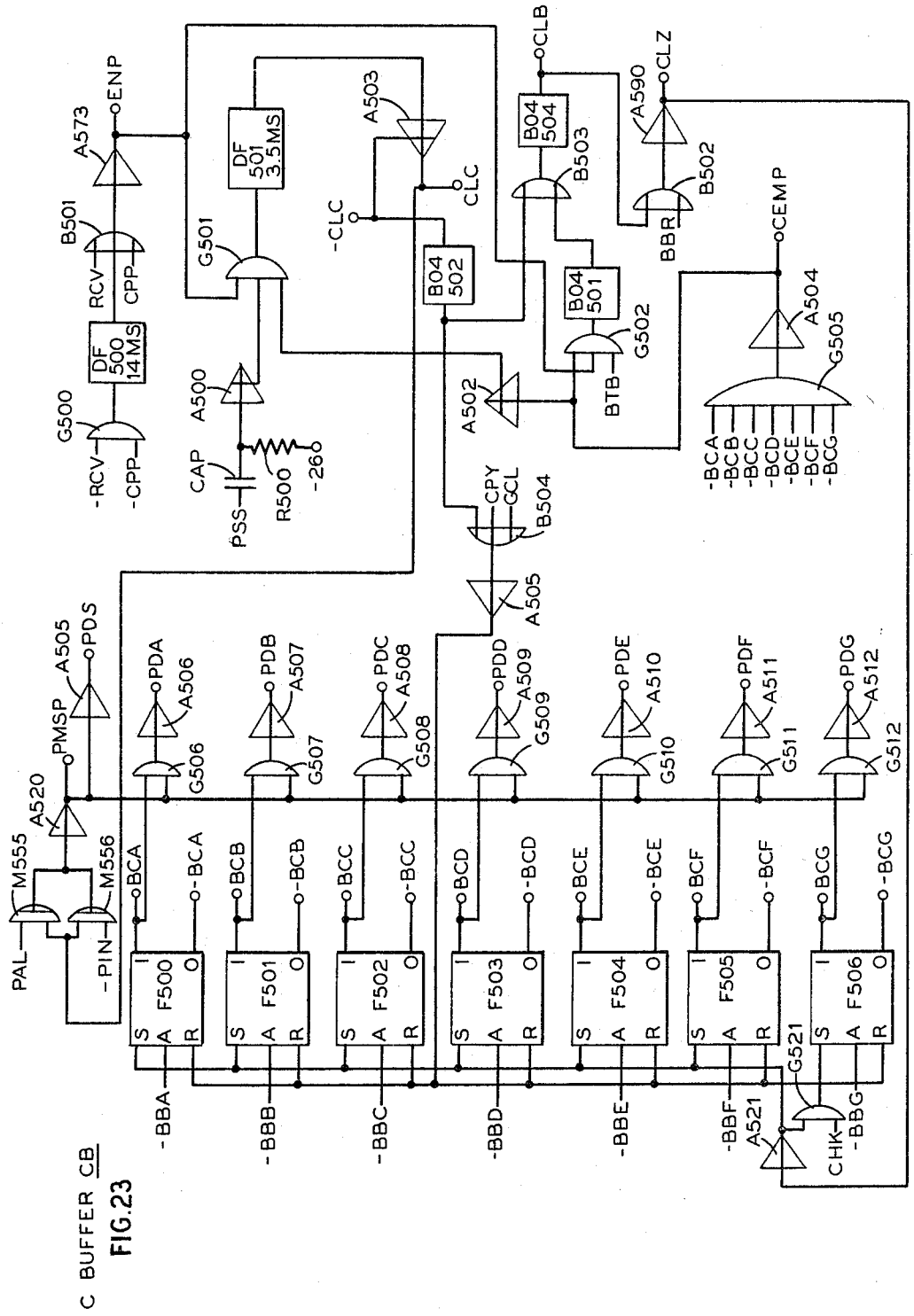
FIGURE 23 is a logical diagram of the C buffer CB.
Figure 24:
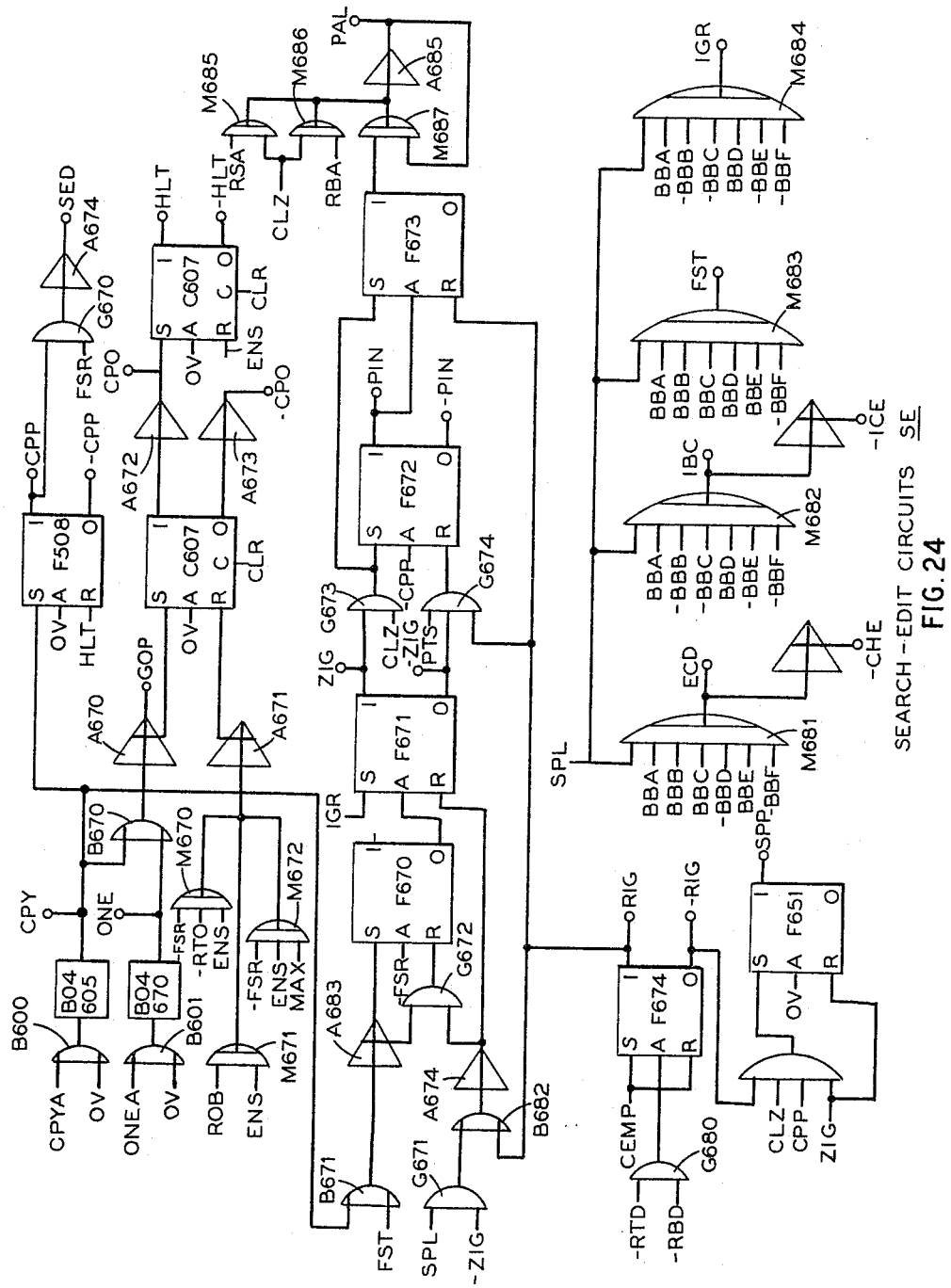
FIGURE 24 shows logically the search-edit circuits SE.

| Signal | Source | Remarks | Used |
|---|---|---|---|
| ABL | Fig. 14 | Enables skipping of certain end sentinel characters during during Retransmit mode. | Fig. 20. |
| ACK | Fig. 15 | Acknowledge mode signal | Figs. 8, 10, 14, 17 and 19. |
| ALL | Fig. 10 | Allow mode signal | Figs. 8, 10, 20. |
| BAA to BAG | Fig. 11 | Signals representing bits of data in A buffer AB | Figs. 10, 12, 14 and 22. |
| BACK | Fig. 14 | Signal indicating last direction of paper tape movement | Fig. 20. |
| BBA to BBG | Fig. 12 | Signals representing bits of data in B buffer BB | Figs. 12, 17, 18, 21, 23, and 24. |
| BBR | Fig. 12 | Clear B buffer BB pulse, delayed | Fig. 23. |
| BDA | Fig. 10 | Signal present during Bid or Allow modes | Figs. 15, 17, 18. |
| BID | Fig. 10 | Bid mode signal | Fig. 8. |
| BKR | Fig. 19 | Reset pulse for Error flip-flop | Fig. 14. |
| BTA to BTH | Fig. 8 | Timing pulses associated with the bits of the characters | Throughout the entire system. |
| CAD | Transceiver DF | Signal indicating that carrier is being received by transceiver DF. | Fig. 8. |
| CC1 to 4 | Fig. 21 | Signals for bits representing record count | Fig. 12. |
| CDA | Fig. 18 | Signal indicating transmitter | Fig. 19. |
| CDB | Fig. 18 | Signal indicating receiver operates at 100 characters per second. | Fig. 19. |
| CDC | Fig. 18 | Signal indicating receiver operates at 150 characters per second. | Fig. 19. |
| CDD | Fig. 18 | Signal indicating receiver is punched card apparatus | Figs. 19, 22. |
| CEMP | Fig. 23 | Signal indicating C buffer CB is empty | Fig. 24. |
| CHE | Fig. 24 | Pulse indicating error character detected | Fig. 19. |
| CHK | Fig. 9 | Signal indicating parity should be checked | Figs. 17, 22, 23. |
| CHR | Fig. 18 | Signal causing reading at 150 characters per second | Tape Reader TR. |
| CLB | Fig. 23 | Pulse for clearing B buffer BB | Fig. 12. |
| CLE | Fig. 22 | Clear pulse at end of record | |
| CLR | Fig. 19 | General clear pulse | |
| CLZ | Fig. 23 | B buffer is being cleared pulse | Fig. 24. |
| CON | Fig. 10 | Signal indicating Connect mode | Figs. 10, 18, 19. |
| CPO | Fig. 24 | Signal indicative of copy or search-edit operations | Figs. 8, 10, 12, 15, 18 and 20. |
| CPP | Fig. 24 | Signal enabling punching of paper tape during copy or search-edit operations. | Figs. 12, 23. |
| CPY | Fig. 24 | Pulse to initiate copy or search-edit operations | Fig. 23. |
| CPYA | Fig. 9 | Signal present during copy and search-edit operations | Fig. 24. |
| CTA to CTC | Fig. 18 | Signals determining timing periods for control characters | Fig. 17. |
| CTZ | Fig. 21 | Signal indicating block count is zero | Fig. 14. |
| DAD | Fig. 17 | Pulses representing serial bits fed to transceiver DF | Transceiver DF. |
| DCL1 and 2 | Fig. 19 | Control lines for disconnecting transceiver DF | Transceiver DF. |
| DIN | Fig. 11 | Pulses representing serial bits from transceiver DF | Fig. 8. |
| DIND | Transceiver DF | Pulses represent serial bits from transceiver DF | Fig. 11. |
| EBD | Fig. 13 | End of record signal | Figs. 9, 15, 20. |
| EBK | Fig. 14 | | Fig. 19. |
| EEA | Fig. 19 | Error count signal | Fig. 9. |
| EEB | Fig. 19 | Error count signal | Fig. 9. |
| EMA | Fig. 12 | Pulse indicating an end sentinel character | Figs. 13, 14. |
| EMP | Fig. 11 | Signal indicating A buffer AB is empty | Figs. 19, 20, 22. |
| ENA | Fig. 12 | Pulse indicating an end sentinel character | Figs. 13, 14. |
| ENBT | Fig. 10 | Pulse occurring at end of record or transmission | Fig. 10. |
| ENHB | Fig. 21 | Signal inhibiting detection of end sentinel characters during reversal of paper tape. | Fig. 13. |
| ENS | Fig. 13 | End sentinel signal which occurs at end of a record or transmission. | Figs. 15, 18, 20, 22 and 24. |
| EOB | Fig. 15 | End of record pulse | Figs. 9, 10, 15. |
| EOC | Fig. 10 | End of mode pulse | Figs. 10, 15, 19, 22. |
| EOT | Fig. 15 | End of transmission pulse | Fig. 10. |
| EOTR | Fig. 15 | End of transmission pulse at end of acknowledge mode | Figs. 9, 10, 19. |
| EPE | Fig. 12 | Pulse indicating even parity error | Fig. 22. |
| ERC | Fig. 16 | Pulse for inserting error character | Fig. 12. |
| ERR | Fig. 19 | Signal indicating error condition | Figs. 9, 15, 16, 17, 19, and 22. |
| ETD | Fig. 13 | End of transmission pulse | Figs. 15, 20. |
| ETT | Fig. 15 | End of transmission signal | Fig. 10. |
| EVEN | Fig. 9 | Pulse indicating even parity error | Fig. 22. |
| FCE | Fig. 19 | Signal indicating four consecutive errors | Fig. 9. |
| FSC | Fig. 22 | Pulse for inserting record count in B buffer BB | Fig. 12. |
| FSR | Fig. 9 | Signal for indicating fast read during copy operation, also present during search-edit operation. | Fig. 24. |
| GCL | Fig. 19 | General clear pulse | |
| GOP | Fig. 24 | Signal present during copy and search-edit operations | Fig. 20. |
| HLT | Fig. 24 | Signal for halting tape reader TR during copy operation | Figs. 8, 9, 15, 20. |
| ICE | Fig. 24 | Error character pulse | Fig. 19. |
| IDLE | Fig. 10 | Signal indicating Idle mode | Figs. 8, 10, 18, 19. |
| IEC | Fig. 16 | Control signal for inserting error character | Fig. 12. |
| IG | Fig. 16 | Pulse for inserting ignore character | Fig. 12. |
| ILB | Fig. 22 | Signal indicating time assigned to ignore last block character. | Figs. 8, 11, 16. |
| INE | Fig. 18 | End of mode pulse | Figs. 10, 15, 17, 19. |
| INH | Fig. 8 | Signal inhibiting transmission while transceiver DF is detecting carrier. | Figs. 16, 19. |
| IRF | Fig. 18 | Signal indicating time reference characters are inserted | Figs. 10, 11, 12. |
| INT | Transceiver DF | Interlock signal | Fig. 10. |
| LPA to LPG | Fig. 22 | Signals represent bits of longitudinal purity character | Fig. 17. |
| LPL | Fig. 22 | Pulse associated with record suffix characters | Fig. 8. |
| LPR | Fig. 22 | Pulse indicating longitudinal parity error | Fig. 19. |
| LPT | Fig. 22 | Signal characterizing longitudinal parity time | Figs. 10, 12, 16, 17. |
| MAL | Fig. 9 | Signal indicating the associated coupler DV is to be the master. | Fig. 10. |
| MAX | Fig. 15 | Signal indicating that the time has been reached for establishing an end of block. | Figs. 20, 21, 24. |
| MSR | Fig. 10 | Signal indicating the associated coupler DV is the master | Fig. 18. |
| ODD | Fig. 9 | Signal indicating odd parity should be checked or generated | Fig. 22. |
| ONE | Fig. 24 | Signal used during copy operation | Fig. 14. |
| ONEA | Fig. 9 | Signal used during copy operation | Fig. 24. |
| OPE | Fig. 12 | Pulse indicating odd parity erorr | Fig. 22. |
| PFPU | Fig. 20 | Pusle generated at start of paper tape movement | Fig. 23. |
| PAL | Fig. 23 | Signal permitting punching by tape punch TP | Fig. 23. |
| PDA to PDG | Fig. 23 | Signals which energize the punch magnets | Tape punch TP. |
| PDS | Fig. 23 | Signal to step paper tape to next character position | Tape punch TP. |
| PIN | Fig. 24 | Signal inhibiting punching by tape punch TP | Fig. 23. |
| PSP | Fig. 20 | Sprocket pulse for tape reader TR | Figs. 14, 19. |
| PSPU | Fig. 20 | Sprocket pulse associated with tape reader TR | Fig. 14. |
| PSS | Tape punch TP | Timing pulses from tape punch TP | Fig. 23. |
| PTA1 to PTA7 | Tape reader TR | Signals representing bits of characters read by tape reader TR. | Fig. 11. |
| PTBK | Fig. 14 | Signal for moving paper tape of tape reader TR in reverse direction. | Figs. 10, 14, 20, 21, 22 and tape reader TR. |
| PTFW | Fig. 20 | Signal for moving paper tape of tape reader TR in forward direction. | Fig. 14 and tape reader TR. |

| Signal | Source | Remarks | Used |
| --- | --- | --- | --- |
| PTS | Fig. 14 | Stop signal indicating paper tape has reached to start of a block while reversing. | Figs. 10, 14, 15, 20 and 24. |
| PTST | From tape reader TR | Sprocket signal | Fig. 20. |
| PUR1 and PUR2 | Fig. 9 | Lines which control the applying of power to tape punch TP. | Tape punch TP. |
| RBA | Fig. 14 | End of record signal during reverse reading of paper tape by tape reader TR. | Fig. 24. |
| RBD | Fig. 14 | End of record signal during reversal of paper tape at tape reader TR. | Figs. 21, 24. |
| RCV | Fig. 10 | Signal characteristic of Receive mode | Figs. 12, 15, 22 and 23. |
| RDR1, RDR2 | Fig. 9 | Lines controlling the application of power to tape reader TR. | Tape reader TR. |
| READY | Fig. 1 | Line for controlling transceiver DF | |
| REC | Fig. 18 | Signal indicating that the coupler DV is a receiver | Figs. 8, 10, 15, 17 and 19. |
| RECV | Fig. 9 | Signal establishing that the associated coupler DV is a receiver. | Fig. 18. |
| REE | Fig. 14 | Signal indicating error was sensed during Acknowledge mode. | Fig. 19. |
| REF | Fig. 15 | Signal which permits insertion of reference characters when magnetic tapes are employed as input devices. | Figs. 18, 20. |
| RIG | Fig. 24 | Signal indicating occurrence of last end sentinel character during search-edit operations. | Fig. 14. |
| ROB | Fig. 9 | Signal for reversing the paper tape in the tape reader TR one record. | Figs. 9, 14, 20 and 24. |
| RSH | Fig. 14 | Signal indicating first end of transmission character during reverse movement of paper tape. | Fig. 24 |
| RTO | Fig. 9 | Signal indicating retransmit operation in force | Figs. 14, 19, 21, 22 and 24. |
| RTD | Fig. 14 | Signal indicating last of end of transmission character during reverse of paper tape. | Figs. 15, 24. |
| RTS | Fig. 10 | Request to send signal | Figs. 8, 11, 16, and 19. |
| RTSD | Fig. 10 | Request to send signal | Transceiver DF. |
| RTT | Fig. 10 | Pulse at start of turnaround cycle | Figs. 8, 15, 18. |
| SDO | Fig. 9 | Signal indicating that receiver will receive at 100 characters per second. | Fig. 17. |
| SDR | Fig. 9 | Signal indicating that receiver will receive at 150 characters per second. | Fig. 17. |
| SDT | Fig. 9 | Signal indicating that output device at receiver is punched card apparatus. | Fig. 17. |
| SED | Fig. 24 | Signal characteristic of search-edit operation | Figs. 14, 21. |
| SPL | Fig. 22 | Sampling pulse | Figs. 12, 13, 14, 15, 16, 21, 24. |
| SPP | Fig. 24 | Signal for clearing record counter RK | Fig. 21. |
| STB | Fig. 8 | Strobe pulses | Figs. 8, 11. |
| STR | Fig. 20 | Strobe pulse for information received from tape reader TR. | Fig. 11. |
| STS | Fig. 10 | Start to send signal | Fig. 18. |
| STSD | Transceiver DF | Start to send signal from Transceiver DF | Fig. 10. |
| SYE | Fig. 8 | Synchronization error pulse | Fig. 16. |
| SYN | Fig. 8 | Signal indicating receiver is in synchronization with the transmitter. | Fig. 11. |
| TRD | Fig. 10 | Signal allowing transmission from B buffer BB | Figs. 17, 18, 22. |
| TRF | Fig. 10 | Signal forcing transmission of reference characters | Figs. 18, 20, 21. |
| TRM | Fig. 10 | Signal indicating transmit mode | Figs. 8, 10, 11, 12, 14, 15, 20, 22. |
| TRO | Fig. 9 | Time interlock signal | Fig. 18. |
| TRS | Fig. 18 | Indicates that coupler DV is the transmitter | Figs. 9, 10, 15, 17, 19, 20. |
| TRSM | Fig. 9 | Signal indicating that coupler DV is to be the transmitter | Fig. 18. |
| TRZ | Fig. 9 | Time interlock signal | Fig. 18. |
| VPE | Fig. 22 | Signal indicating vertical parity error | Figs. 16, 19. |

OVERALL SYSTEM (FIGURE 1)

Referring to FIGURE 1 the information transfer system according to the invention, is shown comprising a master station MS which is connected via conventional telephone lines TL1 and TL2 to a slave station SS. Master station MS and slave station SS are identical. The master station being designated as such because the connection between the stations was established there. Master station MS comprises a transceiver DF, a coupler DV, a tape punch TP and a tape reader TR. Slave station SS comprises an identical transceiver DF', an identical coupler DV', an identical tape punch TP', and an identical tape reader TR'.

The transceiver DF is a unit which includes a conventional hand set TEL with a talk button DF1, a data button DF2 and an automatic button DF3. The transceiver DF can either transmit or receive voice communications or a frequency modulated carrier which represents bits of information via the telephone lines TL1 and TL2. The transceiver DF, a standard piece of apparatus of the American Telephone and Telegraph Company, called a Dataphone, a subset 202A, is hereinafter more fully described in the Appendix. For the present description, the following is necessary:

Information in the form of serially occurring electrical pulses is transferred from the transceiver DF via the DIND signal line to the coupler DV, and at other times, information in the form of serially occurring electrical pulses is transferred via the DAD signal lines from the coupler DV to the transceiver DF. A control signal of relatively long time duration is fed from the coupler DV via the RTSD signal line to the transceiver DF. Control signals as voltages of relatively long time duration are sent from the transceiver DF via the INT, STSD and CAD signal lines to the coupler DV. The lines DCL1 and DCL 2 are leads of a normally closed holding circuit in the transceiver DF which are controllably open circuited by the coupler DV. The transceiver DF when in automatic operation, i.e. with the automatic button DF3 pressed, can automatically activate the coupler DV when a ringing signal is received from the line.

The tape reader TR which is here employed to represent a typical input device is a two-speed photoelectric tape reader which can move tape either in the forward or reverse direction. Although many tape readers may be used, it is desirable to use the tape reader of the Digitronics Corporation which is hereinafter more fully described in the Appendix. For the immediate discussion it is only necessary to know that:

(a) A direct current signal on the line PTFW will move paper tape in the forward direction at a first speed;

(b) During the presence of the signal on line PTFW a direct current signal on line CHR will cause the paper tape to move at a faster speed;

(c) A direct current signal on line PTBK will move paper tape in the reverse direction at the first speed;

(d) Characters of information are transferred from the paper tape reader as a parallel combination of signals on the lines PTA1 to PTA7 to the coupler DV;

(e) A sprocket signal on the line PTST is fed in parallel with the signals on lines PTA1 to PTA7 to permit reliable sampling of the signals representing the characters by the coupler DV; and (f) It includes an on-off switch TP1 for power, with said switch being connected serially to a source of power via RDR lines.

The tape punch TP, an exemplary output device for the system, is a conventional paper tape punch such as the punch manufactured by the Teletype Corporation and is hereinafter more fully described in the Appendix. Presently, it is sufficient to know that:

(a) Periodically occurring signals on line PSS are fed from tape punch TP to the coupler DV to indicate when tape punch TP is ready to receive a character for punching;

(b) Characters are fed from coupler DV as a coded combination of parallel electrical signals on lines PDA to PDH to the tape punch TP;

(c) An electrical signal is fed from coupler DV via line PDS to tape punch TP in parallel with the signals on lines PDA to PDH to step the paper tape to the next character position; and (d) It includes an on-off switch TR1 for power with the switch being serially connected to a source of power via PUR signal lines.

The coupler DV serves as a coupling device between the transceiver DF and either the tape reader TR or the tape punch TP. When the tape reader TR serves as an input device at one of the stations, the coupler DV accepts characters whose bits are in parallel and transfers these characters with their bits in series to the transceiver DF. When the coupler DV is at a receiving station, information is received bits-in-series from the transceiver DF and transmitted with the bits of the characters in parallel to the tape punch TP. There are means included in the couplers DV and DV' to insure that the coupler which is at the receiving station is in synchronization with the coupler at the transmitting station. Furthermore, the coupler DV generates control signals, which when received by the coupler DV' prepares it for the transmission or reception of information. Similarly, the coupler DV' returns control signals to prepare the coupler DV for complementary functions. In other words, the couplers DV and DV' generate control signals which prepare them for different types of information transfer modes. In addition, the coupler DV and its mate, coupler DV', include many error detecting and checking circuits which insure maximum reliability of information transfer and which will interrupt communication between the two stations whenever it is found that the telephone lines TL1 and TL2 are undesirable for reliable information transfer. In addition, a single coupler DV can operate in off-line operation with its associated tape punch TP and tape reader TR to edit received information and create an error free copy of the received information.

In the overall description of the information transfer system, it will be assumed that initially the power is applied to all units of both the master station MS and the slave station SS. However, the tape punches TP and TP' and tape readers TR and TR' are not energized. Their actual energization is hereinafter more fully described. Furthermore, it will also be assumed that the paper tape punch TP, the paper tape reader TR and their related units in the slave station SS, that is, the paper punch TP' and the tape reader TR' are completely loaded with paper tape. In addition, solely to facilitate the explanation of the system, it will be assumed that the slave station SS is to act as a transmitter whereas the master station MS is to act as a receiver. Accordingly, the switch SW2 of the coupler DV at the master station MS is placed in the receive position. It should be noted that it is equally convenient for the master station MS to act as a transmitter, that is, to send information to the slave station SS which acts as a receiver.

In addition, since the master station MS is to act as a receiver, the switch SW7 will be positioned to the particular receiving speed of the tape punch TP. That is, if the tape punch TP is capable of receiving information, say at a hundred characters per second, this switch will be accordingly placed in a position to indicate that reception will take place at a hundred characters per second. If the tape punch TP is capable of receiving at one hundred and fifty characters per second the speed switch SW7 will be accordingly placed in an appropriate position. Since there will be described a system which permits the retransmission of data by the slave station SS whenever an error in the data received by the matser station MS is detected, the retransmit switches SW16 and SW16' on both couplers DV and DV' are thrown to the appropriate positions. In addition, since there will be checking parity of the information that is transferred the check switches SW11 and SW11' of both couplers DV and DV', respectively are activated, and since the parity must be even or odd, the switch SW12 and the switch SW12' are placed either in the even or odd position, dependent on the parity of the information which is to be transmitted.

During attended operation, the operator at the master station depresses the talk button DF1 on the transceiver DF, raises the receiver of the associated telephone TEL and dials the telephone number of the slave station SS. He also turns on power in the tape punch TP by placing switch TP1 to the on position. When the operator at the slave station SS hears the usual ringing signal he raises the receiver TE' which is in the talk DF1' position. The operator at the master station MS may give the operator at the slave station SS verbal orders indicating that if the slave station SS is to be a receiver the speed switch SW7' is in the correct position. At this time, the operator at the master staion MS will also tell the operator at the slave station SS that the should push the clear button SW3' in the coupler DV' as well as the counter reset COR' button in the mechanical counter CO'. Then the operator at the slave station SS pushes the data button DF2' on the transceiver DF' and leaves the receiver off the cradle of the telephone TEL'. Since the slave station SS is to be the transmitter, its operator puts the switch TR1' to the on position for the tape reader TR'. After the operator at the master station MS hears a click when the operator at the slave station SS depresses the data button DF2', the master station's operator presses the clear push button SW3 of the coupler DV; places the receiver next to the telephone TEL and pushes data button DF2 on the telephone TEL, pushes the start switch SW1 of the coupler DV and the system proceeds completely independent of any further interference by either operator.

During unattended operation, i.e., there is no operator at the slave station SS, the initial setting up operation is simplified. At the slave station SS, it is only necessary that the automatic button DF3' of the telephone TEL' be depressed and that the unattended switch SW17' be in the unattended position. At the master station MS, the conditions are the same as for attended operations.

During unattended operation, the operator at the master station MS dials the number of slave station SS. When the ringing circuit of the transceiver DF' has received the second ring the slave station SS is energized and the ring stops. In particular, when the ringing takes place, a signal on the RING-1 signal line activates the coupler DV'. At this time, the operator at the master station MS proceeds in the same way as in attended operation.

Up until this time, both the coupler DV and the coupler DV' are in the Idle mode. However, when the start switch SW1 is pushed, the coupler DV will enter the Bid mode and the coupler DV' remains in the Idle mode. In response to the pressing of the start button DF2, the transceiver DF sends back an interlock INT signal which causes the coupler DV to go into the Bid mode. Coupler DV then transmits an RTSD signal via the terminal C4 to the transceiver DF which in response to this "request to send signal" RTSD transmits approximately two hundred milliseconds of carrier on the telephone lines TL1 and TL2 to perform echo-suppression. Following this two hundred millisecond interval, transceiver DF transmits via the terminal C5 a "start to send" signal STSD to coupler DV. For four hundred milliseconds, coupler DV transmits reference characters via the DAD signal line to the terminal C2 of the transceiver DF'. These reference characters are transmitted to the slave station SS to establish both bit synchronization and character synchronization between the coupler DV and coupler DV'. Following the reference characters, a single character is transmitted which instructs the coupler DV' that it is to be either a transmitter or a receiver, and if it is to be a transmitter, that it should transmit at a specific rate. Table 1 above lists these characters. In the present example, coupler DV' is to be a transmitter. At this point, a path is closed between RDR signal lines in the coupler DV' energizing the tape reader TR'.

Following the transmission of this character, another single character, the end of mode character (see Table 1) is transmitted to the coupler DV'. When this character is generated by the coupler DV, it enters the Connect mode. When this end of mode character is received by the coupler DV', it enters the Allow mode. In the Connect mode the coupler DV of the master station MS will act as a receiver and the coupler DV' of the slave station SS will act as a transmitter. This is the start of a turnaround period and the coupler DV' sends a "request to send" signal RTSD to the transceiver DF' which then transmits approximately two hundred millisecond of carrier along the lines TL1 and TL2 to perform an echo-suppression operation. Following the two hundred milliseconds of echo-suppression, the transceiver DF' sends a start to send signal STSD from the terminal C5' to the coupler DV' which transmits via the line DAD to the terminal C2' of the transceiver DF' approximately four hundred milliseconds of reference characters so that the coupler DV' forces the coupler DV to come into synchronization. The four hundred milliseconds of reference characters are followed by a first control character on the line DAD which indicates whether the coupler DV is to be a transmitter or a receiver.

It should be noted that the coupler DV was initially preset to be a transmitter or a receiver. Hence, if the first control character returned does not indicate that the coupler DV is to be what it was initially set at, then the coupler DV senses a connect error for disconnecting the transceiver DF from the transceiver DF'. This is provided so that when the telephone line between the two stations is noisy or unreliable then the stations do not remain on the line and waste time and money. In such a case, the operator at the master station MS will again initiate the operation. In the case under discussion, coupler DV' should send back a receive character.

Following the transmission of the receive character, coupler DV' then transmits a second control character, the end of mode character. When the end of mode character is generated by the coupler DV' it then assumes either the Transmit or the Receive mode in accordance with the previously received first control character which had instructed it in what role it should assume (for the present example, the Transmit mode). Similarly, when the end of mode character is received by the coupler DV, assuming there was no connect error, coupler DV assumes the role to which it was designated in accordance with the positioning of the receiver-transmit switch SW2. If it so happens that the master station MS is to be a transmitter, then it is again necessary to initiate a turnaround period. However, for the sake of simplicity, it has been assumed that the slave station SS is to transmit information to the master station MS. Since the coupler DV' of the slave station SS has been transmitting, it is not necessary to go in to this turnaround period.

Coupler DV', accordingly, sends a signal PTFW to the tape reader TR' to start it transmitting the characters via the lines PTA1 to PTA7 along with a sprocket pulse on the line PTST, to the coupler DV'. It should be noted that if the tape reader TR' is to transmit at one hundred characters per second, no further controls are required. However, if the tape reader TR' is to transmit at one hundred and fifty characters per second, a signal will be fed via the CHR line to tape reader TR'. Each character is received with its bits-in-parallel, converted in coupler DV' to a serial representation and fed via the line DAD to transceiver DF'. The character is then fed from transceiver DF' via telephone lines TL1 and TL2 to the transceiver DF, and via the DIND signal line to coupler DV (while the transceiver DF is receiving information, it transmits a signal on the CAD line which prevents any possible spurious transmissions by coupler DV).

The character is received by coupler DV and converted into a bits-in-parallel representation. In response to sprocket pulses from tape punch TP on the lines PSS, the bits of the character are transmitted as electrical signals on the lines PDA to PDH to tape punch TP. Along with the character, a signal PDS is fed to tape punch TP to step the tape one character space. (It should be noted that throughout the specification, the signal on the line and the reference number for the line are used interchangeably.)

In this manner, characters are received bits-in-parallel from tape reader TR' via the lines PTA1 to PTA7 by the coupler DV' and are fed bits-in-series via the line DAD to the transceiver DF' which converts the voltage pulse representation of these bits to a shift frequency representation that are transferred via the telephone lines TL1 and TL2 to the transceiver DF, where they are reconverted to a voltage pulse representation and fed via the line DIND to the coupler DV. The coupler DV then transforms these serial bits of the character into a group of parallel bits that are fed in parallel on the lines PDA to PDH to the punch TP.

This type of transmission continues until coupler DV' receives end of record characters (see Table 2) from the tape reader TR' which cause tape reader TR' to stop.

It should be noted that during the transmission of information, each of the couplers DV and DV' also records a count of the characters transmitted and when this count reaches a particular value, circuits are alerted which when the end of record characters are sensed in both couplers DV and DV', independently cause the start of an Acknowledge mode in each station. For the sake of improved teaching, it will be assumed that this count has not been reached and therefore after the end of record characters for this record are detected, nothing further happens except that the tape reader TR' starts and transmits the next record of information. Assume during the transmission of this second record the above-mentioned count is reached. An end of block has accordingly been reached. Therefore, at the end of this record, tape reader TR' is again stopped. However, because the end of a block has been reached the Acknowledge mode begins.

In the Acknowledge mode, the slave station SS assumes the role of a receiver and the master station MS, that of a transmitter. Therefore, since these stations are interchanging roles, there is a turnaround cycle. In this case, coupler DV' remains passive and coupler DV of the master station MS transmits a "request to send signal" on the RTSD line to the transceiver DF which then generates approximately two hundred milliseconds of carrier to suppress echoes on the lines TL1 and TL2. Following this two hundred millisecond period, transceiver DF then sends a "start to send signal" via the STSD line to coupler DV which begins transmitting approximately four hundred milliseconds of reference characters along the DAD line. Following these four hundred milliseconds of reference characters, coupler DV may transmit a first control character, an error character (see Table 1) if it has detected an error in the information received up to this point. It will be assumed for the present, that no error was detected. Following first control character time, a second control character, an end of mode character, is transmitted via the DAD line to transceiver DF. Coupler DV then returns to the Receive mode. When the end of mode character is received by coupler DV′ it returns to the Transmit mode. The tape reader TR′ is reenergized by the PTFW signal and the characters therefrom are transmitted as previously described.

If however coupler DV had detected an error and transmitted the error character, coupler DV would still switch to the Receive mode but coupler DV′ would enter the Retransmit mode. In particular, coupler DV′ would transmit a signal PTBK to tape reader TR′ causing it to back up to the start of the information that it has transmitted, i.e., to the start of the block. When it reaches this point, the tape reader TR′ again moves forward and coupler DV′ assumes the Transmit mode and the information is retransmitted. It should be noted that during the backing of the tape reader TR′ a turnaround period is performed.

Finally, the tape reader TR′ transmits the end of transmission characters, which when received at the coupler DV′ and the coupler DV initiate a final Acknowledge mode. At the end of this Acknowledge mode, if no error has been detected by coupler DV, coupler DV′ interrupts the internal connection of the lines DCL1′ and DCL2′ to disconnect transceiver DF′ and similarly coupler DV interrupts lines DCL1 and DCL2 of transceiver DF causing the disconnection of the stations from the telephone line. If, during this last Acknowledge mode an error had been detected by coupler DV, there would be the initiation of another Retransmit mode but provided there was no error, the above-described disconnect procedure would follow.

Incorporated in each of the couplers DV and DV′ is error-detection circuitry which permits a disconnect when a plurality of successive errors are detected. For example, if an error is detected at the end of an Acknowledge mode causing the initiation of a Retransmit mode and, after the retransmission, the following Acknowledge mode again indicates an error and this occurs four consecutive times, there will be an automatic disconnect so that the stations go off the line and stop paying toll charges for an unreliable telephone line.

Whenever the disconnect occurs, both stations revert to the Idle mode, awaiting the establishment of a new connection to the operator at the master station MS.

GENERAL DESCRIPTION OF THE BLOCKS OF THE SYSTEM

The timer TM provides the basic timing pulses for the coupler DV and comprises a strobe pulse generator which supplies the strobing pulses of four microsecond duration by which the bits of information are sampled during transmission, reception and the search-edit operations. It also includes a character bit generator which generates periodically and sequentially occurring pulses, each of four microsecond duration, which are indicative of particular bits of the characters. It further includes a synchronization detector to detect whether the timer TM of one coupler is in synchronization with the timer TM of the other coupler, and also an inhibit generator which prevents the possible erroneous sampling of information during a turnaround cycle.

The control panel CP comprises primarily a plurality of switches whose purpose is to initially set the coupler DV to particular modes of operation. Control panel CP also includes a mechanical counter which counts the number of records transmitted and received. It also prints a number on a paper tape indicative of a particular record which contains erroneous information.

The A buffer AB comprises generally seven one-bit storage units for receiving the bits of a character from one of two sources and for transmitting these bits in parallel, one character time later to the B buffer BB. The bits of the character are received serially from the transceiver DF when the coupler DV is operating as a receiver and converts these bits of the character to a parallel representation. When the coupler DV is acting as a transmitter or during the search-edit operation, the bits of the character are received in parallel from the tape reader TR and are fed one character time later in parallel to the B buffer BB.

The B buffer BB generally accepts the bits of the character in parallel from the A buffer AB and transmits these bits in parallel to either the serializer SZ or to the C buffer CB. The B buffer BB comprises seven one-bits storage units which are similar to the bits storage units of the A buffer AB, except that they include controls which regulate the times at which information may be accepted by the B buffer BB. Also included in the B buffer BB is means for detecting end sentinel characters and also a parity checker to indicate the transverse parity of the character presently contained in the B buffer BB.

The end circuitry ED receives the end sentinel characters from the B buffer BB and determines whether they occur in a particular order to indicate whether an end of a record has been reached or whether the end of tansmission has been reached. It should be noted that the particular combinations of three end sentinel characters, serially following each other is unique for the end of the record, and another particular combination is unique for the end transmission. It is the function of the end circuitry ED to test for these unique combinations and give an indication whenever such a combination is detected.

The retransmit controls RT perform the function of sensing for the receipt of an error signal during the Acknowledge mode from the receiver to initiate a Retransmit mode. The retransmit controls RT then generate signals causing the paper tape of the tape reader TR, at the transmitter, to back up to the start of the record and to initiate a reversal of tape movement and a retransmission of the data of the block.

During the Receive and Transmit modes the acknowledge mode control AK counts the number of characters handled and when a predetermined count is reached, alerts circuitry to sense for the end of the block being handled. When the end of the block is reached, signals are generated which result in the initiation of the Acknowledge mode. Since the Acknowledge mode may also be initiated by the end of transmission characters, the acknowledge mode control AK also includes circuitry for sensing the occurrence of these particular end sentinel characters. At the end of an Acknowledge mode associated with the end of transmission characters, if the transmission has been error free the acknowledge mode control AK will generate a signal initiating the sequence which ends with the stations being disconnected from the telephone lines. At the end of other Acknowledge modes, during which there has been an error free transmission, the transmission of the next block begins.

The ignore and insert circuits II, generate an error character whenever a vertical parity error is detected and also generate an ignore record character whenever an error is detected in a record.

The serializer SZ has a primary function of receiving the bits of the characters from the B buffer BB in parallel and transmitting these bits in a serial manner to the transceiver DF. It also includes circuitry for generating certain control characters such as the end of mode character or the error control character which is used during the Acknowledge mode.

The function assignor FA has two main functions. It generates control signals, indicating whether the associated coupler DV is to operate as a transmitter or as a receiver. A second function is to generate, at the coupler DV or DV′ which is finishing a turnaround cycle, the time periods for the first and second control characters and to generate the signal for the second control character which is used internally within the coupler DV or DV′ to indicate the end of the mode.

The error and clear circuitry EC has the first function of recording the fact that an error has occurred and the second function to disconnect the transceiver DF from the telephone lines under certain conditions such as at the end of transmission or when the lines cause the generation of excessive errors.

The reader controls RC perform the functions of controlling the forward movement of the paper tape in the tape reader TR and to generate strobe pulses from the sprocket pulses received from the tape reader TR.

The record counter RK counts the records in a block during transmission so that if a retransmission is called for and the tape reversed, an indication may be given when the start of the block is reached. It also counts records in a block so that if a character is sensed which indicates that the block is to be ignored because of an error, it permits the generation of a character that represents a record count which is inserted after the ignore character so that during a search-edit operation it is known how many records to skip over.

The parity circuitry PC checks the longitudinal and vertical or transverse parity. It also accumulates the longitudinal parity count for the records. The parity circuitry PC further generates signals characteristic of the transmission time of certain suffix characters at the end of a record.

The C buffer CB accepts the bits of a character in parallel from the B buffer BB and transfers them in parallel to the tape punch TP under the control of timing signals from the tape punch TP during the Receive mode or during the search-edit operation.

The search-edit circuitry SE is used to control the deletion of characters and blocks during a search-edit operation.

THE BID AND CONNECT MODES OF THE MASTER STATION MS (FIGURE 2)

Figure 2:
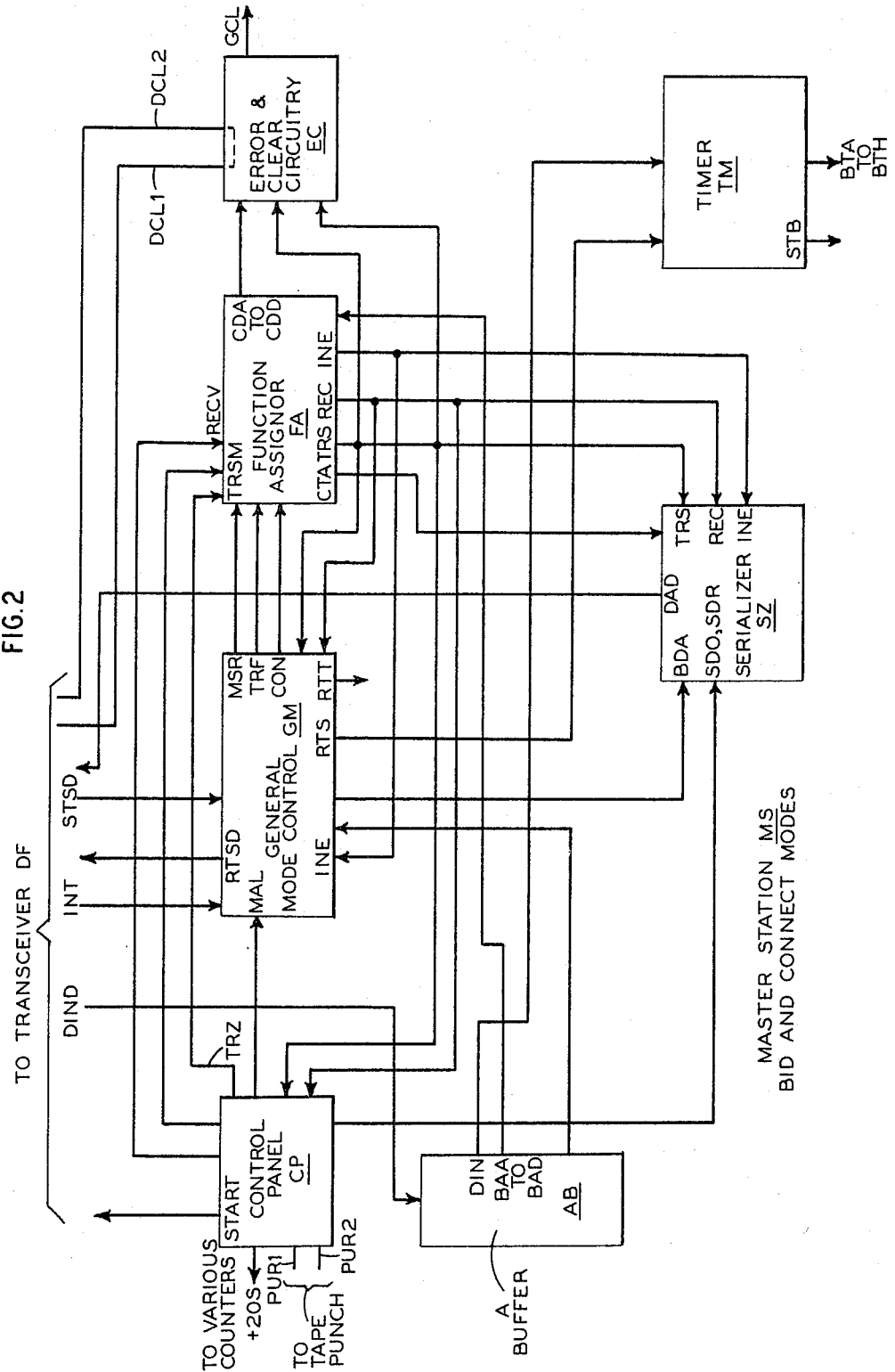
FIGURE 2 shows the flow of signals between the various units of the master station during the Bid and Connect modes.
Figure 3:
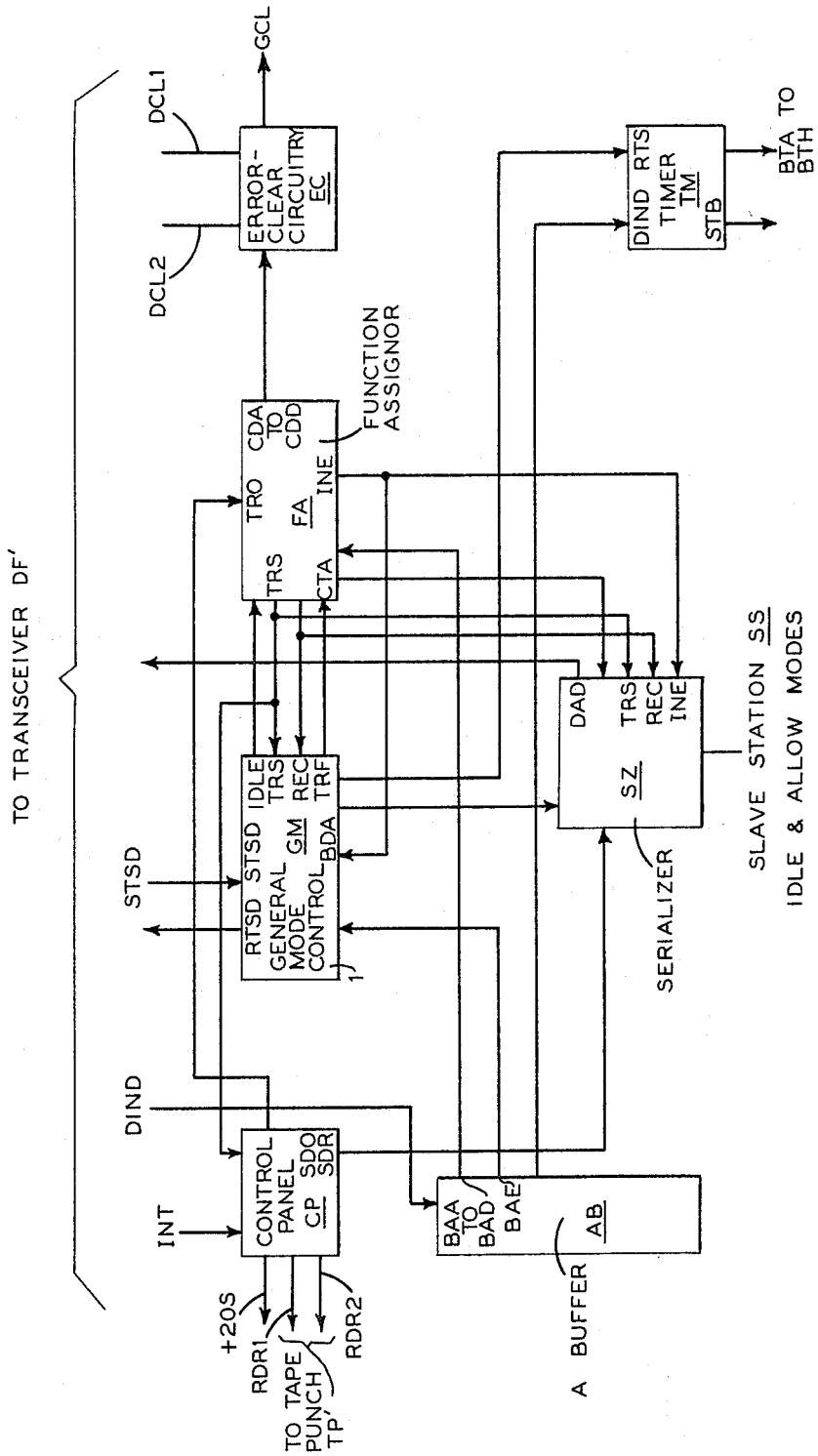
FIGURE 3 shows the signal flow between the pertinent units of the slave station during the Idle and Allow modes.

Referring to FIGURE 2, there is shown the particular units of the system pertinent for the discussion of the Bid and Connect modes of the master station MS. Several switches on the coupler DV are initially positioned. In particular, the switch SW2 (see FIG. 1) is put in either the receive or the transmit position, depending on whether the master station MS is to act as a transmitter or as a receiver. If the master station MS is to act as a receiver, it is also necessary to position the speed switch SW7 to the receiving rate of the associated paper tape punch TP. The retransmit switch SW16 will be placed in the retransmit position if a retransmission of data received in error is desired. If parity is to be checked then switch SW11 is placed in the check position, and depending on the type of parity expected the even-odd switch SW12 is put in the appropriate position. The unattended switch SW17 is placed in the unattend position. Finally, the clear switch SW3 is actuated followed by the depression of the start switch SW1. Returning now to FIGURE 2, the actuation of the clear switch SW3 causes the generation of the +20S signal which is fed throughout the system to reset various counters and flip-flops. The start switch SW1 causes the transmission of the START signal to the transceiver DF, as previously described. Accordingly, the transceiver DF, in response, sends back an INT signal to general mode control GM to unlock the coupler DV. At the same time, the depression of the start switch SW1 causes the generation of the MAL signal which is fed to the general mode control GM. The INT signal and the MAL signal cooperate in the general mode control GM to cause the generation of the MSR signal which is characteristic of the master station. The MSR signal is fed to the function assignor FA where it cooperates with either the TRSM or the RECV signals from the receive-transmit switch SW2 of the control panel CP. In other words, if the receive-transmit switch SW2 is in the transmit position, then a TRSM signal is received at the function assignor FA; whereas if the switch is in the receive position then the RECV signal is received at the function assignor FA. It should be noted that these two signals are mutually exclusive; only one can be present at a time. If the TRSM signal is present then the function assignor FA will start gnerating the TRS signal. If the RECV signal is present the function assignor will then generate the REC signal. These signals are also mutually exclusive and whichever one appears will remain until the end of transmission, to form a permanent memory for the transfer mode of the master station. That is, whether it is to be a transmitter or a receiver. In the example cited, the REC signal will be generated which cooperates with a signal from the unattended switch SW17 in control panel CP to generate a TRZ signal that is fed to function assignor FA which acts as a time interlock to prolong the generation of reference characters for a given period of time until it is certain that the tape punch TP is up to speed. The tape punch TP is energized, at the same time, by the closing of a circuit between the PUR1 and PUR2 lines. In the tape punch TP, the PUR1 line is connected to the source of power and the PUR2 line is connected to the power on-off switch TP1 which is close circuited.

Contemporary with the generation of the MSR signal and responsive to that signal, the BID and BDA signals are generated within the general mode control GM, indicating the start of the Bid mode. The occurrence of the BDA signal causes the generation within the general mode control GM of the RTS and RTSD signals in addition to the RTT signal. The RTS signal is fed to the timer TM to ensure that all timing signals generated are derived from an internal clock which is driven by a tuning fork oscillator. The RTT signal is fed to various units of the system to clear specific counters. The RTSD signal is fed to the transceiver DF to cause the generation of approximately two hundred milliseconds of carrier for echo suppression. Following a two hundred millisecond delay, the transceiver DF sends back an STSD signal to the general mode control GM causing the generation of a four hundred millisecond time interval during which a TRF signal is generated and reference characters are transmitted via the DAD signal line from the serializer SZ to the transceiver DF. At the end of the four hundred millisecond period the TRF signal disappears and in its disappearance causes the generation of a CTA signal in the function assignor FA provided the time interlock period measured by the TRZ signal is over. The CTA signal is characteristic of the period for a first control character. The first control character is primarily concerned with setting up transfer modes. That is, in particular, if the master station MS is to be a transmitter, then the transfer control character will be a character indicating that the slave station SS is to be a receiver. If the master station MS is to be a receiver, then the transfer mode character will indicate that the slave station SS is to be a transmitter and will also indicate what its transmission rate should be (see Table 1). Accordingly, the CTA signal is fed to the serializer SZ where it cooperates during the Bid mode with a BDA signal and either the TRS or REC signals to indicate whether the slave station SS is to act as a transmitter or a receiver. In addition, if the slave station SS is to be a transmitter, the CTA signal cooperates with the REC signal and either the SDO signal or the SDR signal from the speed control switch SW7 of control panel CP to indicate the transmission rate for the slave station.

After the first control character is transmitted, a second control character is generated by the function assignor FA and is characterized by the INE signal which indicates the end of a mode. The INE signal is fed to the serializer SZ for transmission to the slave station SS to cause it to leave the Idle mode and start the Allow mode. The INE signal is also fed to the general mode control GM where it causes the termination of the BID and BDA signals ending the Bid mode. It should be noted that when the BDA signal terminates, the RTS signal also terminates and the clock of the timer TM is placed in a free running mode which will be forced to follow the timing rate of signals from the slave station SS. With the termination of the Bid mode by the INE signal the Connect mode begins with the generation of the CON signal by the general mode control GM. The master station MS now waits for the turnaround cycle to be accomplished. That is, for the slave station SS to switch from a receiver to a transmitter. It should be noted that whenever the roles of the master station MS and slave station SS change, there is always this turnaround period. After approximately two hundred milliseconds, the master station MS starts receiving reference characters from the slave station SS. These reference characters are transmitted by the transceiver DF to the A buffer AB via the DIND signal line and from the A buffer AB they are transmitted as DIND signals to the timer TM. It should be recalled that the reference character is the character 10000000. These characters, when received by the timer TM, force the timer TM into bit and character synchronization with the clock of the timer TM at the slave station SS. Following the reception of four hundred milliseconds of these reference characters, a first control character, the transfer mode control character is received on the DIND signal line. This transfer mode control character should be the functional complement of the transfer mode control signal that had been sent out by the master station MS to the slave station SS. That is, if the master station MS had sent out a signal indicating that the slave station SS was a receiver, it should receive back a character indicating that the master station MS is a transmitter and should indicate the transmission rate. If the master station MS had sent out a signal indicating that the slave station SS should be a transmitter, the received control character should indicate that the master station MS is to be a receiver.

In any event, this character is fed via the BAA to BAD signal lines to the function assignor FA. The character is decoded therein, causing the generation of a combination of CDA to CDD signals. In addition, this combination of signals causes the generation of either the TRS or the REC signals. It should be noted that if the master station MS was a transmitter then the TRS signal would still be present and if there has been no error then the coded combination should also cause the regeneration of the TRS signal. Similarly for the REC signal. However, if the TRS signal had been present and the coded combination causes the generation of the REC signal then there is a conflict, for the master station then must be both a transmitter and a receiver. This indicates that there was an error in the information being transmitted between the two stations. In order to detect this error, the TRS and REC signals are fed to the error and clear circuitry EC and, if they are simultaneously present, a GCL signal is generated which initially clears the coupler DV and also causes the interruption of a circuit between the DCL1 and DCL2 signal lines which cause the disconnection of the transceiver DF from the telephone lines TL1 and TL2. The CDA to CDD signals are also fed to the error and clear circuitry EC where they are tested to determine whether there is a conflict in transmission rates and if there is such a conflict the above described connect-error is detected and the transceiver DF is disconnected from the lines TL1 and TL2.

However, if there is no such connect-error, the second control character is received on the DIND signal line. This character indicates the end of a mode and is fed as the BAE signal to the general mode control GM where it terminates the CON signal indicating the end of the Connect mode. At this instant, either the TRS or REC signal is present and the termination of the CON signal with either the REC signal or the TRS signal causes the initiation of the Receive or Transmit mode respectively. In the example cited the Receive mode is initiated.

IDLE AND ALLOW MODES OF THE
SLAVE STATION SS (FIGURE 3)

At the slave station SS, the same switches are energized on the control panel CP of the coupler DV' as has previously been described for the master station MS with the exception that the start switch SW1' and the receive-transmit switch SW2' are not operated, but the clear switch SW3' is operated. The +20S signal is fed to the various counters and flip-flops throughout the system for initial clearing, and in particular, this signal when received in the general mode control GM sets the idle flip-flop causing the generation of the idle signal which is characteristic of the Idle mode. During this mode the slave station SS is completely passive and receives characters from the master station MS which is at this time in the Bid mode. In particular, the reference characters transmitted at the beginning of the Bid mode of the master station MS are received from the transceiver DF' via the DIND signal line by the A buffer AB and then transferred via the DIN signal line to the timer TM to constrain timer TM to operate in bit and character synchronization with the timer TM of the coupler DV at the master station MS.

Following the reference characters, a first control character is received. This first control character is the transfer mode character. The character is transferred via the DIND signal line to the A buffer AB where it is converted to a parallel combination of BAA to BAD signals which are fed to the function assignor FA where they cooperate with the idle signal to generate a coded combination of CDA to CDD signals which indicate whether the slave station SS is to be a transmitter or a receiver. If the coded combination indicates that the slave station SS is to be a transmitter, for the cited example, then the TRS signal is generated. The TRS signal is fed to the control panel CP where it cooperates with a signal generated by the unattended switch SW17 to generate a TRO signal that is fed to function assignor FA to provide a time interlock until it is certain that the tape reader TR' is energized. At the same time, the TRS signal and the signal from switch SW17 close a circuit between the RDR1 and RDR2 lines to energize tape reader TR. The end of line RDR1 in tape reader TR' is connected to the source of power, the end of line RDR2 in tape reader TR is connected to switch TP1' which is close circuited. If however, the slave station SS is to be a receiver, then the coded combination will cause the generation of the REC signal. The CDA to CDD signals are also fed to the error and clear circuitry EC which detects for certain disallowed combinations, which if present, indicate an error in the reception of the information and the disconnect procedure as described with respect to FIGURE 2 takes over.

If however, no such error condition is detected, the second control character is received to indicate the end of the mode. This character is transmitted as a BAE signal to the general mode control GM where it causes the resetting of the idle flip-flop causing the termination of the IDLE signal and the setting of the allow flip-flop causing the generation of the ALL signal which in turn causes the generation of the BDA signal. The BDA signal performs substantially the same role it performed in the description of FIGURE 2. That is, it causes: the generation of the RTT signal which resets certain counters and flip-flops throughout the system; the generation of the RTS signal which is fed to the timer TM so that the timer now becomes under the control of an internal tuning fork oscillator; and the RTSD signal which initiates the turnaround-cycle. The RTSD signal is fed to the transceiver DF' which now transmits approximately two hundred milliseconds of carrier and then sends an STSD signal to the general mode control GM causing the regeneration of the TRF signal which lasts for four hundred milliseconds during which time reference characters are transmitted from the serializer SZ via the DAD signal line to the transceiver DF' for transmission to the master station MS for forcing the coupler DV at the master station MS to fall into synchronization with the timer TM of the slave station SS. At the end of this four hundred millisecond period the TRF signal terminates, causing the generation of the CTA signal which is indicative of the first control character, provided the time interval established by the TRO signal is over. This first control character is associated with a transfer mode character and should be the complement of the transfer mode character received by the slave station SS. That is, if the slave station SS was to be a transmitter, then at this time it will send back a signal to the master station MS, indicating that it should be a receiver and vice versa. Accordingly, the CTA signal cooperates with the BDA and either the TRS or REC signals in the serializer SZ to transfer the transfer mode character via the DAD signal line to the transceiver DF'. For the example cited the TRS signal will be present.

Following the transmission of the first control character, the INE signal, representative of the second control character which indicates the end of a mode, is transmitted to the serializer SZ for transmission to the master station MS to cause it to terminate the Connect mode. The INE signal is also fed to the general mode control GM to terminate the Allow mode by the resetting of the allow flip-flop. The resetting of the allow flip-flop in cooperating with either the TRS or REC signal (these being mutually exclusive) initiates either the Transmit mode or the Receive mode for the slave station SS. For the example cited, the Transmit mode will be initiated.

Figure 4:
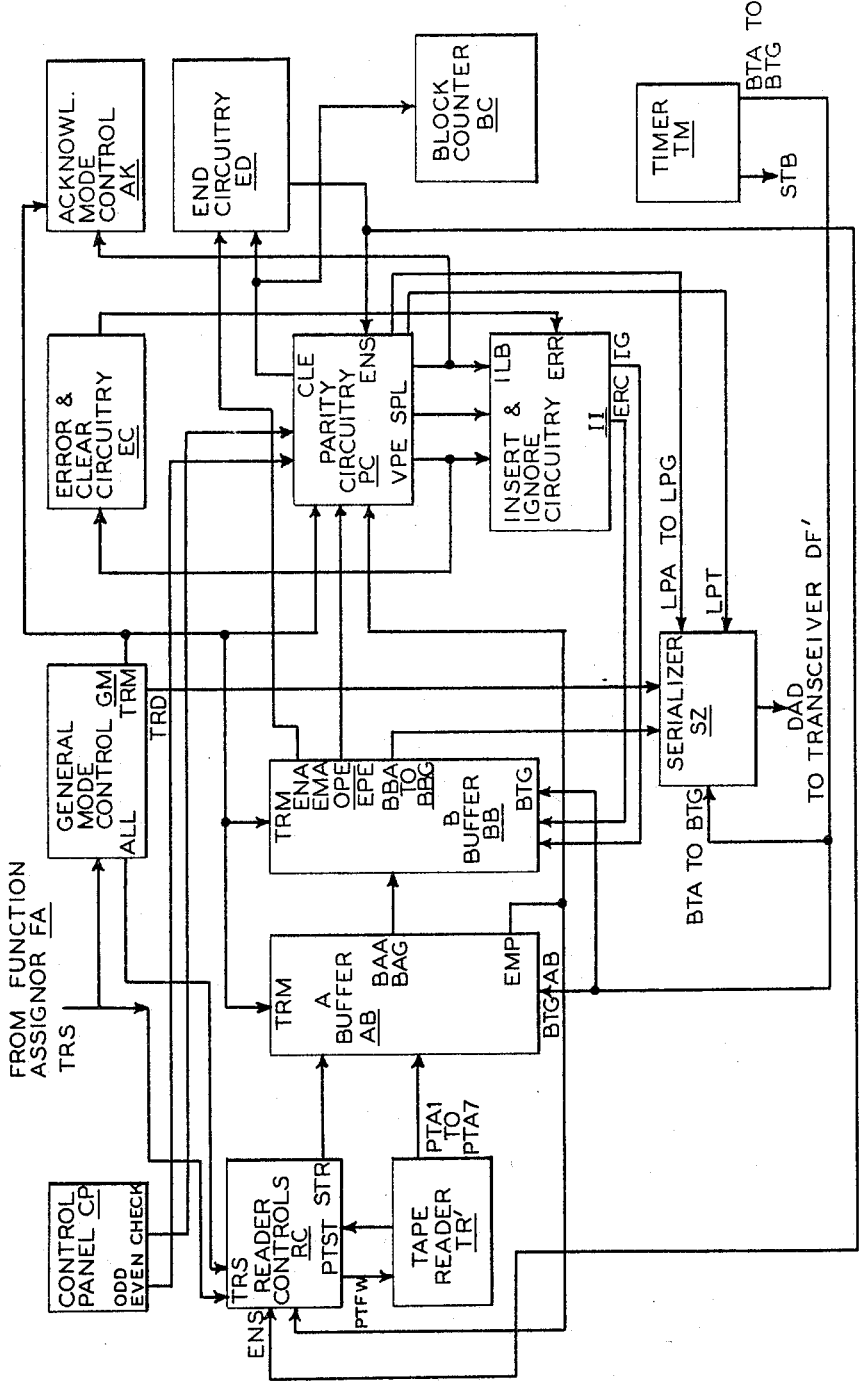
FIGURES 4 and 5 show, for the Transmit mode, signal flow between the units involved.

TRANSMITTER.—TRANSMIT MODE; PARITY CHECK INSERTION OF IGNORE CHARACTERS, AND END OF BLOCK DETECTION (FIGURE 4)

Once the Connect mode at the master station MS and the Allow mode at the slave station SS terminate, the stations are essentially identical except that one of the stations enters the Transmit mode and the other station the Receive mode. Figure 4 shows the slave station SS in the Transmit mode. It should be recalled that whichever station was to be the transmitter, ended its previous mode with the function assignor FA still generating the signal TRS. In addition, it should be recalled that when the master station MS and the slave station SS were initially set up, several switches on the control panel CP were thrown to particular positions. Some of these switches have been described in the previous sections. In this section it is necessary to take into account two more of these switches; namely, the odd-even switch SW12 and the check switch SW11 (see FIG. 1). The odd-even switch SW12 indicates whether the system will check for odd or even parity. The check switch SW11 indicates that there will be a parity check. With the check switch SW11 thrown, a CHECK signal is fed to the parity circuit PC and depending on the position of the odd-even switch SW12, an odd or an even signal will also be sent to the parity circuit PC.

Since it has been assumed that the slave station SS is to be the transmitter, it is not necessary to enter a turnaround cycle and slave station SS can immediately start transmitting data to master station MS. In fact, when the Allow mode ended, the termination of the ALL signal in the general mode control GM, where it cooperates with the TRS signal, causes the generation of the TRM signal that is characteristic of the transmit mode. Also, the termination of ALL signal cooperates with the TRS signal in the reader controls RC to generate the PTFW signal which starts the paper tape of the tape reader TR' moving in the forward direction. The TRM signal, at the same time, is fed to the knowledge mode control AK to alert it to counting characters. The TRM signal is also fed to the parity circuit PC to alert it for the detection of the parity of characters to be transmitted. The TRM signal is fed to the A and B buffers AB and BB to permit them to receive information. Simultaneous with the generation of the TRM signal is the generation of the TRD signal which is fed to the serializer SZ to open up its gates to permit the transmission of data from the B buffer BB to the transceiver DF'.

As the paper tape in the tape reader TR' reads a character, a sprocket pulse PTST is fed to the reader controls RC as the bits of the character being read are sent in parallel via the PTA1 to PTA7 signal lines to the A buffer AB. In response to the PTST signal, reader controls RC transmits a strobing pulse STR to the A buffer AB and the bits of the character are temporarily stored in parallel in the plurality of flip-flops. The A buffer AB is a seven bit register comprising seven flip-flops. Whenever the A buffer AB contains information, a —EMP signal is fed back to the reader controls RC to interrupt if necessary the PTFW signal so that the tape reader TR' will not transmit another character until the A buffer AB transfers the character it is holding to the B buffer BB. This transfer occurs through the aid of a timing signal BTH which occurs once per character time from the timer TM and is fed to the A buffer AB. This timing signal resets all the flip-flops in the A buffer AB and by virtue of the resetting, transmits the bits of the character as BAA to BAG signals to the B buffer BB. When the bits of the character enter the B buffer BB, they are fed via the BBA to BBG signal lines to the serializer SZ, where they are subsequently sampled by the BTA to BTG signals from the timer TM. These signals occur sequentially so that it is possible to take the information received in parallel from the B buffer BB and transmit it in serial form on the DAD signal line to the transceiver DF'.

While the character is still in the B buffer BB, an odd and even transverse or vertical parity test is performed and depending on the outcome of the test, that is, whether the parity of the character is odd or even, either an OPE or an EPE signal is fed to the parity circuit PC. At the time of the transfer from the A buffer AB to B buffer BB, the A buffer AB will be momentarily empty and an EMP signal is also fed to the parity circuit PC. The EMP signal generates an SPL signal which is used to test the vertical or transverse parity of the character in the B buffer BB as indicated by either the OPE or EPE signals. If the parity is incorrect, a VPE signal is fed to the error and clear circuitry EC to generate an error signal which is fed as the signal ERR to the insert and ignore circuitry II. At the same time, the VPE signal and the SPL signal cooperate in the insert and ignore circuitry II to generate an ERC signal which is fed to the B buffer BB to force set this buffer to an ignore character which replaces the character then stored, causing the ignore character to be serialized and fed to the transceiver DF'.

It should be noted that the SPL signal is generated for every character transferred from the A buffer AB to the B buffer BB and this SPL signal is fed to the acknowledge mode control AK were a count is kept of the characters transmitted. The purpose of this count will hereinafter be fully described.

Characters are transmitted in this manner until finally the B buffer BB receives the end of record characters. These will be three characters occurring sequentially and having particular coded combinations as is indicated by the ENA and EMA signals which are fed to the end circuitry ED. More particularly, the B buffer BB detects these characters and generates the above-mentioned signals. When these signals are received in a pre-arranged sequence the end circuitry ED generates an ENS signal which is fed to the reader controls RC to stop the tape reader TR' by temporarily discontinuing the PTFW signal.

The ENS signal is fed to the parity circuitry PC where it causes the generation of an LPT signal which lasts one character time and is an indication of the time to transfer the longitudinal parity character. The LPT signal is fed to the serializer SZ where it cooperates with the LPA to LPG signals from the parity circuitry PC to generate the longitudinal parity character, which is then transmitted via the DAD signal line to the transceiver DF'. Following this character time, an SPC character time is generated in the parity circuitry PC followed one character time later by the ILB character time. The ILB signal is fed to the insert and ignore circuitry II where it cooperates with an ERR signal from the error and clear circuitry EC which will be present if an error had been detected anywhere during the transmission of the record to cause the generation of an IG signal which is fed to the B buffer BB to force the flip-flops into states which indicate a special character to be interpreted as meaning "ignore the last record." This special character is fed from the B buffer BB in the usual manner to the sterializer SZ for transmission via the DAD signal line to the transceiver DF'. One character time later, the ILB signal disappears and is followed by an LPL signal within the parity circuit PC, which causes the generation of a CLE signal that is fed to the end circuitry ED, causing the termination of the ENS signal. When the ENS signal terminates, the reader controls RC again generate the PTFW signal causing the tape reader TR' to again start transferring information to the A buffer AB. This process continues until another set of end of record characters, or a set of end of transmission characters is detected.

TRANSMITTER. — ACKNOWLEDGE MODE, RETRANSMIT MODE AND DISCONNECT (FIGURE 5)

During the course of the interchange of information between the master station MS and the slave station SS, it is necessary periodically to halt the transmission of data from the transmitter to the receiver in order that a check may be performed concerning the reliability of the information that has been transferred. The stated periods of time are measured primarily by a fixed number of characters that have been transferred. During each transmission period a count is kept of the number of characters transferred and when this count is reached, it is temporarily stored awaiting the detection of an end of record. When the end of the record is reached, after the desired count of characters has been attained, an Acknowledge mode is instituted. At the start of the Acknowledge mode there is a turnaround in the stations. That is, the transmitting station becomes a receiver and the receiving station a transmitter. If during the course of the previous transmission, the receiving station detected an error in the received information, it will transmit an error character to the transmitter during the Acknowledge mode. Upon receipt of the error character, the transmitter will enter a Retransmit mode which is hereinafter described. The Acknowledge mode may also be entered in a second way. That is, when the end of transmission characters are sensed, regardless of the character count, signals will be generated which also initiate the Acknowledge mode.

When the transmitter receives the error character from the receiver and the Acknowledge mode ends, the Retransmit mode begins. During the Retransmit mode, the tape reader TR' of the transmitter is backed up to the beginning of the information it started transmitting at the beginning of the Transmit mode, then stopped, and started in the forward direction and the previously transmitted information is again transmitted followed by another Acknowledge mode. If an error character is again transmitted, there will be another Retransmit mode. If, however, no error character is received by the transmitter, one of two situations occur. If the Acknowledge mode was instituted by virtue of the counting of the characters the transmitter will then start transmitting the next block of records recorded on the tape reader TR'. However, if the Acknowledge mode was initiated by the end of transmission signals recorded on the tape reader TR', a disconnect operation will occur in which the transceiver DF' is disconnected from the telephone lines TL1 and TL2 and all communication between the master station MS and the slave station SS ceases.

Figure 5:
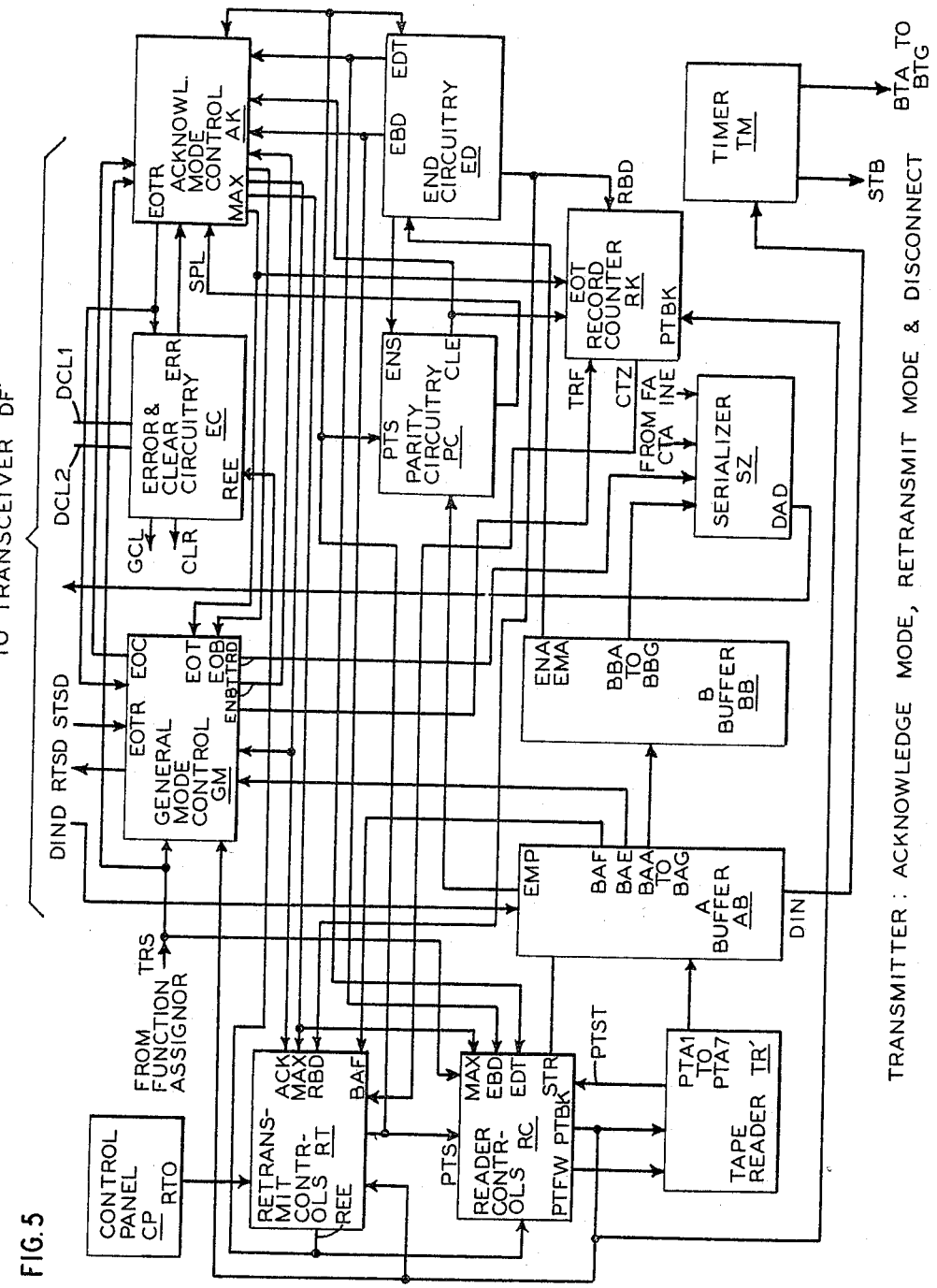

The Acknowledge mode, the Retransmit mode and the Disconnect at the transmitter will be described chiefly with reference to FIGURE 5 which should be considered as a continuation of FIGURE 4 and in a sense a superposition thereon solely for the sake of clarity, so that the number of interconnections does not obscure the teaching of the operation. It will be recalled that, during the discussion of FIGURE 4, characters were fed from the tape reader TR' via the PTA1 to PTA7 signal lines to the A buffer AB and via the BAA to BAG signal lines to the B buffer BB. Whenever a character was transferred from the A buffer AB to the B buffer BB for transmission, an EMP signal was generated which was fed to the parity circuit PC causing the generation of an SPL pulse. The SPL pulses are fed to the acknowledge control AK where they are counted. In other words, there is one SPL pulse for each character transmitted. The acknowledge mode control AK counts these SPL pulses and when a predetermined count is reached a MAX signal is generated which is fed to the retransmit controls RT where it performs no function at this time. It is also fed to the reader controls RC to alert control circuitry therein.

It will further be recalled that the B buffer BB senses for the end of record characters and when they are detected, ENA and EMA signals are transmitted to the end circuitry ED. When the particular combination of the ENA and EMA signals is detected in the end circuitry ED, an EBD signal is generated which is fed to the reader controls RC where it cooperates with the MAX signal present there to halt the tape reader TR' by terminating the PTFW signal. At the same time the EBD signal is generated, the end circuitry ED generates an ENS signal which is fed to the parity circuit PC causing the LPT, SPC, ILB, LPL signal cycle, as described with respect to FIGURE 4, and finally generating the CLE signal which is fed to the acknowledge mode control AK where it cooperates with the EBD signal and the MAX signal causing the generation of an EOB signal. The EOB signal is fed to the general mode control GM where it terminates the TRM signal and the TRD signal, ending the Transmit mode. With the disappearance of the TRD signal, the paths between the B buffer BB and the output of the serializer SZ are opened and no further signals via the DAD signal lines may be transmitted to the transceiver DF'. The general mode control GM, at the same time, generates an ENBT signal which is fed to the acknowledge mode control AK to set the acknowledge flip-flop therein, causing the generation of the ACK signal and the start of the Acknowledge mode.

The Acknowledge mode may be entered in a second way; that is, by the detection of the end of transmission characters from the paper tape on the Tape Reader TR'. When these characters are detected in the B buffer BB, a different combination of ENA and EMA signals are fed to the end circuitry ED, causing the generation again of an ENS signal which performs the above-described function, and the generation of an EDT signal which is fed to the reader controls RC to terminate the generation of the PTFW signal, halting the tape reader TR'. The EDT signal also is fed to the acknowledge mode control AK where it causes the generation of the EOT signal which is fed to the general mode control GM where it performs the same function as the EOB signal, that is, ending the Transmit mode and causing the generation of the ENBT signal which is fed back to the acknowledge mode control AK, causing the setting of the acknowledge flip-flop and the generation of the ACK signal.

The Acknowledge mode is characterized by the setting of the acknowledge flip-flop in the acknowledge mode control AK, causing the generation of the ACK signal which is fed to the general mode control GM where it performs no function at this time, and to the retransmit controls RT to sensitize it for the detection of an error character. During the Acknowledge mode the transmitter is basically a passive receiver and first starts receiving reference characters from the receiver, now acting as a transmitter, via the transceiver DF' and the DIND signal line to the A buffer AB which transmits them as DIN signals to the timer TM to force the timer TM to follow the clock rate or come into synchronization with the receiver. After the reference characters are received, a first control character is received over the DIND signal lines. If this first control character is an error character indicating that the receiver had received erroneous information during the previous information transfer mode, a BAF signal is fed to the retransmit controls RT where it cooperates with the ACK signal to generate the REE signal which will initiate a Retransmit mode, following the end of the Acknowledge mode.

After the first control character is received, a second control character is received, that is the end of mode character. This end of mode character is transmitted as a BAE signal to the general mode control GM, which in response, generates the EOC signal, characteristic of the end of a mode at the transmitter. The EOC signal is fed to the acknowledge mode control AK, where it cooperates with the TRS signal to reset the acknowledge flip-flop, causing the termination of the ACK signal and ending the Acknowledge mode. The termination of the ACK signal at the general mode control GM causes the generation of the TRM, RTS and RTSD signals, which initiate another turnaround cycle. The transceiver DF' transmits two hundred milliseconds of carrier and then returns an STSD signal to the general mode control GM and the transmitter then transmits four hundred milliseconds of reference characters to the transceiver DF' for transmission to the receiver. This is followed by the usual control characters and the transmitter would be in a condition for transmitting information, unless the Acknowledge mode had been initiated by the end of transmission characters. However, it was assumed that an error character was received, causing the generation of the REE signal in the retransmit controls RT. The REE signal is fed to reader controls RC causing the generation of the PTBK signal, indicating the start of the Retransmit mode.

It should be noted that during the turnaround cycle at the transmitter, when the reference characters are being transmitted, a TRF signal is fed to the record counter RK to clear the count in this counter to zero only if no retransmission is necessary. If a retransmission is necessary the record count decreases by one each time an end sentinel is read in reverse. It should be further noted that the CLE signal which is generated at the end of each record that is read, is also fed to the record counter RK to increase its count by one. This occurs for all records except the record during which the MAX signal is generated. More specifically, the MAX signal, when generated, is fed to the record counter RK to inhibit it from counting the next CLE signal that is generated.

The retransmit mode is characterized by the presence of the PTBK signal which is generated by the reader controls RC. The PTBK signal is fed: to the tape reader TR' causing it to read in the reverse direction, that is, to back up; to the retransmit controls RT to alert end of record circuitry, which will hereinafter be fully described; to the general mode control GM to cause the TRD signal to change polarity so that no information may be transferred from the serializer SZ at this time; and to the record counter RK to cause it to act as a unit subtracter instead of a unit adder. The paper tape is now moving in the reverse direction and characters are read via the PTA1 to PTA7 signal lines through the A buffer AB to the B buffer BB. However, as above described, they are not transmitted by the serializer SZ. This transfer of characters continues until the B buffer BB decodes the end of record characters, which is characterized by the ENA and EMA signals which are fed to the end circuitry ED. When the unique combination of these signals is detected therein, an RBD signal is generated. The RBD signal is fed to the record counter RK and one is subtracted from the count therein. If the counter has not reached zero, the reverse reading of the tape continues for the next record. Assume that an RBD finally causes the count therein to reach zero. This will be indicated by the generation of the CTZ signal which is fed to the retransmit controls RT, to indicate that the reading, the first record that had been previously transmitted, is being performed. When the end of this first record is reached, the usual RBD signal is generated and is fed to the retransmit controls RT. In the retransmit controls RT the simultaneous occurrence of the PTBK signal, the CTZ signal and the RBD signal indicate that the start of the block is reached and a PTS signal is generated, indicating the termination of the Retransmit mode. The PTS signal is fed to the reader controls RC, terminating the PTKB signal and regenerating the PTFW signal which will start the tape reader TR' in the forward direction. The PTS signal is also fed to the parity circuitry PC to clear the parity counters preparatory to maintaining a parity count of the characters that will be transmitted. The PTS signal is also fed to the acknowledge mode controls AK to clear the character counter to zero, preparatory to counting the characters that will now be transmitted; and to the end circuitry ED to clear the circuits therein which caused the generation of the RBD signal. Finally, the disappearance of the PTBK signal in the general mode control GM, permits the TRD signal to open gates within the serializer SZ so that the contents of the B buffer BB, during transmission, may be fed via the serializer SZ and the DAD signal line to the transceiver DF' as during a normal transmission. After this message has been retransmitted, there is another Acknowledge mode. It will be assumed that the receiver did not receive an error and therefore the REE signal is not generated. It will further be assumed that the end characters that initiated the Acknowledge mode were the end of transmission characters instead of the end of record characters along with the MAX signal.

Since there was no error, the REE signal was not generated and therefore no ERR signal is fed from the error and clear circuitry EC to the acknowledge mode control AK. Consequently, the EOC signal from the general mode control GM cooperates within the acknowledge mode control AK with the TRS signal from the function assignor FA to cause the generation of an EOTR signal which is fed to the general mode control GM to set the Idle flip-flop therein, causing the generation of the IDLE signal which is characteristic of the Idle mode. At the same time, the EOTR signal is fed to the error and clear circuitry EC, causing the generation of the GCL and CLR signals that are fed throughout the system to clear flip-flops and counters. The connection between the DCL2 and DCL1 signal lines to the transceiver DF' are open. The opening of these lines causes the transceiver DF' to disconnect from the telephone lines TL1 and TL2. Thus the slave station SS is returned to the Idle condition with the transceiver DF' disconnected from the telephone lines TL1 and TL2.

Figure 6:
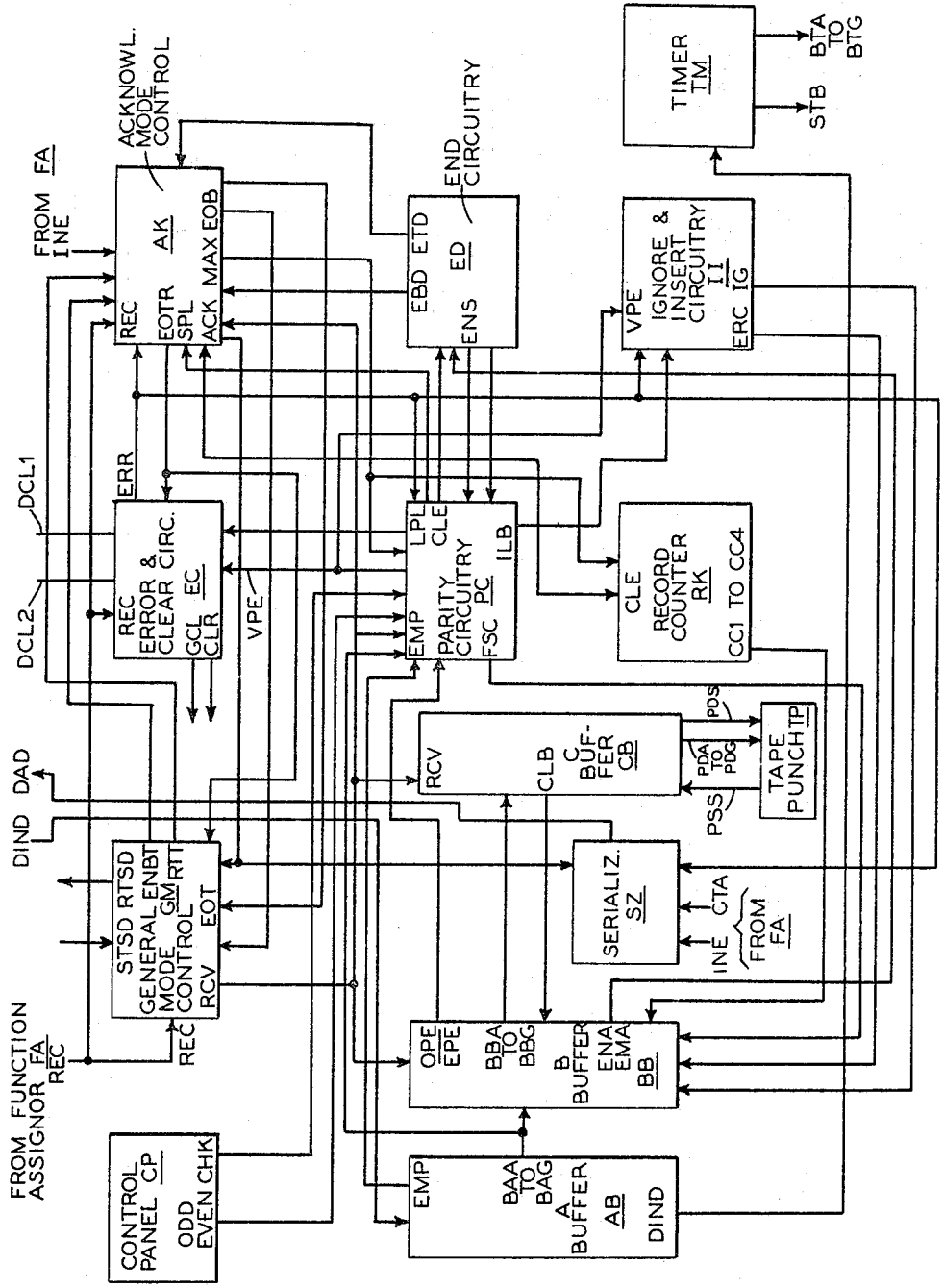
FIGURE 6 is a signal flow diagram between the various elements of the receiver.

RECEIVER.—RECEIVE MODE; PARITY CHECK; IGNORE; ACKNOWLEDGE MODE; AND DISCONNECT (FIGURE 6)

Since there will always be a check of parity at the receiver, the control panel CP transmits either an ODD or an EVEN signal to the parity circuitry PC. This signal will agree with the parity that is to be checked and will be the same as the parity being checked at the transmitter. Control panel CP also transmits the CHK signal to the parity circuitry PC to indicate that a parity check is to be performed.

It will be recalled that, at the end of the Connect and Bid modes, it was assumed that the slave station SS would be the transmitter and the master station MS the receiver. Therefore, at the master station MS the function assignor FA is still transmitting the REC signal. The REC signal is fed to the error and clear circuitry EC to alert error and clearing circuits therein. The REC signal is also fed to the acknowledge mode control AK to alert circuitry therein for use at the end of the Acknowledge mode as hereinafter described. Finally, the REC signal is fed to the general mode control GM. At the end of the above-described Connect mode at the master station MS, the CON signal, characteristic of that mode, terminates. The termination of the CON signal cooperating with the REC signal in the general mode control GM causes the generation of the RCV signal which is characteristic of the Receive mode. The RCV signal is fed: to the B buffer BB to permit it to receive information from the A buffer AB; to the C buffer CB to permit the transfer information to the tape punch TP; to the parity circuitry PC to alert the vertical and longitudinal parity checkers therein; and to the acknowledge mode control AK to alert the character counter therein which is used to generate the Acknowledge mode in the same manner as described for the transmitter. It will be recalled that the timer TM is constrained into synchronization with the timer of the transmitter by virtue of the DIND signals received by the A buffer AB and fed therefrom as DIND signals to the timer TM.

In addition, the characters from the transmitter are received at the transceiver DF and fed serially by bit into the A buffer AB, where they are sequentially sampled by BTA to BTG signals, causing the generation of a combination of BAA to BAG signals that are fed in parallel to the B buffer BB. In particular, a character is serially loaded into the A buffer AB and during the occurrence of the BTH signal the A buffer AB is cleared, causing the transmission of BAA to BAG signals to the B buffer BB. During the entire time of the reception of characters, the tape punch TP periodically transfers PSS signals to the C buffer CB. Each PSS signal, when received by the C buffer CB, causes the transfer of the contents of the C buffer CB via the PDA to PDG signal lines to the tape punch TP for punching. Simultaneous with this transfer, a PDS signal is also fed to the tape punch TP to step the paper tape to the next position. The PSS signal in the C buffer CB then generates a CLC signal therein which clears the C buffer CB and also causes the generation of a CLB signal which is fed to the B buffer BB to clear the B buffer BB and in the course of clearing causes the transfer of the contents of the B buffer BB via the BBA to BBG signal lines to the C buffer CB. To summarize, signal flow is as follows: the characters are received bit serially by the A buffer AB where they are converted to a plurality of parallel bits, via the B buffer BB and C buffer CB in parallel to the tape punch TP.

It should be noted that each time the A buffer AB is emptied during the transfer to the B buffer BB, an EMP signal is fed to the parity circuitry PC, which in response to this EMP signal, generates a sample pulse SPL therein which is used to check parity and also transmits this sample pulse via the SPL signal line to the acknowledge mode control AK where it is unit added to the count of the characters already received.

Each character as it enters the B buffer BB is checked to determine whether it is of even or odd, vertical or transverse, parity. Depending on the vertical parity, either an OPE or an EPE signal is fed to the parity circuitry PC. This signal cooperates with either the ODD or the EVEN signal from the control panel CP and also the internally generated SPL signal, to indicate whether there is a vertical parity error in the same way as described for the transmitter. If there is a vertical parity error, the VPE signal is fed to the error and clear circuitry EC, causing the generation of an ERR signal. The VPE signal is also fed to the ignore and insert circuitry II, causing the generation of an ERC signal which is fed to the B buffer BB forcing the flip-flops therein to register an ignore character which overrides the character stored therein so that the ignore character is then fed to the C buffer CB instead of the character having the vertical parity error.

Characters are transferred in this manner and finally the end of block characters are received and detected in the B buffer BB causing the generation of a combination of ENA and EMA signals which are fed to the end circuitry ED. When the predetermined combination of these ENA and EMA signals are detected in the end circuitry ED, there is generated an EBD signal which is fed to the acknowledge mode control AK and its function there will be hereinafter described. Simultaneously, an ENS signal is generated which is fed to the parity circuitry PC.

The ENS signal, when received by the parity circuitry PC, causes the generation of an LPT signal which lasts one character time and indicates that a longitudinal parity test is to be performed. It should be noted that during the reception of the characters, the bits of the characters are counted in parallel by the parity circuitry PC by virtue of the BAA to BAG signals that are fed from the A buffer AB. The last character received by the A buffer AB at longitudinal parity test time, is the longitudinal parity character received from the transmitter. Therefore, if there is no longitudinal parity error, the count registered in the parity circuitry PC, when added to the longitudinal parity character just received, should cause all the counters therein to assume a "zero" state. Any other condition indicates that there is a longitudinal parity error. If such an error exists, the parity circuitry PC transmits an LPR signal to the error and clear circuitry EC, which will cause the generation of an ERR signal. During the next character time the LPT signal disappears, causing the generation of an SPC signal in the parity circuitry PC, whose function is hereinafter more fully described. During the next character time, the SPC signal disappears, causing the generation of the ILB signal by the parity circuitry PC. If an error had been registered, the ERR signal will still be present and it cooperates in the ignore and insert circuitry II with the ILB signal received from the parity circuitry PC to cause the generation of an ignore character signal IG, which is fed to the B buffer BB, causing the generation therein of a special character indicating "Ignore Last Block." This character is then transmitted in the usual manner via the C buffer CB to the tape punch TP. During the next character time the ILB signal disappears, cusing the generation of the LPL signal which clears the longitudinal parity counters in the parity circuitry PC and causes the generation of a CLE signal which is transmitted to the end circuitry ED to clear the circuits that registered the EBD signal and is also fed to the record counter RK to indicate that one record has been received.

The next record starts being received. It will be assumed that during this record the predetermined count of the character counter in the acknowledge mode control AK is reached. When this count is reached, a MAX signal is generated. The MAX signal within the acknowledge mode control AK prevents further counting of characters and also alerts circuitry to detect the next EBD signal which occurs. The MAX signal is also fed to the parity circuitry PC and its function there is hereinafter more fully described. Finally, the MAX signal is fed to the record counter RK to prevent any further counting of records. Character reception continues, in the usual manner, until the end of record signals are again detected causing the generation of the EBD and ENS signals as described above. The ENS signal, when received by the parity circuitry PC, causes the generation of the LPT signal therein and the above described parity test is performed. During the next character the LPT signal goes off, causing the generation of the SPC signal and if an error has been detected the SPC signal cooperating with the ERR signal in the parity circuitry PC, causes the generation of an FSC signal which is fed to the B buffer BB, forcing the count stored in the record counter RK, and represented by the CC1 to CC4 signals, into the B buffer BB for transmission via the C buffer CB to the tape punch TP. The role performed by this count character will be described in the section concerned with the Search-Edit operations of the system. Following the generation of the SPC signal, the ILB signal is generated and performs the same function as described above. With the disappearance of the ILB signal, there is generated the LPL and CLE signals. It should be noted that even though the CLE signal is fed to the record counter RK, the presence of the MAX signal there, prevents the counter from recording this record.

The CLE signal, in addition to performing its usual functions, is fed to the acknowledge mode control AK, where it cooperates with the MAX signal and the EBD signal, to cause the generation of the EOB signal. The EOB signal, indicating an end of block, is fed to the general mode control GM where it causes the generation of the ENBT signal which resets the RCV flip-flop, terminating the RCV signal, and is fed to the acknowledge mode control AK to set the acknowledge flip-flop, causing the generation of the ACK signal. The resetting of the RCV flip-flop and the setting of the acknowledge flip-flop, indicates the start of the Acknowledge mode, and a turnaround cycle is initiated.

The Acknowledge mode may also be entered in a second manner, that is, when the B buffer BB detects end of transmission characters and feeds them as coded combinations of the ENA and EMA signals to the end circuitry ED. In this case, the end circuitry ED generates the ENS which performs its usual function and also generates an EOT signal which is fed to the general mode control GM to perform the same functions that the EOB signal does therein.

The Acknowledge mode, it will be recalled, is started with a turnaround cycle and is characterized by the receiver becoming temporarily a transmitter and signaling back to the transmitter which is now acting as a receiver, whether an error had been received. The ACK signal is fed to the general mode control GM where it cooperates with the REC signal to generate the RTS, RTT and RTSD signals. The RTT signal is fed back to the acknowledge mode control AK to clear the character counter. The ACK signal is also fed to the serializer SZ to permit it to transfer control characters which will be hereinafter described. The RTSD signal is fed to the transceiver DF causing it to generate carrier for echo suppression. Two hundred milliseconds later the transceiver DF sends back a "start to send" signal STSD and the receiver now transmits approximately four hundred milliseconds of reference characters to cause the transmitter, now acting as a receiver, to fall into synchronization with the receiver now acting as a transmitter. At the end of these four hundred milliseconds, the first control character is transferred. This control character may be an error character. In particular, if an error had been received during the last group of blocks preceding the Acknowledge mode, an ERR signal will be generated by the error and clear circuitry EC and fed to the serializer SZ where it cooperates with a CTA signal from the function assignor FA and the ACK signal to cause the generation of the error character (see Table 1) which is fed via the DAD signal line to the transceiver DF. The next, second, control character as the INE signal also received from the function assignor FA by the serializer SZ is fed to the transceiver DF to indicate the end of the Acknowledge mode. The INE signal is also received by the acknowledge mode control AK where it cooperates with the REC signal, there present, to reset the Acknowledge flip-flop, terminating the ACK signal and ending the Acknowledge mode.

The termination of the ACK signal in the general mode control GM cooperates with the REC signal therein to again set the Receive flip-flop, causing the generation of the RCV signal, re-initiating the Receive mode. The transmitter at this time, enters a turnaround cycle followed by the retransmission of the last message, if it had received the error character. After the retransmission of this message and its reception by the receiver, there will again be another Acknowledge mode and turnaround cycle. If there is no error this time and if the Acknowledge mode was initiated by the end of transmission characters, the receiver then starts the disconnect procedure.

In particular, when the end of transmission characters are detected by the end circuitry ED, the ETD signal is fed to the acknowledge mode control AK, where during the occurrence of the CLE signal there is generated the EOT signal. The EOT signal, in addition to performing its usual functions, will cause the generation of an ETT signal, provided the acknowledge mode control AK is not receiving an error signal ERR from the error and clear circuitry EC. During the occurrence of the INE signal which ends this error-free Acknowledge mode, the ETT signal will cause the generation of an EOTR signal which is fed to the error and clear circuitry EC, causing the generation of the GCL and CLR signals which are fed throughout the receiver to return it to its initial condition. The error and clear circuitry EC at this time will open up the connection between the lines DCL1 and DCL2 from the transceiver DF, disconnecting it from the telephone lines TL1 and TL2. Finally, the EOTR signal is fed to the general mode control GM to set the Idle flip-flop, generating the IDLE signal which is characteristic of the Idle mode, preparing the receiver for a later transaction.

SEARCH EDIT OPERATION (FIGURE 7)

During the reception of messages, some of the records of the message may contain errors. As has been described above, these erroneous records are followed by an Ignore character. The search-edit procedure by taking advantage of the presence of the Ignore characters is capable of producing an error-free paper tape by deleting those records having appended Ignore characters.

The reel of paper tape containing the received messages is removed from the tape punch TP and placed on the feed side of the tape reader TR. It should be noted that this will cause the paper tape to be read in the reverse direction. Such a procedure is required because it is necessary to read the Ignore character first to determine whether the record will be deleted or not. As the paper tape is read from the tape reader TR, those records not having an appended Ignore character will be punched on a new paper tape by the tape punch TP, whereas those records containing Ignore characters will not be punched.

With the tape reader TR and the tape punch TP prepared for operation, the fast read switch SW13 and the copy switch SW12 (see FIG. 1) are thrown, causing the generation respectively of the FSR signal and the CPYA signals which are fed to the search-edit unit SE. In response to the CPYA signal, the search-edit unit SE generates a CPY signal which is fed to the C buffer CB to clear storage flip-flops. The CPY signal, within the search-edit unit SE, causes the generation of a GOP pulse signal and the generation of CPO and CPP signals. The GOP pulse signal is fed to the reader controls RC to start the tape reader TR moving in the forward direction by generating a PTFW signal. The CPP signal is fed to the C buffer CB to sensitize circuitry therein to the PSS timing signals from the tape punch TP.

The CPO signal is fed to the general mode control GM, the function assignor FA and the acknowledge mode control AK, to ensure that there is no spurious initiation of the Receive, Transmit or Acknowledge modes. The CPO signal is also fed to the reader controls RC to prevent any undesired stopping of the paper tape reader TR during the search-edit operation. The timer TM is constrained to operate on its own by virtue of the CPO signal which ensures that the timer TM generates strobe pulses from its own crystal controlled oscillator and also that the bit signals of the characters begin at a precise time. At the same time, the CPP signal cooperates with the FSR signal in the search-edit unit SE to cause the generation of an SED signal which is fed to the retransmit controls RT to alert end-sentinel detection circuitry therein and to the record counter RK to cause the generation of an ENHB signal which alerts counting input circuitry therein and is also fed to the end circuitry ED to prevent the spurious detection of end-sentinel characters which may occur within the blocks of the records.

For the sake of clarity, it will be assumed that the first record is error-free and no Ignore character is therefore sensed. The first character is read from the tape reader TR and fed in the usual manner via the PTA1 to PTA7 signal lines to the A buffer AB while a PTST sprocket signal is fed to the reader-controls RC causing the generation of an STR signal which strobes the information bits from the tape reader TR. The character is transferred in the usual manner from the A buffer AB via the BAA to BAG signal lines to the B buffer BB. When the character is in the B buffer BB, the four least significant bits are fed via the BBA to BBD signal lines to the block counter BC, where their function is hereinafter more fully described. At the same time, the bits of the character are also fed via the BBA to BBG signal lines to the search-edit unit SE for special character detection such as the first FST character or the Ignore IGR character. (It will be assumed at present that neither of these characters is present.) The C buffer CB in response to the periodically occurring PSS signals from the tape punch TP, generates a CLB signal which is fed to the B buffer BB causing the clearing of this buffer and the transfer of the character via the BBA to BBG signal lines to the C buffer CB. Each time the B buffer BB is emptied an EMP signal is transferred to the parity circuitry PC which causes the generation of a sampling pulse which is fed via the SPL signal line to the search-edit unit SE to permit the sampling for the above mentioned special characters. Also in response to the PSS signals from the tape punch TP, the C buffer CB then generates a CLC signal which causes the transfer of the contents of the C buffer CB via the PDA to PDG signal lines to the tape punch TP. In this manner, information is transmitted a character at a time from the tape reader TR via the A buffer AB, the B buffer BB, and the C buffer CB to the tape punch TP.

Fnally, the first FST character of the message is read by the tape reader TR and fed via the A buffer AB to the B buffer BB. (At this point, it would be beneficial to review the description of the format of a message as described in the General Structure of Information section.)

The first FST character is fed to the search-edit unit SE via the BBA to BBG signal lines and is sampled by an SPL signal from the parity circuitry PC causing the setting of a flip-flop in the search-edit unit SE to temporarily remember the occurrence of this character. (It should be noted that at the start of the reading of the tape, the CPY pulse that was generated, simulates this first FST character.) It will be assumed that the next record is in error. Therefore the next character read will be an Ignore character which is also fed from the B buffer BB to the search-edit unit SE. The occurrence of the Ignore character following the sensing of the first FST character, is indicative of an erroneous block. The combination of these two characters causes the generation within the search-edit unit SE of the ZIG signal which records the fact that the message is not to be punched.

Each time that a CLB signal is generated by the C buffer CB there is also generated a CLZ signal which is fed to the search-edit unit SE. The CLZ signal cooperates with the ZIG signal therein to cause the generation of a PIN signal which is characteristic of inhibiting the punching fo the characters received by the C buffer CB. The PIN signal is fed to the C buffer CB to prevent the transfer of the characters from the C buffer CB to the tape punch TP. The CLZ also cooperates with the ZIG signal and the CPP to cause the generation of an SPP signal which is fed to the block counter BC to clear it to zero and permit the insertion therein of a block count. The next character arriving in the B buffer BB will represent a count of the number of blocks in the record, since the record is erroneous. The binary representation of this count is fed via the BBA to BBD signal lines to the block counter BC and is stored therein.

The next three characters received are end-sentinel characters, that is, they may indicate the end of a record or a block or they may indicate the end of transmission. The end-sentinel characters will be punched in spite of the fact that the record will be ignored. Therefore, it is necessary to override temporarily the effect of the PIN signal during the occurrence of these characters. Accordingly, it should be recalled that the end-sentinel characters are detected by the B buffer BB and fed to the retransmit controls RT as the ENA and EMA signals. When the first end-sentinel character is received by the retransmit controls RT, it generates an RBA or RSA signal depending on whether the end-sentinel indicates the end of a block or the end of a message, which is transmitted to the search-edit unit SE where it cooperates with the next occurring CLZ signal from the C buffer CB to generate the PAL signal. The PAL signal is fed to the C buffer CB to override the effect of the PIN signal. After the third end-sentinel is detected in the retransmit controls RT, there is generated either an RTD or a RBD signal which is fed to the search-edit unit SE to terminate the PAL signal, through the agency of a periodically occurring CEMP signal received from the C buffer CB. Therefore, the PIN signal assumes complete control, again inhibiting the punching of characters received by the C buffer CB. As the remainder of the record is read, each time the combination of end-sentinels indicating an end of block is sensed, an RBD signal is generated which is fed to the block counter BC. As each RBD signal is received at the block counter BC, a unit of subtraction is performed. This continues until the count in the block counter BC reaches zero and at that time a CTZ signal is generated, which is fed to the retransmit controls RT. When the next RBD signal is generated by the retransmit controls RT it cooperates with the SED signal and the CTZ signal to indicate that the start of the message has been reached and causes the generation of a PTS signal. The PTS signal is fed to the search-edit unit SE to terminate the PIN signal, unless an Ignore character has been sensed at the end of the block. This procedure continues until the end of the paper tape is reached.

DETAILED DESCRIPTION OF THE BLOCKS OF FIGURES 2 TO 7

In the following descriptions, only the blocks for the coupler DV will be described. Since the blocks of coupler DV' are identical it is not necessary to include their detailed descriptions.

Throughout the detailed descriptions the terms transmitter and receiver are employed. By transmitter is generally meant the station, whether it be the master station MS or the slave station SS and is particularly meant the coupler DV or DV' which is transmitting or is to transmit data information. Similarly the term receiver is applied generally to the station and more particularly its coupler which is receiving or is to receive data information. Such a designation is required since during the operation of the system the station which receives data information does at times transmit control or error control information in order to request a retransmission.

Furthermore, during the description of the blocks, signals will be designated as present or absent, or initiated and terminated. It should be noted that the signals are either prefixed by a minus signal or unprefixed. An unprefixed signal such as ACK is initiated to be present, at which time it switches in negative direction (or goes negative) from substantially ground potential to a negative potential of minus six volts. The switching generates a negative going transient or voltage edge. When a signal is terminated it becomes absent and switches in a positive direction (or goes positive) from a negative potential of minus six volts to ground potential, generating a positive going transient or voltage edge. A negative sign prefixed signal such as —ACK does the direct inverse.

The key logical elements in the block diagrams are: the gate and mixer gate which are logically identical, "and" gates which pass a negative potential from their output when, and only when, negative potentials are present at all of their inputs; and the buffer or "or" gate which passes a negative potential from its output when any one of its inputs is at a negative potential. To overcome signal attenuation, direct coupled amplifiers are used in conjunction with the logical elements. An amplifier has an input terminal and a positive and/or negative output terminal. The positive output terminal transmits the same polarity potential received by the input terminal. The negative output terminal transmits the inverse polarity.

A hybrid logical element is obtained by connecting the output of a gate or mixer gate to the input terminal of an amplifier and using the negative output terminal of the amplifier as the output of the element and the inputs of the gate as the inputs of the element. Such a logical element is called a negative buffer. Another hybrid logical element, a negative gate, is obtained by connecting the output of a buffer to the input terminal of an amplifier and using the negative output terminal of the amplifier as the output of the element and the inputs of the buffer as the inputs of the element.

A counter or a flip-flop is employed as a storage element. Each is provided with generally set, reset and allow set input terminals, and zero's and one's output terminals. A counter is identical to a flip-flop except that the counter is provided with a clear terminal. The counter and the flip-flop are capable of being set only if ground potential is present at its allow set input terminal. To set the counter or flip-flop a positive going transient of at least four microseconds and at minus six volts before going positive must be received at its set input terminal which causes the one's output terminal to switch from ground potential to a minus six volt potential and the zero's output terminal to switch from a minus six volt potential to ground potential. A positive going transient, of at least four microsecond duration starting from minus six volts, received at the reset input terminal, resets the flip-flop or counter causing the potentials at the one's and zero's output terminals to interchange values. A negative going transient received at the clear terminal of the counter has the same effect as if a positive going signal were received at its reset input terminal. A blocking oscillator is basically a pulse generator which transmits a negative going pulse, generally of either four or eight microsecond seconds duration, upon receipt of a negative going transient at its input terminal. In any event, the reference character designation will indicate the time duration of the pulse, i.e., BO4 or BO8 indicate four or eight microsecond pulses respectively. To provide time delays or to provide pulses of long time duration, a delay flop is employed. When triggered by a negative going transient or voltage edge, it will generate a negative pulse having a time duration indicated within the block of the element. For example, the block will contain the reference, say "400 ms." meaning a four hundred millisecond long pulse will be generated. Delay is obtained by recalling that flip-flops and counters are triggered by positive going transients. Such a transient is present at the trailing edge of the pulse from the delay flop.

Other elements are less generally employed and will, therefore, be described only when they occur in the succeeding sections. However, it should be noted that complete description of all these elements is contained in the appendix.

Timer TM (Figure 8)

The timer TM which provides the basic timing pulses for the coupler DV comprises a strobe pulse generator STG which generates the strobing pulses by which the bits of information are sampled during the transmission, reception and search-edit operations; a character bits generator CBG, which generates periodically and sequentially occurring pulses which are indicative of the particular bits of the characters; a synchronization detector SD to determine whether the timer TM of one coupler DV is in synchronization with the timer TM of the other coupler DV'; and an inhibit generator IHG which prevents the possible erroneous sampling of information, generally at the start of a turnaround cycle when echo suppression is being performed.

The inhibition is generated at the following times, namely: when the slave station SS is in the Idle mode and has detected carrier; when the slave station SS leaves the Allow mode to enter the Receive mode; when the master station MS leaves the Bid mode to enter the Connect mode; when a station leaves the Transmit mode to enter the Acknowledge mode; and when the station that is a receiver leaves the Acknowledge mode and returns to the Receive mode. Whenever any of these situations occur a four hundred millisecond inhibition period is generated which prevents the A buffer AB from accepting information from the transceiver DF.

Referring to the inhibit generator IHG as shown in FIGURE 8, the mixer gate M100 will transmit a positive going signal during the Idle mode as indicated by the presence of the IDLE signal when carrier is detected as indicated by the presence of the CAD signal from the transceiver DF. The mixer gate M101 will transmit a positive going signal when the REC signal is present and the ALL signal terminates or goes positive at the end of the Allow mode. At the end of the Bid mode, the BID signal which is fed to one input of the buffer 102 switches from a negative voltage to a ground potential, causing the transmission of a positive going signal from the buffer 102. Similarly, at the end of a Transmit mode, the TRM signal which is fed to the second input of buffer 102 switches from a negative polarity to ground potential, causing the transmission of a positive going signal from the buffer 102. Mixer gate 103 transmits a positive going signal when the REC signal, indicating a receiver is present, and the ACK signal switch from a negative polarity to ground potential at the end of the Acknowledge mode. Any positive going signal received by amplifier A103 is inverted to cause a negative going signal to trigger the four hundred millisecond flop 102, whose output is fed to amplifier 119, to cause the generation of the INH and —INH signals. The time constants within the delay-flop 102 are chosen so that a four hundred millisecond pulse is generated. The INH signal is fed to the character bits generator CBG to prevent its detection of character bits. Since character bits are not detected, the synchronization detector SD remains in an out-of-sync condition, as is hereinafter more fully described, and feeds a —SYN signal to A buffer AB to block the input gate between the transceiver DF to the A buffer AB so that no information can be received during this inhibit period.

The strobe pulse generator SPG is dependent on two sources for the strobe pulses STB. When the coupler DV operates as a transmitter, during the Transmit mode, or during the Copy or the Search-edit operations, the strobe pulses are generated from a crystal control oscillator CLK which has a precisely controlled frequency of 1200 pulses per second, wherein each of said pulses has a duration of four microseconds. Thus, it is seen that the crystal control pulse generator CLK has its output coupled to a first input of the mixer gate M700. The second input of the mixer gate M700 is coupled to the positive output of amplifier A700B whose input is connected to the output of buffer B700B. Thus, during a Transmit mode, the RTS signal will be present and the mixer gate M700 will pass the pulses from the crystal control pulse generator CLK to the input of amplifier A702 causing the generation of the strobe pulses STB. A similar gating operation occurs if the CPO signal is present (during the Search-edit operation) or the halt signal is present (during the Copy operation). During these times the negative output of amplifier A700B blocks the mixer gate M700. When the coupler DV is in the Receive mode the CPO, HLT and RTS signals will not be present and mixer gate M701 will pass STBR signals to the amplifier 702. The STBR signals are the second source of strobe pulses and are generated to be in synchronism with the strobe pulses generated by the transmitter.

It is necessary that there be bit synchronization between the timer of the transmitter and the timer of the receiver because of the scheme employed in transmitting the information. The information is transmitted according to a non-return to zero method, wherein a voltage of one polarity is transmitted for a binary zero and a voltage of another polarity is transmitted for a binary one. For example, the DIN signal which represents the received information, will shift between zero volts (representing binary zero) and minus six volts (representing binary one) as the bits of the received information, alternate in a random manner between binary ones and zeros. For example, a succession of binary ones for several bit times will be represented in the form of a minus six volt signal on the DIN signal line during that time. The signal may then shift to zero volts during the transmission of a series of binary ones. The problem then arises at the receiver to determine how many binary ones were received during the interval of time when the voltage on the DIN signal line was at minus six volts and how many zeros were received while the voltage on this line was at zero volts. The remainder of the strobe pulse generator STG provides the means for obtaining bit synchronization during the receiving of data. The circuitry makes use of the fact that the information being transmitted at the transmitter is being transmitted at the rate of twelve hundred bits per second, or the period for each bit is eight hundred and thirty-three microseconds. In other words the interval between bits is eight hundred and thirty-three microseconds, plus or minus a negligible fraction at the transmitter. At the receiver however, the deviation is due more to jitter but may be ignored for the present discussion. However, it is known that since the interval between bits is in the order of eight hundred and thirty-three microseconds, there will always be a change in polarity of the voltage representing the data at some time which is an approximate integral multiple of eight hundred and thirty-three microseconds. By keying on a controlled and correctable pulse generator having a pulse repetition rate of twice the frequency of the received information at the time the first data edge or voltage shift is sensed, it is possible to generate the required strobing pulses. In other words, the controlled and correctable pulse generator will transmit a pulse every four hundred and sixteen microseconds after it was triggered on by the fist data edge received. The generated pulses are then fed to a binary counter whose one's output is fed to a triggered pulse generator, i.e., blocking oscillator, which generates the predicted edges. By a proper choice of the output of the controlled and correctable pulse generator and the binary counter it is possible to obtain a pulse from the blocking oscillator immediately following the first received data edge and a series of pulses which will then be predictions of when further data edges may be expected. By feeding the other output of the binary counter to a second triggered pulse generator, i.e., blocking oscillator, there will be obtained a succession of pulses which will be centered approximately in the middle of each received bit and therefore farthest from the data edges and their accompanying jitter and uncertainty. This second series of pulses becomes the strobe pulses during the reception of information. It should be noted that if the controlled running pulse generator is started with the first data edge and allowed to run in an unconstrained manner and if its period is not exact with the period of the timer of the transmitter, each predicted edge will be slightly further in error. To prevent such an accumulation of errors, it is necessary to control the repetition rate of the controlled and correctable pulse generator. The speed control is provided by using the received data edges when they occur to set a first flip-flop which is reset by the generated strobing pulses. If the free running pulse generator is slow with respect to the received bits, the output signals of this first flip-flop will have periods greater than four hundred and sixteen microseconds and if the free running pulse generator is fast with respect to the received bits, the output pulse will be less than four hundred and sixteen microseconds. The output of the first flip-flop is connected to the set input of a second flip-flop which is reset with the pulses indicating the predicted edges. It should be noted that the second flip-flop will set only if the first flip-flop has been set and then reset. Since the timing of the set of the second flip-flop is controlled by the strobe pulses and its reset by the predicted edge pulses, the second flip-flop will always generate a pulse having very nearly a duration of four hundred and sixteen microseconds. The outputs of the first and second flip-flops are subtracted to provide an error signal which is used to generate a control voltage which corrects the frequency of the free-running pulse generator. In other words, the difference in time duration of the pulses from the first flip-flop with respect to four hundred and sixteen microseconds is a measure of the error of the prediction and consequently an indication of the required amount of correction. To summarize: If the controlled and correctable pulse generator is slow, the output of the first flip-flop will have a duration which is greater than usual and if the output of the free-running pulse generator is fast, the output of the first flip-flop will have a time duration which is less than usual.

Referring to the strobe pulse generator SPG in FIGURE 8, the signals representing the received information are fed in inverted and uninverted form as the DIN and minus DIN signals to the strobe pulse generator SPG. When the first voltage transition from ground to a negative voltage is present on the —DIN signal line, the blocking oscillator BO4–700 is triggered causing the setting of the flip-flop whose set input is connected to the output of blocking oscillator BO4–700. The zero's output of flip-flop F700 goes to zero volts and this voltage is passed via buffer B18F and amplifier AB24 to the input of multivibrator CMV1. The positive going voltage turns the multivibrator CMV1 on and it starts free running at a pulse repetition rate of twenty-four hundred pulses per second. The pulses generated by the multivibrator CMV1 are fed to the set input terminal of the counter C703 which acts as a binary counter. The first pulse causes the one's output of the counter C703 to shift from a negative voltage to ground, triggering the blocking oscillator BO703 which generates a pulse. When the next pulse is received from the multivibrator CMV1, the zero's output of the counter C703 switches from ground to a negative voltage, triggering the blocking oscillator BO4–704 which generates a STBR pulse. In this manner, alternate pulses from the multivibrator CMV1 cause the generation of two series of pulses; one denominated PE pulses, the other denominated STBR pulses. It should be noted that the first of the PE pulses occurred substantially simultaneous with the first received data edge and these pulses will therefore be an indication of the predicted edges of each of the succeeding received bits. It should also be noted that the STBR pulses were generated approximately at the middle of the received data pulses and these STBR pulses will be used for strobing received information, as was described above.

Whenever a data edge is received, either blocking oscillator BO4–701 or blocking oscillator BO4–700 will transmit a pulse via buffer B700 to trigger blocking oscillator BO4–702 which transmits a pulse to the set input terminal of flip-flop F701. The STBR pulses are fed to the reset terminal of flip-flop F701. Therefore the one's output of flip-flop F701 will transmit a pulse starting with the reception of a data edge and terminating with the receipt of an STBR pulse. Whenever the flip-flop F701 is reset it will transmit a positive going transient which triggers the flip-flop F702 to the set state. The next occurring predicted edge signal, PE pulse, will reset the flip-flop F702. Therefore, the one's output of the flip-flop F702 will transmit a pulse having a duration which is precisely equal to the time duration between two pulses generated by the multivibrator CMV1. The one's output of flip-flop F701 is fed to one input of the voltage comparator CMV2 while the one's output of flip-flop F702 is fed to the other input of voltage comparator CMV2. This comparator essentially subtracts the two voltages to generate an error and correction signal. If the pulse widths are exactly equal, no error or correction voltage will be generated. However, if the pulse widths are different, an error voltage is generated which is fed via the VC signal line to the multivibrator CMV1 causing it to speed up or slow down as indicated by the polarity of this voltage. In this manner, the STBR pulses and therefore the STB pulses are forced into synchronization with the strobe pulses of the transmitter. It should be noted that the details for the multivibrator CMV1 and the voltage comparator CMV2 are both fully described in the appendix.

Character bits generator CBG generates eight sequentially occurring timing signals which periodically recur. These BTA, BTB, BTC, BTD, BTE, BTF, BTG, and BTH pulses represent the bits of a character, with BTA pulse representing the least significant bit and the BTH pulse the most significant bit. Basically, the BTA to BTH pulses are generated by counting of the STB pulses in a three stage binary counter. It should be noted that a three stage binary counter assumes eight unique states. Each of these states may be used to indicate or generate one of the BTA to BTH signals. When the coupler DV is acting as a receiver it is necessary that the character bits generator CBG be in synchronization with the character bits generator of the transmitting coupler. This is accomplished by the transmission of reference characters by the transmitting coupler and by using these reference characters to force the character bits generator CBG into synchronization.

More particularly, the character bits generator CBG operates as follows: After the termination of the INH signal which is received at buffer B720, amplifier A20 permits the binary counters BC700A, BC700B and BC700C to start counting STB pulses that are received from the strobe pulse generator SPG. As the STB pulses are counted, combinations of TMA, TMB and TMC signals and their negative counterparts are generated. These signals are fed to decoding matrix 200 to cause the generation of the BTA to BTH pulses. The first STB pulse causes the binary counters BC700A to BC700C to assume such a state that the BTA pulse is generated. The next STB pulse causes the generation of the BTB pulse, etc. The eighth STB pulse causes the generation of the BTH pulse and the cycle repeats.

When the timer TM is to operate with a transmitter it is not necessary to constrain the counting of the STB pulses. However, when the timer TM is operating with a receiver the counting must be synchronized with the timer of the transmitter. The synchronization is accomplished in the following manner: When the timer TM is in a receiver, neither the RTS nor CPO signals are generated and it will be assumed that there is no synchronization error. Therefore, the gate 720 is dependent upon the minus BTH pulse and the DIN signals. The —SYN signal only permits synchronization when the timer TM is initially out of synchronization. The STB pulse that is fed to this gate is only used as a sampling pulse. It should be recalled that at this time, reference characters are being received and that the reference characters are basically only BTH pulses; that is, a binary one in the most significant bit position and binary zeros in the remaining bit positions. If, when the most significant bit of the reference character is received, the character bits generator CBG is generating anything but the BTH pulse, the minus BTH signal line will be at a negative voltage, causing the passage of the eighth bit of the reference character via the DIN signal line to trigger the blocking oscillator BO8–720 which transmits a pulse via the buffer B720 to the amplifier A720, which clears the binary counters BC700A to BC700C to the state which would cause the generation of the BTH pulse. In this manner, synchronization by character is obtained. It should be noted that if the BTH pulse was being generated at the time the most significant bit of the reference character is received, no pulse would pass through gate G720, but because the BTH pulse is being generated the binary counters BC700A to 700C are in the cleared state anyway.

The synchronization detector SD is intimately associated with the character bits generator CBG and indicates when the timer TM is in synchronization, and if it loses synchronization, it generates a signal to indicate that there is a synchronization error. During the reception of reference characters, the character bits generator CBG becomes synchronized and generates a BTH pulse that occurs when the most significant bit of the reference characters are received. The minus BTH pulse is fed to the allow set input of the counter CC4C. In other words, whenever the BTH pulse is present, the minus BTH pulse is at ground potential, permitting the setting of the counter CC4C. When synchronization is attained when the timer TM which is associated with a receiver, the most significant bit of the reference character passes through the gate G201 causing the setting of the counter CC4C and the generation of the SYN signal. The presence of the SYN signal indicates that synchronization has been obtained.

If at any time thereafter, synchronization is lost, the BTH pulses from the character bits generator CBG will not occur simultaneously with the most significant bits and a pulse will pass through the gate G204 to reset the counter CC4C. The zero's output of the counter shifts from ground to a negative voltage, triggering the blocking oscillator 203, causing the generation of an SYE pulse which is fed to the character bits generator CBG to force the binary counters back into synchronization and also to the strobe pulse generator SPG to reset the flip-flop F700 to reinitiate the synchronization of the strobe pulses.

It should be noted that the STS signal fed to buffer BB18F prevents the operation of the multivibrator CMV1. The STS signal is present when the coupler DV is to act as a transmitter. The counter CC4C is initially cleared by either the RTT or GCL signals fed via buffer B200 to amplifier A201 whose output is fed to the clear input of said counter.

CONTROL PANEL CP (FIGURE 9)

The control panel CP as shown in FIGURE 9, comprises primarily a plurality of switches whose purpose is to set initially the coupler DV to particular modes of operation. Control panel CP also includes a mechanical counter which counts the number of records transmitted or received by a station and also prints a number on a tape indicative of a record which contained erroneous information.

More particularly, the control panel CP includes the data START SW1 which is a switch of the spring-return type. The switch SW1 is shown in its normal position with the moving contact in contact with the upper fixed contact returned to minus six volts. When the switch SW1 is depressed the moving contact is connected to ground potential and this potential is fed via the MAL signal line to initiate operation at the master station MS. The switch SW2 is a toggle switch which determines whether the coupler DV is to operate as a transmitter or a receiver. When the moving contact of the switch SW2 is in the position as shown, the coupled DV will act as a receiver and the RECV signal line will carry a voltage of minus six volts, whereas the TRSM signal line will be at ground potential. With the switch SW2 in the down position, the coupler DV will operate as a transmitter and the voltages on the TRSM and RECV signal lines are interchanged. The switch SW3 is an initial clear switch of the spring-return type. When the switch is depressed and released, a transient voltage is fed via the plus 20S signal line to all counters and flip-flops of the system to perform an initial clear. The retransmit switch SW16 is a toggle switch which, when the moving contact is in the down position, causes the system to perform retransmissions of records whenever an error is sensed.

The odd-even switch SW12 determines which parity is to be checked during the operation of the system. When the moving contact of the toggle switch SW2 is in the up position as shown, odd parity will be checked. When the moving contact is in the down position, even parity will be checked. The fast read switch SW15 is a toggle switch which is used during the search-edit operation. When the switch is in the up position as shown, a search-edit may be performed provided the copy switch SW13 has been operated.

The check switch SW11 determines whether a parity check is to be performed or not. When the moving contact of this toggle switch is in the up position as shown, a parity check will be made during the transfer of data. The search switch SW14 is used during a search operation in which only reading of tape is desired (no punching) and is a spring-return switch. When the moving contact is momentarily depressed, a charge having a negative potential is accumulated on capacitor C1. When the switch is released, this charge is transferred as a negative going transient on the signal line ONEA to initiate the search operation. The switch SW13 operates in a manner similar to that of the switch SW14 and is used when a copy operation or a search-edit operation is to be performed.

The speed switch SW7 is of the rotary type and indicates at what speed the output unit such as the tape punch TP can operate. If the moving contact is in the first position, a negative voltage will be present on the SDO signal line indicating that information can be received at one hundred characters a second. If the moving contact is in the second position, a negative potential on the SDR signal line indicates that the unit can receive at one hundred and fifty characters per second, etc.

A signal from delay-flop DF105 causes the advancing of the mechanical counter MC. Delay-flop DF105 will be triggered by a signal from gate G900 at the end of each block when the retransmit option is not in force. The delay-flop DF105 is triggered during the retransmit option by a signal from mixer gate M900, at the end of each record as indicated by the EOB signal, provided that the record is an original transmission and not a retransmission due to an error. If an error has occurred, either the minus EEA or the minus EEB signal will be present during the retransmission, preventing the transmission of a signal through the mixer gate M900. A signal from delay-flop DF107 will cause the printing of the count in the mechanical counter MC. The delay-flop DF107 is triggered effectively by pulses from either the mixer gate M901, M902 or M903. Mixer gate M903 will transmit a triggering signal if the coupler DV, acting as a transmitter, has recorded four consecutive errors with the retransmit operation present. Mixer gate M902 will transmit a triggering signal if an error is present in a block during minus retransmit option. Mixer gate M987 will generate a triggering signal if an error is present in a record during the retransmit option. Mixer gate M901 will transmit a triggering signal at the end of transmission to give an indication of the number of blocks transmitted.

It should be noted that mechanical counter MC is provided with an initial clear or reset button COR.

Switch SW17 is the unattended switch which determines attended or unattended operation. During attended operation the switch is in the position as shown and has no effect on the coupler DV. Since there is a connection between DCL1 and DCL2 the opening of the disconnect relay has no effect. During unattended operation, since there is no connection between the lines DCL1 and DCL2 the connection of the transceiver DF to the telephone line is conditioned by the state of the relay. In addition, during unattended operation, switch SW17, in the up position, a UNT signal is generated which is fed to gates G503 and G613 respectively. If the slave station SS is to be a receiver the REC signal will be present at gate G503', causing the activation of delay flop DF502, which generates the TRZ signal. If the slave station SS is to be a transmitter the TRS signal will be present at gate G613' causing the generation of the TRO signal. The TRZ and TRO signals are interlock signals which prevent transmission or reception until the units are up to speed.

During attended operation, neither the relay RL31 nor RL32 is energized and the energization of the tape reader TR and the tape punch TP is manually controlled by the switches TR1 and TP1 on the units respectively. During the unattended mode the UNT signal fed to gates G503 and G613 causes the energization of relays RL31 and RL32, since during the IDLE mode both —REC and —TRS are at a minus six volts. If the unattended station (slave station) is instructed to be a receiver then the —REC signal line goes to ground potential and releases relay RL31. If the unattended station is instructed to be a transmitter the —TRS signal line goes to ground potential and releases relay RL32.

GENERAL MODE CONTROL GM (FIGURE 10)

The general mode control GM is a group of control circuits which are primarily counters that step the coupler DV through its modes of operation. At the master station MS the sequence is Idle mode, Bid mode, Connect mode to Receive or Transmit mode. Whereas at the slave station SS, the sequence is Idle mode, Allow mode, to Receive mode or Transmit mode. The general mode control GM also includes circuitry for discontinuing the Receive or Transmit modes at the start of the Acknowledge mode and for reinitiating respectively the Receive and Transmit modes at the end of the Acknowledge mode.

It should be recalled that the Bid mode, the Allow mode, the Transmit mode, and the Acknowledge mode at the receiver, are characterized by the transmitting of control and/or data information. Therefore, at the start of these particular modes, circuitry is provided for initiating a turnaround cycle at the associated coupler DV. It should further be recalled that the Bid and Allow modes are terminated within the coupler DV that is transmitting at that time and also, that the Connect, the Idle and the Acknowledge modes are terminated at the coupler DV receiving information by the reception of an end-of-mode control character. Accordingly, circuitry is included in the general mode control GM for detecting this character and for terminating these particular modes.

Referring more particularly to FIGURE 10, the sequence for the master station MS will now be described. At the start of operation, when the start switch SW1 is depressed, the MAL signal is received at the allow set input terminal and the set input terminal of counter C100 to set the counter C100, causing the generation of the MSR signal indicating that the associated coupler DV is to be the master. With the setting of the counter C100, a positive going signal is fed from its zero's output terminal to the set input terminal of counter C102, causing the generation of the BID signal. The zero's output of counter C102 at this time transmits a negative going transient signal via gate G150 to amplifier A116 causing the generation of the BDA and —BDA signals. The BDA signal is passed via buffer B114 to cause the generation of the RTS, RTSD and RTT signals by amplifiers A131 and A119 and blocking oscillator BO4–105 respectively, which initiate a turnaround cycle and indicate to the associated coupler DV that a transmission is to start.

At the same time, the RTSD signal is fed to the transceiver DF, causing the usual generation of carrier for echo suppression followed two hundred and fifty milliseconds later by the generation of the STSD signal. The STSD signal is received by amplifier A100A causing the generation of the STS and —STS signals which trigger delay-flop 101 to generate a signal lasting approximately five hundred milliseconds which is characterized as the TRF and —TRF signals by amplifier A124. During the occurrence of TRF and —TRF signals the reference characters are transmitted.

After the generation of the reference characters, the two control characters are generated accompanied by the generation of the INE signal indicating the end of the mode. The INE signal received at the reset input of counter C102, resets the counter to its initial or reset state, causing the termination of the BID signal. As the BID signal terminates, the one's output terminal of counter C102 causes the generation of a positive going transient which is fed to the set input terminal of counter C104, initiating the Connect mode. At the end of the Connect mode, the end of mode character is received and detected by buffer B193 which transmits a pulse to the amplifier A108, causing the generation of an EOC pulse which is fed to the reset input terminal of counter C104, terminating the Connect mode, and to the set input terminal of counter C103. Since the allow set input of C103 is at minus six volts the Allow mode will not be generated. It should be noted that the one's output of the counter C104 is fed to one input terminal of mixer gate M104 and one input terminal of mixer gate M108. At this time, either the REC or TRS signals will be present from the function assignor FA in accordance with whether the master station MS is to be a receiver or a transmitter. If the master station MS is to be a receiver then the disappearance of the CON signal at the second input of mixer gate M104 causes the transmission of a positive going transient via the amplifier A102 to the set input terminal of counter C105, causing the generation of the RCV and —RCV signals. If however, the function assignor FA is generating the TRS signal, indicating that the coupler DV is to be a transmitter, then the disappearance of the CON signal at mixer gate M108 causes the transmission of a positive going transient via the amplifier A104 to the set input terminal of counter C106, causing the generation of the TRM and —TRM signals. The one's output terminal of the counter C106 passes a signal via buffer B103 to the amplifier A104, causing the generation of the TRD signal which alerts the serializer SZ to pass information from the B buffer BB to the transceiver DF.

If the coupler DV is at the slave station SS, then, initially, the counter C101 will be set. The one's output terminal of counter C101 is connected to the input terminal of amplifier A179 which generates the IDLE and —IDLE signals, including the Idle mode. When the general mode control GMC at the slave station SS receives the end-of-mode character, detected by gate G107, the EOC signal is generated which is fed to the set input terminal of counter C103, to initiate the Allow mode. The zero's output terminal of counter C103 generates a positive going transient which is fed via gate G150 to amplifier A116, causing the generation of the BDA and —BDA signals. The BDA signal is fed via buffer B114 to cause the generation of the RTS, RTSD and RTT signals, indicating the start of a turnaround cycle which had been previously described for the master station MS. When the end-of-mode control characters are generated by the function assignor FA of the coupler DV now acting as a transmitter, the INE signal, representing the end-of-mode character is received at the reset input terminal of the counter C103, terminating the Allow mode. It should be noted that the ALL signal is fed to first input terminals of the mixer gates M105 and M109. At the termination of the Allow mode, the ALL signal shifts in a positively going direction, causing the generation of a positive going voltage via either one of these gates, depending on whether the coupler DV at the slave station SS is to be a receiver or a transmitter as described above for the master station MS, and causing the setting of either the counter C105 or C106.

When the Acknowledge mode begins because of the generation of the EOB or EOT pulses, the occurrence of either one of the pulses at buffer B191 causes the generation of the ENBT pulse by amplifier A103 which resets the counters C105 and C106. At the end of the Acknowledge mode the ACK signal fed to one input of the mixer gate M106 and to one input of the mixer gate M110 terminates and a positive going transient is fed via either mixer gate M106 or mixer gate M110 depending on whether the coupler DV is to again be a receiver or a transmitter, and accordingly, setting the appropriate counter C105 or C106.

It should be noted that the buffer B190 has inputs connected to the CON, IDLE and ACK signal lines, assuring that the end-of-mode character from the station then transmitting is only received by the station then receiving during the occurrence of the Connect, Idle or Acknowledge modes respectively. It should also be noted that the buffer B103 receives the LPT, IRF, PTBK and PTS signals which, if any one is present, prevent the generation of the TRD signal so that no spurious information may be transmitted from the B buffer BB via the serializer SZ to the transceiver DF during particular times such as during the reversing of the paper tape during the retransmit operation as characterized by the presence of the PTBK signal.

A BUFFER AB (FIGURE 11)

The A buffer AB comprises seven bit storage units for receiving the bits of a character from one of two sources and transmitting these bits in parallel the next character time later to the B buffer BB. The bits of the character are received serially from the transceiver DF when the coupler DV is operating as a receiver and converts these bits of the character to a parallel representation. When the coupler DV is acting as a transmitter or during the search-edit operation, the bits of the character are received in parallel from the tape reader TR and are fed at the next character time later, in parallel, to the B buffer BB.

More particularly, a typical bit storage unit ABA comprises the flip-flop F211A, whose set input terminal is connected to the output of amplifier A201A. The input of amplifier A201A is connected to the outputs of mixer gate M250A and mixer gate M251A. The reset input terminal of flip-flop F211A is connected to the BAR signal line. Flip-flop F211A has its one's output terminal connected to the BAA signal line and its zero's output terminal to the minus BAA signal line.

When the coupler DV is operating as a transmitter or during the Search-edit mode, the mixer gate M251A is operative. During this time the signals representing the least-significant bits of the characters from the tape reader TR are fed via the PTA1 signal line to a first input of mixer gate M251A. At the same time, the reader controls RC transmits a strobing pulse via the STR signal line to the second input of the mixer gate M251A. If at this time, a signal is present on the PTA1 signal line, a pulse is transmitted via the amplifier A201A to the set input terminal of flip-flop F211A, causing the generation of the BAA and minus BAA signals. A similar phenomenon occurs at the bit storage unit ABB, except that its associated mixer gate M251B receives the second least significant bits from the tape reader via the PTA2 signal lines; in other words, the bit storage units ABA to ABG simultaneously receive the bits via the PTA1 to PTA7 signal lines at their associated mixer gates M251A to M251G. The other inputs of these mixer gates are strobed by the STR pulses. In this manner the character is stored in the seven flip-flops F211A to F211G.

When the coupler DV is acting as a receiver, the mixer gate M250A of the bit storage ABA is operative. The first input terminal of the mixer gate M250A is connected to the output of amplifier A290. The second input terminal is connected to the BTA signal line. The bits of the character being received are fed serially from the output of amplifier A290 to the first input of mixer gate M250A. However, it should be recalled that the BTA signal is a timing signal which occurs only when the least significant bit of the character is being received. Therefore, when the least significant bit of the character is received, the BTA signal will be present at mixer gate M250A, causing this bit, if it is a binary one, to pass as a pulse via the amplifier A201A to set the flip-flop BAA. If this bit happened to be a binary zero, the flip-flop BAA would not be set. At the same time the bits representing the character are also fed to the first input of the mixer gate M250B of bit storage ABB. The second input to the mixer gate M250B is the BTB pulse which is characteristic of the second least significant bit. If this bit is a binary one, a pulse passes through mixer gate M250B at this time, causing the setting of the flip-flop F211B. If this signal is binary zero, then the flip-flop F211B remains unset. A similar phenomenon occurs for the remaining bit storages ABC to ABG. It should be noted that the second input of their associated mixer gates M250C to M250G receive respectively the BTC to BTG pulses which are indicative of unique bits of the character. In this manner, the characters that are received serially are converted to a parallel representation and temporarily stored in the flip-flops F211A to F211G for transmission to the B buffer BB during the next character time.

The signals representing the characters are received serially from the transceiver DF as the DIND signal and are amplified and inverted by amplifier A230 so that their polarity conforms with the polarity of information transmitted throughout the coupler DV. The serial representations of the character are then fed via the minus DIN signal line to one input of buffer B210. The combination of buffer B210 and amplifier A290 acts as a negative gate and will pass the bits representing the character provided the coupler DV is in synchronization and is not transmitting information, that is, as controlled by the absence of the RTS signal. The minus STB pulse at another input of buffer B210 is to permit precise timed strobing of the information. The ILB and LPT signals prevent the reception of extraneous characters, after the longitudinal parity character has been received, since the LP character is known to be the last character. This is a safeguard against noise on the line.

After the bits of the character have been set up in the flip-flops F211A to F211G, it is necessary to clear these flip-flops. The clearing of the flip-flops performs two functions. As the flip-flops clear, the polarities of the signals on the lines BAA to BAG change direction. In particular, if any flip-flop is set, say for example, flip-flop F211A, when it is reset, its one's output will transmit a positive going change of voltage. These positive going changes of voltage are used to set another set of flip-flops which comprise the B buffer BB. In this manner, the information is transmitted from the A buffer AB to the B buffer BB. The resetting of the flip-flops F211A to F211G also prepares them to receive the bits of the next character.

The flip-flops F211A to F211G are reset by a BAR signal which is generated by amplifier A208 whose input is connected to the output of buffer B220. The GCL signals feeding one input of buffer B220 is used to clear initially at the start of operations. Gate G220 is employed to generate the BAR signals when the coupler DV is acting as a receiver. Gate G230 and mixer gate M240, with its blocking oscillator BO12-270, are used together when the coupler DV is operating as a transmitter in order to ensure reliable resetting of the flip-flops F211A to F211G because of a timing problem where the data is placed in the A buffer AB by STR from the reader control RC and simultaneously BTH occurs trying to clear the A buffer AB.

When all the flip-flops F211A to F211G are reset, a signal is transmitted by the EMP signal line, indicating that the character has been transferred from the A buffer AB to the B buffer BB. Gate G204 and amplifier A225 generate the EMP signal.

B BUFFER BB (FIGURE 12)

The B buffer BB generally accepts the bits of the character in parallel from the A buffer AB and transmits these bits in parallel to either the serializer SZ or to the C buffer CB.

The B buffer BB comprises seven bit storage units BBA to BBG inclusive which are similar to the bit storage units of the A buffer AB except that they include controls which regulate the times at which information may be accepted by the B buffer BB. Included in the B buffer BB is means for detecting end sentinel characters. A parity checker is also included in the B buffer BB to indicate the transverse parity of the character presently stored therein.

A typical bit storage unit BBA will now be described. Generally, information for storage in the bit storage unit BBA is received via the BAA signal line from the A buffer AB and transmitted through the buffer B253A to the amplifier A202A whose output is connected to the set input of flip-flop F218A. When, however, an ignore character is to be inserted, the least significant bit of the ignore character is fed via the second input of the buffer B253A as an IG signal. Similarly, if there is a transverse parity error, then the third input is employed and an ERC signal is fed to this third input to cause the generation of the least significant bit of the error character. Buffers B253B to B253F perform the same functions for the flip-flops F218B to F218G inclusive. When the coupler DV is operating as a receiver and there has been an error in the transmission of a record, it is necessary to record a count of the blocks included in the message. Mixer gates M253A to M253D inclusive are used to facilitate this recording. If there had been an error, then at the end of each record the FSC signal would be present at the first inputs of these mixer gates and would permit the gating in of the binary count of the number of the record via the CC1 to CC4 signals inclusive from the block counter BC.

It should be noted that the output of amplifier of A205 is fed to the allow set inputs of each of the flip-flops F218A to F218G. These flip-flops will not accept information while the signal on the output of the amplifier A205 is at a negative potential. During Transmit mode and during the search-edit operations, either the TRM or CPO signals respectively will be present at inputs to buffer B218. If, for example, the TRM signals is present, then the output of the amplifier A205 is at ground potential and the flip-flops will accept information. When the coupled DV is acting as a receiver, the potential of the output of amplifier A205 becomes dependent on gate G212. The potential of the output gate G212 will normally be negative during the receive operation except for the single character time during which the LPT signal is received into the A buffer AB. At this time, the B buffer BB will not accept information when the A buffer AB is cleared. However, when the A buffer AB is cleared, the longitudinal parity character causes counting in the parity check circuit PC.

Information is transmitted from the B buffer BB to the C buffer CB, when coupler DV acts as a receiver, through the agency of the resetting of the flip-flops F218A to F218G. This also occurs during the search-edit operation. The flip-flops F218A to F218G are reset by a signal from amplifier A204, whose output is connected in parallel to the reset terminals of said flip-flops. Under either one of these types of operation a pulse is transmitted as a CLB signal from the C buffer CB to the blocking oscillator BO16–200B. The clearing of the B buffer BB may be delayed if CLB and BTA occur simultaneously. This pulse is generated by the coincidence of the CLB signal from the C buffer CB and the timing signal BTA fed to the gate G200B. When the coupler DV is operating as a transmitter a pulse is transmitted by the mixer gate M215 during the coincidence of the BTG timing signal and the TRM signal which is present during the entire Transmit mode. The mixer gate M202B performs the same function during an operation where only reading occurs, i.e., no punching or transmitting occurs. The mixer gate M213 clears the flip-flops when an error character is to be inserted which overrides the previous bits stored therein. The clearing will occur at the coincidence of the SPL signal and the IEC signal.

The end sentinels are detected respectively by gate G260 and gate G261 which generate the ENA and EMA signals characteristic of the particular end sentinel characters.

Parity checking is performed by the parity checker PCK which receives the outputs of the flip-flops that will generate either an EPE signal or an OPE signal, depending on whether the detected transverse parity is odd or even. A parity checker PCK is hereinafter more fully described in the appendix.

END CIRCUITRY ED (FIGURE 13)

The end circuitry ED receives the end sentinel characters from the B buffer BB and has to determine whether they occur in the particular sequences to indicate whether the end of a record or the end of the transmission has been reached. It should be noted that it is possible for end sentinel characters to be imbedded in portions of the records. However, the particular combinations of three end sentinel characters, serially following each other, is unique for the end of a record and another particular combination is unique for the end of transmission. It is the function of the end circuitry ED to test for these unique sequential combinations.

The end sentinel characters are received via the ENA and EMA signal lines. The end of record combination is an ENA character, followed by an EMA character which is followed by an ENA character. This combination is tested for by the flip-flops F225, F226 and F227. If an ENA character is first received, flip-flop F225 will be set. The zero's output terminal of flip-flop F225 is coupled to the allow set input terminal of flip-flop F226. If the next character received is the end sentinel character, characterized by the EMA signal, the flip-flop F226 will set. The zero's output terminal of the flip-flop F226 is connected to the allow set input terminal of the flip-flop F227. If the third end sentinel character is represented by an ENA signal, then the flip-flop F227 will set, causing the generation of the EBD signal. Since each succeeding flip-flop cannot be set unless the previous flip-flop had been set, it is apparent that the desired sequential combination of end sentinels and only that combination can cause the generation of the EBD signal. For example, if the ENA signal had not been received, but an EMA signal is then received, the flip-flop F226 cannot set, because its allow set terminal is receiving at this time an inhibition signal.

Simultaneous with the generation of the ENA and EMA signals is the generation of the SPL pulses. An SPL pulse will pass through mixer gate M234 to amplifier A273. The output of amplifier A273 is connected to the reset input terminals of the flip-flops F225 to F227. Therefore, it is possible that there will be a simultaneous set and reset of the flip-flops. However, the set condition predominates. It should therefore be noted that the flip-flops F225 to F227 operate somewhat in the manner of a shifting register.

The flip-flops F228 to F230 operate in the same manner as the flip-flops F225 to F227. The function of the flip-flops F228 to F230 is to detect the particular sequential combination of end sentinels which is indicative of the end of transmission. When this combination is detected, the EBT signal and the ETD signal are generated, indicative of the end of transmission combination. Either the EBD or the ETD signal passes through buffer B217 to cause the generation of the ENS signal by amplifier A213. The ENS signal is a signal which indicates that either the end of a record or the end of transmission has been reached. It should be noted that the minus ENS signal is fed to the other input of mixer gate M234 to prevent any further resetting of the flip-flops so that the end sentinel signal ENS remains present until the record containing it is completely processed. This occurs when a CLE signal is fed via buffer B219 to the amplifier A273. The second input the buffer B219 receives, the GCL signal, which is the initial clear at the start of the operation.

It should be noted that the ENHB signal is fed to the allow set terminals of flip-flop F225 and flip-flop F228 to prevent the detection of the end sentinel character combinations when information is being handled in the reverse direction such as during the retransmit operation or the search-edit operation.

RETRANSMIT CONTROLS RT (FIGURE 14)

The retransmit controls RT performs the function of sensing for the receipt of an error signal during the Acknowledge mode, to initiate a Retransmit mode. The retransmit controls RT causes the tape reader TR, at the transmitter: to back up to the start of the block; to sense for the end sentinels at the start of the block; to stop the tape reader TR; and start it in the forward direction to retransmit the block. Since the paper tape stops in the forward direction on the character following the last end sentinel character of the record, a problem may arise when the tape is reversed, for the first three characters detected will be the end sentinel characters and they may cause the tape reader TR to stop. Therefore, included in the retransmit controls RT is circuitry which prevents the sensing of the first three characters read in the reverse direction. This is accomplished by preventing the generation of the normal strobe pulses while the first three characters are read.

Referring now to FIGURE 14, if an error character is received during the Acknowledge mode, the BAF signal will be present at the gate G666 and will cause the setting of the flip-flop F666 which generates the REE and the minus REE signals. The REE signal is fed to one input of gate G610 whose other input receives the ACK signal. When the Acknowledge mode terminates, the ACK signal will shift from a negative voltage to ground potential, generating a positive going transient which resets flip-flop F666, and causes the setting of counter C604 when the positive going transient passes through gate G610 and buffer B695 to amplifier A696 whose output is connected to the set input terminal of counter C604. When counter C604 sets, the PTBK and minus PTBK signals are generated which cause the tape reader TR to move tape in the reverse direction. The paper tape now moves in the reverse direction. Just prior to the PTBK signal coming on, the minus PTFW signal returning to minus six volts generates a pulse via gate G673 and buffer B673 to blocking oscillator BO24–604 to initially clear flip-flops F601 to F603.

In the reader controls RC, strobe pulses will not be generated until the ABL signal is present. As the first character is read in the reverse direction, the tape sprocket pulse PSPU is present, causing the setting of the flip-flop F601. When the second character is read, the PSPU signal is again present causing the flip-flop F602 to set. When the third PSPU signal is present, the flip-flop F603 will set, causing the generation of the ABL signal. The sequential setting of these flip-flops is possible since the zero's output terminal of the preceding flip-flop is connected to the allow set input terminal of the succeeding flip-flop. Therefore, for example, flip-flop F602 cannot set until the flip-flop F601 has been set.

Flip-flops F234 to F236 detect the combination of end sentinels which indicate the end of a record in the same manner that the flip-flops F225 to F227 of the end circuitry ED of FIGURE 13 perform the detection; except that the combination must be sensed in the reverse direction. When the combination is sensed in the reverse direction the RBD signal is generated by flip-flop F236. Similarly, the flip-flops F237 to F239 sense for the combination in reverse of the end sentinel characters indicative of the end of transmission, in the same manner that the flip-flops F228 to F230 of the end circuitry ED detected for them in the forward direction. When the combination of end sentinel characters for end of transmission in the reverse direction has been sensed, the RTD signal is generated by flip-flop F239.

The RBD signal, when generated, is fed to one input of the mixer gate M283 and to one input of gate G208. If the RBD signal has been generated by the end of block which is associated with the first record of the block, the CTZ will be present at the second inputs of both of these gates. During the retransmit operation, the PTPK signal will be present at the third input of gate G208, causing a pulse to pass via buffer B285 to generate the PTS signal which stops the paper tape movement. During a search-edit operation, the SED signal will be present at mixer gate M283, causing a pulse to pass through at this time, causing the generation of the PTS signal by amplifier A220. Mixer gate M283 is used during a search-edit operation when the retransmit option is not employed to perform the same function. If the end sentinels caused the generation of the RTD signal, indicating the end of transmission, the RTD signal passes via buffer B285 to cause the generation of the PTS signal by amplifier A220. The PTS signal cooperates with a minus PSP signal at gate G611 to reset the counter C604, terminating the PTBK and minus PTBK signals, ending the reverse directions of the movement of the paper tape. As the PTBK signal disappears, a positive going transient is fed to the set input terminal of counter C605, causing the generation of the BACK and minus BACK signals which indicate that the tape had moved in the opposite direction and has stopped reversing. The minus BACK signal is fed to the reader controls RC to prevent the strobing of the three first characters read, since again, the paper has stopped at the character following the end sentinel characters. When the paper tape stopped reversing, the minus PTBK signal returned to minus six volts and since the minus PTFW signal was at minus six volts a pulse was generated via blocking oscillator BO24–604. This pulse initially clears the flip-flops F601 to F603 and three paper tape sprocket pulses are counted before the regeneration of the ABL signal which is fed to the reader controls RC to permit the strobing of the succeeding characters that are read from the tape reader TR. When the ABL signal is generated, the minus ABL signal which is fed to the set input terminal of the counter C690, causes the generation of the EBK signal which is fed to the error circuitry EC for use therein.

ACKNOWLEDGE MODE CONTROL AK (FIGURE 15)

During the Receive and Transmit modes the acknowledge mode control AK counts the number of characters handled and when a predetermined count is reached, alerts circuitry to sense for the end of the record being handled. When the end of this record is reached, signals are generated which result in the initiation of the Acknowledge mode. It should be recalled that the Acknowledge mode may also be initiated by end sentinel signals which indicate the end of transmission instead of the end of a record. The acknowledge mode control AK also includes circuitry for sensing the occurrence of these end sentinels. At the end of the Acknowledge mode, if the transmission had been error-free, the acknowledge mode control will generate a signal initiating the sequence which ends with the stations being disconnected from the telephone lines.

Referring to FIGURE 15, the N-stage binary counter BC300 counts the number of characters transferred. It should be noted that the N-stage binary counter BC300 may have a desired number of stages since the predetermined count can be selected to have any value to provide an optimum record length. The input to the binary counter BC300 is the amplifier A367 whose input is fed by the output of buffer B301. The actual counting input is the signal minus SPL which is a pulse that is generated as a character, transmitted from the A buffer AB to the B buffer BB. The ENS signal which is fed to a second input of the buffer B301, inhibits counting when the end sentinel characters are detected. The third input to the buffer B301 is the output of gate G308 which permits character counting only during the Receive mode, the Transmit mode or the search-edit operations. The N-stage binary counter BC300 is initially cleared by a GCL signal fed via one input of buffer B303 to the clearing amplifier A368. The RTT signal clears the counter at the start of a Transmit mode. The third input to buffer B303 is connected to the output of blocking oscillator BO4–310 whose input is connected to the output of mixer gate M367. Mixer gate M367 transmits a pulse at the end of the reversal of the paper tape during the retransmit operation. Solely by way of example, the predetermined count when the retransmit operation is to be performed, is $2^N$. Accordingly, when a count of $2^N$ is reached, a pulse passes via mixer gate M334 to the amplifier A314. Also, solely by way of example, if the retransmit operation is not to be performed the amplifier A314 receives a signal from mixer gate M333 when the predetermined count reaches one, so that a block will contain only one record.

Mixer gate M393 is used during the retransmit operations to ensure that no more than a maximum number of blocks is included in a record. If the number of blocks exceeds 15 then a MAX signal is automatically forced.

In any event, the MAX signal is fed to one input of gate G205. The EBD signal which is received at the second input of gate G205, indicates the end of a record. The CLE signal is basically used as a strobing signal. Thus, when the end of a record is reached, a pulse passes through gate G205 to cause the generation of the EOB pulse provided the MAX signal is present. If however, the end sentinels indicate an end of transmission, then a pulse passes through gate G206 causing the generation of the EOT pulse. Either the EOB or the EOT pulse is transmitted to the general mode control GM to end the Transmit or Receive modes. The general mode control GM in turn feeds back an ENBT pulse which is fed to the set input terminal of counter C139, causing the generation of the ACK and the minus ACK signals, representative of the Acknowledge mode. At the end of the Acknowledge mode, the REC signal and INE pulse, at the receiver, transmit a pulse via mixer gate M152 and amplifier A133 to the reset input terminal of counter C159. The counter therefore resets, ending the Acknowledge mode. At the transmitter the TRS and EOC signals at mixer gate M151 perform this function. If the transmission of the block preceding the end of transmission end sentinel characters was error-free, then the EOT pulse sets the flip-flop F117. An error-free condition will exist when the ERR signal at the allow set input of the flip-flop F117 is at ground potential. The flip-flop F117 generates the ETT signal which is fed to an input of gate G151. At the end of the Acknowledge mode the pulse transmitted by amplifier A153 in addition to being fed to the reset terminal of counter C139, is fed to a second input of gate G151, causing the transmission of a BTH timing pulse to the amplifier A155 which generates the EOTR signals that initiate the disconnect routine. The circuitry associated with REF signal generation is concerned with magnetic tapes and is not pertinent to the present discussion.

IGNORE AND INSERT CIRCUITS II (FIGURE 16)

The ignore and insert circuits II generate an error character whenever a vertical parity error is detected and also generates an ignore block character whenever an error is detected in a block.

Whenever a vertical parity error is detected, a pulse is transmitted via gate G312 to the set input terminal of counter C383 which generates the IEC signal that is fed to the first input of gate G311. During the occurrence of a sampling pulse, a minus SPL signal is fed to the input of the blocking oscillator BO4-303, causing the transmission of a pulse via the gate G311 to the amplifier A327 which generates the ERC signal, characteristic of an error character. The counter C383 can also be set when there is a synchronization error as indicated by the occurrence of an SYE signal at a first input to the gate G310 during the Receive mode. The output of gate G310 is fed via amplifier A305 to the second input of gate G312. If there is an error in the block, then at the end of the block the simultaneous occurrence of the BTH, ILB and ERR signals at buffer B302 causes the transmission of a pulse to amplifier A305 which generates an IG signal indicating that the last block should be ignored. Both the ERC and IG signals are fed to the B bufffer BB to generate the appropriate characters which are then transmitted or are punched on the paper tape.

SERIALIZER SZ (FIGURE 17)

The serializer SZ generally receives the characters with their bits in parallel from various units of the coupler DV and transmits them serially to the transceiver DF.

The contents of the B buffer BB is fed in parallel to the various mixer gates of the serializer SZ. In particular, the least significant bit, as the BBA signal, is fed to one input of mixer gate M410. The second least significant bit, as the BBB signal, is fed to one input of the mixer gate M440. The third least significant bit, as the BBC signal, is fed to one input of the mixer gate M411. The next least significant bit is fed to one input of the mixer gate M441 as the BBD signal. The BBE signal, representing the next least significant bit is received at one input of the mixer gate M412. Mixer gate M452 receives the next least significant bit as the BBF signal. The BBG signal is fed to one input of the mixer gate M433. It should be noted that each of these mixer gates has a second input terminal which receives the TRD signal so that these mixer gates can only pass signals during the Transmit mode. It should also be noted that each one of these mixer gates has a third input connected to one of the BTA to BTG signals. It should be recalled that these signals occur sequentially, one bit time apart, and represent the bits of a character, with the BTA signal representing the least significant bit, the BTB representing the next least significant bit, etc. Therefore, during the Transmit mode when the B buffer BB is presenting the bits in parallel to the serializer SZ, if the bit in the least significant bit position is a binary one, then a pulse is passed from mixer gate M410 through buffer B400 to amplifier A400 and is transmitted on the DAD signal line to the transceiver DF. During the next bit time, the BTB signal will gate the bit present at mixer gate M440 through the buffer B400 to the DAD signal line. Following the occurrence of the BTG signal, there is generated the BTH signal which is considered the most significant bit of the eight bit characters. The BTH signal is always fed through buffer B400. In other words, regardless of the character being transmitted, there will always be a binary one in the most significant bit position.

At the end of each block, the longitudinal parity count is also transmitted to the receiver. The longitudinal parity count is received from the parity circuitry PC by the parallel combination of the LPA to LPG signals which are fed to one input respectively of the mixer gates M430, M460, M431, M461, M442, M413 and M443. It should be noted that each of these mixer gates has a second input connected to the LPT signal line which controls the time of transmission of the bits. In addition, each one of these mixer gates receives respectively the BTA to BTG signals which serialize the bits in the same manner that the bits from the B buffer BB are serialized.

During the Connect mode, the mixer gates M450, M421 and M451 at the receiver, transmit second control characters which indicate to the transmitter the rate of transmission. The mixer gate M240 will transmit a control character to indicate to the other station that it is to act as a receiver. Mixer gate M422 transmits an end of mode pulse during the Bid or Allow modes and the mixer gate M432 transmits an end of mode pulse at the end of the Acknowledge mode. If an error had been received during the reception of the information, then during the Acknowledge mode the mixer gate M462 will transmit an error character.

FUNCTION ASSIGNOR FA (FIGURE 18)

The function assignor FA has two main purposes. It generates control signals indicating whether the associated coupler DV is to operate as a transmitter or as a receiver. At the master station MS it receives signals from the control panel CP of the associated coupler DV, indicating whether the coupler is to act as a transmitter or as a receiver. At the slave station SS, it receives a control character from its associated A buffer AB which sets flip-flops to indicate whether the coupler DV is to act as a transmitter or as a receiver. At the slave station SS, once the role of the coupler DV is indicated, complementary control signals are fed back to the master station MS for re-confirmation as to the role of the other station. The second function of the function assignor FA is to generate at the coupler DV which is finishing a turnaround cycle, the time periods for the first and second control characters and to generate the signal for the second control character which is used internally within the coupler DV to indicate the end of the mode.

Referring more particularly to FIGURE 18, amplifiers A130 and A131 generate respectively the REC and TRS signals that are characteristic of a receiver and a transmitter respectively. At the start of operations at the master station MS the MSR signal is fed to a first input of the mixer gates M132 and M133 respectively. The second input terminals of these gates are connected respectively to the RECV and TRSM signal lines from the control panel CP. If the master station MS is to be a receiver then the RECV signal will be present at the second input of mixer gate M132 which accordingly passes a signal to the input of amplifier A130, causing the generation of the REC signal and if the control panel CP is transmitting a TRSM signal, indicating that the master station MS is to be a transmitter, then the mixer gate M133 passes a signal to the input of amplifier A121 causing the generation of the TRS signal. At the slave station SS, the flip-flops F113 to F116 inclusive are operative during the Idle mode as indicated by the presence of the IDLE signal which passes via buffer B106, amplifier A106', buffer B292 and amplifier A106 to the allow input terminals of said flip-flops. When the slave station SS receives a first control character during the Idle mode which indicates its future role, one of the BAA to BAB signals will be present, causing the setting of one of the flip-flops. For example, if the coupler DV at the slave station SS is to operate as a receiver, then, provided there is no error in transmission, the BAA signal only will be received and the flip-flop F113 will be set, causing the generation of the CDA signal which is fed via buffer B291 to the amplifier A130 causing the generation of the REC signal. If the coupler DV at the slave station SS is to be a transmitter then one of the BAA to BAB signals will be present and its associated flip-flop will set, causing the generation of one of the CDB to CDD signals which are fed via buffer B109 to the input of amplifier A121, causing the generation of the TRS signal. It should be noted that if the receiver is to receive at one hundred characters per minute then the BAB signal will be received. However, if the receiver is to receive at one hundred and fifty characters per minute the BAC signal is received, causing the setting of the flip-flop F115 and the generation of the CHR signal by amplifier A101 whose input is connected to the one's output of flip-flop F115. The CHR signal is fed to the tape reader TR causing it to transmit at this higher rate. It should be noted also that during the search-edit operations the CPO signal will be present at buffer B292, preventing the possible setting of any of the flip-flops F113 to F116 because at this time there must not be any intercommunication between the master and slave stations.

It should also be noted that the CON signal at a second input of buffer B106 permits the setting of the flip-flops F113 to F114 during the Connect mode at the master station MS so that it can receive the complementary confirming control character from the slave station SS which indicates that the master station MS should be a receiver if the slave station SS has been instructed by the master station MS to be a transmitter, and vice versa. The operation takes place to insure the reliability of the telephone lines before a data transfer takes place.

The circuitry associated with binary counters BC204, BC205 and BC206 generates the time slots for the control characters which are generally transmitted immediately following the transmission of the reference characters. The binary counters BC204, BC205 and BC206 are initially cleared by a GCL signal fed to one input of buffer B290 at the start of operations. However, the main clearing occurs when the RTT signal is generated by the general mode control GM at the start of a turnaround cycle. The RTT signal, when received by a second input of buffer B290 is passed to amplifier A290 whose output is connected to the clear inputs of binary counters BC204 and BC205.

The binary counters BC204, BC205 and BC206 count BTH signals which occur once per character time. The BTH signal line is connected to one input terminal of buffer B201 whose output is connected via amplifier A291 to the input terminals of binary counter BC204. The BTH signals will not pass through buffer B201 until the disappearance of the TRF signal which is present during the transmission of reference characters. It should be noted that: the presence of the minus STS signal insures that counting only during this turnaround time; the presence of the TRD signal prevents counting during the Transmit mode; the TRZ signal acts as a time delay interlock during unattended operations at the slave station SS when it is to be a receiver; the TRO signal similarly acts as a time interlock during unattended operations when the slave station SS is to be a transmitter.

When the first BTH signal is counted, binary counter BC204 generates the CTA and minus CTA signals; at this time neither the CTB and minus CTB signals are generated by binary counter BC205, nor are the CTC and minus CTC signals generated by binary counter BC206. This state of the signals is indicative of the first control character time during which a receive, transmit or an error character is generated. When the second BTH signal is generated the binary counter BC204 stops generating the CTA and minus CTA signals and the binary counter BC205 generates the CTB and minus CTB signals. The state of binary counter BC205 remains unchanged. This state of the signals is indicative of the second control character, i.e., the end of mode character. The absence of the CTA signal and the presence of the minus CTB signal at inputs to buffer B216 causes the generation of the INE signal by amplifier A210 to indicate the end of the mode to the coupler DV which have been transmitting. The IRF signals generated by amplifier A211 are used when the input and output units are magnetic tapes and need not be discussed since they are not part of the present disclosure. Similarly, the flip-flop F116 generates the CDD signals which are indicative that the output device is a punched card apparatus and need not be considered.

ERROR AND CLEAR CIRCUITRY EC (FIGURE 19)

The error and clear circuitry EC has two main functions. First, to record the fact that an error has occurred and second, to disconnect the transceivers DF from the telephone lines under certain conditions such as: when the end of transmission is reached; when it appears at the start of transmission that the telephone lines are noisy; during the transmission of information when there are four consecutive records in error when there is no retransmit operation in effect; when there are four consecutive transmissions of the same block, when the retransmit operation is in effect; when the system locks in the Connect or Acknowledge modes; or when no information passes through the A buffer AB for a given period of time.

The flip-flop F199, when set, records the fact that an error has been detected. The errors recorded by the flip-flop F199 are indicated by the occurrence of various signals at the input of gate G114 which is operating as a negative buffer. If the ICE signal is present, indicating that an error character has been detected in the A buffer AB at the receiver, this is in effect an error and is recorded. Similarly, the presence of the CHE signal at the second input of gate G114 indicates the fact that an ignore last block character has been detected in the B buffer BB and this in effect is an error. Similarly, the presence of the —REE signal indicates that during the Acknowledge mode the transmitter has received from the receiver a character indicating that the receiver detected an error in the last block that had been transmitted. If a vertical parity error or a longitudinal parity error is detected by the parity circuitry PC of either the transmitter or the receiver, then the —VPE or —LPR signals respectively will be present at inputs of gate G114. Finally, if during the Receive mode a synchronization error is detected, then the occurrence of the SYE signal at an input to G111 causes the transmission of a signal from the negative output of amplifier A118 and this error is recorded by the setting of the flip-flop F119.

The flip-flop F199 is reset by the generation of a BKR signal by the blocking oscillator BO4–180 which is triggered from the negative output of amplifier A114. Amplifier A114 will receive a pulse to initiate the clearing at various times during the operation. The GCL signal will cause the clearing via buffer B185 at the start of the operations. A clearing pulse will be fed from the mixer gate M134 to the input of amplifier A114 at the end of every record received or transmitted, provided the retransmit operation is not in effect. The mixer gate M112 will transmit a pulse at the end of the Acknowledge mode at the transmitter, provided no error has been detected. At the end of the Acknoweldge mode at the receiver during a retransmit operation, the mixer gate M113 will pass a pulse. During the Retransmit mode at the transmitter, if an error has been recorded, the mixer gate M185 will transmit the clearing pulse. Each time the flip-flop F199 is set and then reset, a positive going signal is transmitted from the one's output terminal via the amplifier A180 to the binary counter BC100. If another error is recorded, then the set and reset cycle of flip-flop F199 is traversed causing a second error signal as a positive going transient to be recorded in the binary counter BC100 and the binary counter BC101. In this manner the binary counters BC100 and BC101 count the errors. When a third error has been counted, both the binary counter BC100 and the binary counter BC101 will be in the set conditions and generating the —EEA and —EEB signals respectively. These signals are fed to inputs of buffer B111. If another error is recorded, then the —ERR signal will be present at the third input to buffer B111 which operates as a negative gate. Finally, when the clear pulse is generated in the usual manner, that is, the reset pulse for flip-flop F199, the BKR signal is transmitted via amplifier A102B to the fourth input of buffer B111 causing the generation of the FCE signal by amplifier A187 which indicates there has been four consecutive errors. It should be noted that anytime an error is not recorded, the clear signal transmitted by the positive output terminal of amplifier A114 cooperates with the signal from the zero's output terminal of flip-flop F199 to cause a clearing pulse to be fed via amplifier A105 to the clearing terminals of binary counters BC100 and BC101, causing them to clear back to a count of zero. It should be noted that the occurrence of the GCL signal passes through buffer B180 to perform the initial clearing of the binary counters BC100 and BC101.

The chain of logical elements ending in amplifier A101, amplifier A125 and flip-flop F117, is concerned with disconnecting the transceivers from the telephone lines and with reclearing the coupler DV to its initial condition. Amplifier A101 generates the CLR signal which clears certain counters in the coupler DV. Similarly, amplifier A125 generates the GCL signal which is a general clearing of other counters throughout the coupler DV. When the flip-flop F117 is set, the DCL signal is generated and passes via amplifier A186 to energize relay RL100. When relay RL100 is energized, its normally closed contacts open, causing an open circuit between the lines DCL1 and DCL2. The opening of this circuit causes the transceiver DF to disconnect itself from the telephone lines.

The above-described disconnect circuitry is energized by virtue of signals fed from the output of amplifier A199. Amplifier A199 will transmit a signal under certain conditions. When the FCE signal is generated indicating that four consecutive errors have been recorded, a signal is fed from amplifier A187 via buffer B186 to the input of amplifier A199. If a connect error is recorded the CNE signal is fed to buffer B186. A connect error occurs at the start of transmission when one of several conditions exist: if both the REC and TRS signals are present at mixer gate M127 there is a connect error because these signals are mutually exclusive. For example, if the master station MS is to be a transmitter, then its control panel CP will generate the TRS signal and a control character is transmitted to the slave station SS indicating it is to be a receiver. In response to this control character the slave station SS returns a control character, which, if everything is correct, should again cause the generation of the TRS signal. However, if there was an erroneous transmission or reception due to a poor line connection, the received control character may be decoded to indicate that the master station MS is to be a receiver. This is an error. Also, during this interchange of control characters to determine transmitters and receivers at the start of operation, one and only one of the CDB to CDD signals should be present at the receiver. Hence, if more than one of these signals is present, indicating conflicting transmission rates, then one of the mixer gates M128 to M130 will transmit a pulse to the amplifier A111. Also, at this time, one of the CDA to CDB signals must be generated. If none of these signals is generated, then the station has not been told what its function is to be and an error has occurred. Accordingly, mixer gate M131 transmits a pulse at the end of the mode during which the role of the stations should be established. Under any of these conditions the CNE signal is generated by amplifier A111, resulting in the disconnect procedure. A disconnect procedure may be initiated if the coupler DV remains in the Connect or Acknowledge modes for a prolonged period of time. Normally, the coupler DV should remain in these modes for approximately two-thirds of a second. However, if the coupler DV remains in either of these modes for a period of time exceeding two seconds then the disconnect procedure will be initiated. To detect this condition, the retriggerable delay-flop RDF100, having a two-second delay, is used. The retriggerable delay-flop RDF100 will not initiate a delay period as long as its input is at a negative voltage. If its input goes to ground potential and remains at ground potential for two seconds, a signal is fed from its output via buffer B186 to initiate the disconnect procedure. The input of retriggerable delay-flop RDF100 is the gate G115 which is connected to the —CON and —ACK signal lines. During the Connect modes the —CON signal is at ground potential and passes through gate G115. Similarly, during the Acknowledge mode the —ACK signal line is at ground potential and this potential is fed via gate G115 to the input of retriggerable delay-flop RDF100. During the absence of both the —CON and —ACK signals, their associated signal lines are at negative potentials and consequently the output of the gate G115 is also at a negative potential. The last condition for causing the initiation of a disconnect procedure is if there is the absence of data in the A buffer AB for more than thirty seconds. If the A buffer AB contains information, the simultaneous occurrence of the —EMP and BTH signals at gate G140 set the counter C180, causing a negative voltage to be fed from its one's output terminal via buffer B185 to the input of retriggerable delay-flop RDF 101. When the A buffer AB is cleared, that is, when its contents are transferred to the B buffer BB, there will be the generation of the EMP signal and the simultaneous occurrence of the EMP signal and the BTH signal at gate G141 cause the resetting of the counter C180. The signal from the zero's output terminal of the counter C180 causes the triggering of the gated delay-flop GDF 112 which now applies a negative voltage to the input of retriggerable delay-flop RDF101 for two hundred milliseconds. If the A buffer AB did not receive another character, then the counter C180 will not be set and after the two hundred millisecond period, the input of retriggerable delay-flop RDF101 will be at positive potential and if this potential remains for thirty seconds, retriggerable delay-flop RDF101 will transmit a pulse via buffer B186 to amplifier A199, initiating the disconnect procedure.

READER CONTROLS RC (FIGURE 20)

The reader controls RC performs two functions, namely; to control the forward movement of the paper tape in the tape reader TR by the generation of the PTFW signals and to generate strobe pulses STR from the sprocket pulses PTST generated by the tape reader TR.

Referring to FIGURE 20, the sprocket pulses from the tape reader TR are received as the PTST signals by the delay-flop DF650 which introduces a four millisecond signal during which no other pulses PTST may be detected and are fed to blocking oscillator BO4–601 which with amplifier A677 causes the generation of the PSP and —PSP signals. The PSP signals are fed via amplifier A677, blocking oscillator BO8–660, and amplifier A660 to blocking oscillator BO4–602 to become the PSPU signals that are fed to inputs of mixer gates M601, M602, M603 and M650. During most operations the PSPU pulses pass via mixer gate M601 to the input of amplifier A608 which generates the STR signals or the strobing pulses used to sample the flip-flops of the A buffer AB. Since the paper tape of the tape reader TR generally starts with the character already in position, it is not possible to generate a sprocket pulse at this time. Therefore, the mixer gate M600 simulates the first sprocket pulse. Mixer gate M600 will pass a pulse upon the generation of the PFPU signal which is a pulse generated when the paper tape reader is started in the forward direction. Mixer gates M602 and M603 permit the passage of the sprocket pulses during retransmit operations, since at that time the —BACK signal is present and prevents operation of the mixer gates M600 and M601. Mixer gate M602 operates when the paper tape in the tape reader TR is moving in the reverse direction and only starts the passing of the PSPU pulses after the third character has been read, when the ABL signal is generated, so as to prevent the strobing of the three first characters which are end-sentinel characters. Mixer gate M603 performs a similar function; only it operates when the paper tape is moving in the forward direction after it has reversed and stopped.

The paper tape is moved in the forward direction upon receipt of the PTFW signal by the tap reader TR. The PTFW signal is generated when the counter C606 is set. The setting of the counter C606 is performed by amplifier A690. Amplifier A690 will receive a positive going transient which it transmits to the set input terminal of counter C606 at the end of the Allow mode, when the slave station SS is to operate as a transmitter. This positive going transient is transferred from mixer gate M605. When the master station MS is to operate as a transmitter, mixer gate M604 transmits a positive going transient when the TRF signal terminates at the end of the transmission of reference characters. At the start of the search-edit operation the GOP signal is fed via gate G671 and buffer B600 to cause the tape to move in the forward direction. During retransmit operations after the paper tape has been backed up to its starting position, the tape is again moved in the forward direction. The occurrence of the PSP and PTS signals at mixer gate M609 at this time, cause the generation of a FWD signal by the delay-flop DF602 which is fed to the second input of buffer B600, after a seven millisecond delay.

Paper tape forward motion is stopped when a signal is transmitted from amplifier A691 to the reset input terminal of counter C606. Generally, the paper tape will be stopped at the end of every record to permit the insertion of a longitudinal parity character for transmission over the telephone line. Mixer gate M631 transmits a pulse upon the occurrence of the ENS signal, indicating the end of a record. This pulse is fed to amplifier A691, causing the resetting of counter C606. Immediately after the appearance of the ENS signal, indicating that the parity character has been inserted, a pulse is transmitted from mixer gate M621 which is fed to amplifier A690 to restart the paper tape. If the tape reader TR is transmitting characters faster than they can be accepted by the A buffer AB, it is necessary to momentarily halt the movement of the paper tape. Mixer gate M607 performs this function. If a PSP signal occurs during the presence of the —EMP signal, which indicates that the A buffer AB is not empty at this time, a pulse is passed to amplifier A691 to momentarily stop the tape for seven milliseconds. At the same time, the —EMP and PSP signals cooperate at mixer gate M608 to trigger the delay-flop 602 which, after seven milliseconds, transmits a FWD pulse which is fed via buffer B600 to amplifier A690 causing the again setting of the counter C606, starting the paper in the forward direction again. The paper tape is also stopped at the start of the Acknowledge mode. The STP signal, cooperating with a PSP signal at mixer gate M606, transfers a pulse to amplifier A691 to reset the counter C606. The STP signal is generated when the ETD signal is present at an input to buffer B218. The ETD signal will occur at the end of transmission and initiates an Acknowledge mode. Similarly, the simultaneous occurrence of the EBD and MAX signals at the end of a block, not during a search-edit operation, at gate G207, initiates an Acknowledge mode and causes the transmission of a pulse via another input of buffer B218 to amplifier A219, causing the generation of the STP and —STP signals.

It should be noted that when the counter C606 is set, the PTFW signal transmits a signal to buffer B603 causing the generation of a single PFPU pulse. Furthermore, it should be noted that the PTBK signal is fed to the allow input terminal of counter C606. When the PTBK signal is present, indicating that the paper tape is moving in the reverse direction, the counter C606 is prevented from setting, regardless of any set signals received from amplifier A690. The function of the HLT signal at an input of buffer B218 is to stop forward motion during an off-line read function such as copying tape.

RECORD COUNTER RK (FIGURE 21)

The record counter RK performs the following functions. It counts records in a block during transmission so that if a retransmission is called for and the tape is reversed, an indication may be given when the start of the block is reached. It also counts records in a block so that if a character is sensed, which indicates that the block is to be ignored because of an error, it permits the generation of a character that represents a record count which is inserted before the ignore character, so that during a search-edit operation it is known how many records to skip over.

The first function is performed by accumulating a count of records, except the record in which the MAX signal occurs during transmission, and retaining the accumulated count. If a retransmission is called for, and during the retransmission subtractions are performed as each record is sensed until the count reaches zero indicating that the end of the record after which the zero count is reached is the start of the block to be retransmitted.

The record skipping operation is performed in the search-edit operation by first sensing the ignore character and then gating the next character which represents the number of records to be skipped over into the record counter RK to preset it to this count. Then as each end of the record is sensed, a unit of subtraction is performed until the count in the record counter RK reaches zero, indicating that this record is the last to be ignored.

The record counter RK is basically a four-stage cascaded, binary counter comprising the counters C800 to C803. Unit additions may be performed when the zero's output of one counter, such as counter C800 is connected to the set input of the succeeding counter such as counter C801. Similarly, unit subtractions may be performed when the one's output of a counter such as C800 is connected to the set input of the succeeding counter such as counter C801. Since their inter-stage couplings are substantially the same, the couplings between counter C800 and C801 will only be discussed. The one's output of counter C800 is coupled via blocking oscillator BO4–800 to one input of mixer gate M804, whose output is connected to amplifier A802, which feeds the input to counter C801. The second input of mixer gate M804 is the output of amplifier A807, namely, the SUB signal line. Thus when unit subtractions are to be performed, a signal will be present on the SUB signal line, permitting the mixer gate M804 to pass signals from blocking oscillator BO4–800. The zero's output terminal of counter C800 is coupled via one input of the mixer gate M805 to the amplifier A802. The second input of mixer gate M805 is connected to the output of amplifier A861, that is, the ADD signal line. Thus, when an ADD signal is present, signals from the zero's output terminal of counter C800 may be passed by mixer gate M805 to the input of amplifier A802. The ADD signal will be present only during the absence of the ENHB signal from amplifier A850 which is fed from buffer B850. The ENHB signal will therefore only be present if either the PTBK or SED signals are present at inputs of buffer B850. The PTBK signal will be present during the time that the tape is reversing at the start of a retransmit operation. The SED signal will only be present during the search-edit operation. It should be noted that during these two operations the record counter RK should be performing subtractions. The SUB signal will be present only during the absence of signal from the buffer B850 which feeds the input of amplifier A807. Thus, during the presence of the ADD signal, a signal will be present at the output of buffer B850 and consequently the SUB signal will not be generated. Thus, it is seen that the ADD and SUB signals are mutually exclusive.

The units input during ADD operations is mixer gate M800, which is operative when retransmissions may be desired, as indicated by the presence of the RTO signal at one input. At the end of each block, a CLE signal will be generated. Effectively, these CLE signals are the units that are counted. It should be noted that when the —MAX signal is generated, that the next occurring end of block signal indicated by CLE is not counted. During subtractions, the input is mixer gate M801 and the RBD end of block signals are counted. When the record counter RK reaches a count of zero as indicated by the simultaneous occurrence of the —CC1 to —CC4 signals at gate G800, the CTZ and —CTZ signals are generated by amplifier A808. The —CTZ signal is fed to another input of mixer gate M801 to prevent a unit subtraction after that time. Gate G849, whose output feeds the third input of mixer gate M801, insures that unit subtraction inputs are only possible during either the reversal of the paper tape or during the search-edit operation.

It will be recalled that during the search-edit operation, when an ignore character is generated, it is necessary to pre-set the stages of the record counter RK to the count rerpesented by the next occurring character. When the ignore character is detected, an SPP signal is fed from the search-edit unit SE and received at blocking oscillator BO4–803 which feeds a pulse via buffer B801 to amplifier A805, whose output is connected to the clear input terminals of the counters C800 to C803 to clear them to zero. At the same time, the pulse is also fed to the set input terminal of counter C804, generating the FCC signal which is fed respectively to inputs of the mixer gates M802, M806, M809 and M814 to alert these gates to receive respectively the BBA, BBB, BBC and BBD signals from the B buffer BB. At this time, these signals will represent a binary number indicating the number of records to be passed over. At the same time, it is necessary to prevent any spurious interstage transmissions during the reset operation. Consequently, the blocking oscillator BO4–803 also sets the counter C805 which passes a signal through the buffer B850 to the amplifier A807 temporarily disabling the SUB signal and consequently preventing the transfer of signals from the one's output terminals of the counters C800 to C802 to the set terminals of the succeeding counters C801 to C803.

It should be noted that at the start of each transmission, when the TRF signal appears, a negative going transient is passed via gate G801 to amplifier A805 to reset the counters C800 to C803 to zero provided that minus PTBK is at a negative voltage. If minus PTBK is at ground, it indicates that a retransmission is necessary and the counter is not forced clear but must be used as a unit subtract circuit.

When unit adding is to be performed, the initial generation of the ADD signal by amplifier A861 causes the triggering of BO4–815 which passes a pulse via buffer B801 to amplifier A805 to clear the counters C800 to C803 to zero.

PARITY CIRCUITRY PC (FIGURE 22)

The parity circuitry PC checks for longitudinal and vertical or transverse parity. It also accumulates the longitudinal parity count for the records. The parity circuitry PC further generates the signals characteristic of the transmission time of the longitudinal parity character, namely, the LPT time, the record count character time, i.e. the SPC time, the ignore character time, i.e. ILB time, and the end of these suffix characters time denominated by the LPL and CLE signals.

Referring more particularly to FIGURE 22, the accumulation of the longitudinal parity for the blocks is performed by the counters C350 to C356. Each of these counters operate as a one stage binary counter which counts the bits recorded in respective bit positions of the characters. For example, the counter C350 counts the bits recorded in the least significant bit position. Each of the counters C350 to C356 has its set input terminal coupled respectively to the BAA to BAG signal lines from the A buffer AB. At the end of the record the counters will record either a one or zero, indicating that the sum of the bits in the associated bit position is odd or even. The outputs of these seven counters form the longitudinal parity character. At the transmitter, this character is transmitted following the end sentinel of the record. It should be noted that the counters C350 to C356 are initially cleared by a signal from amplifier A375. The initial clearing occurs at the end of a mode when the EOC signal is generated, or when the paper tape is to be moved in the reverse direction because a retransmit is required as indicated by the presence of the PTBK signal at buffer B376. A clearing also occurs after the longitudinal parity character has been utilized by the generation of the LPL signal which is fed to the third input of buffer B376 whose output is connected to the input of amplifier A375.

At the receiver, a longitudinal parity count is accumulated and when the longitudinal parity character is received, the count plus the value of the longitudinal parity character should make the final count such that each of the counters C350 to C356 is in its reset stage, indicating that the total count is equivalent to all zeros. If there is an error in the count, then one of the counters will not be in this condition. Therefore, the zero's output of each of the counters C350 to C356 is fed as an input to the gate G302. If during longitudinal parity time the above condition exists an error will be indicated by the generation of the —LPR signal by the amplifier A302, indicating a longitudinal parity error.

Vertical parity is checked at both the transmitter and the receiver. Gates G379 and G305 check for vertical parity at the transmitter. If the vertical parity is assumed to be even, the EVEN signal will be present at gate G379 causing it to be operative. If the vertical parity of any character is not even, then the EPE signal will be present at the second input to the gate G379, causing the transmission of a pulse via buffer B377 to amplifier A303. Similarly, if odd parity is being checked, the ODD signal will be present at a first input to gate G305 and if a character is sensed not having an odd parity, the OPE signal will be present, causing a pulse to be transmitted from the gate G305 to the amplifier A303. Similar checking occurs at the receiver by virtue of gates G306 and G307. It should be noted that each of these gates, that is, gates G305 to G307 and gate G379 are all sampled by an SPL pulse which occurs during each character time. The SPL signal is derived from the EMP signal which indicates that a character has been transferred from the A buffer AB to the B buffer BB. The EMP signal is fed via blocking oscillator BO4–304 and amplifier A301 to blocking oscillator BO8–302 which generates pulses that are fed to amplifier A303 which generates the SPL and —SPL pulses.

The suffix character times are generated respectively by the flip-flops F375 to F378 inclusive. When the ENS is generated, a pulse passes via gate G376 to set flip-flop F375 which generates the LPT and —LPT signals. It should be noted that the flip-flop F375 is set at BTG time. The next BTG pulse causes the resetting of the flip-flop F375 and the setting of the flip-flop F376 whose set input terminal is connected to the LPT signal line. With the flip-flop F376 set, the SPC and —SPC signals are generated. If there has been an error in the block and the retransmission operation is in force, then the SPC signal cooperates with the RCV signal, at the receiver, the ERR signals, and the RTO signals all fed to inputs of gate G395 which, at this time, transmits a signal to amplifier A376 causing the generation of the FSC signal which is utilized to insert the special character. The next occurrence of the BTG signal resets the flip-flop F376 and causes the setting of the flip-flop F377 whose set input terminal is connected to the SPC signal line. When the flip-flop F377 is set, the ILB and —ILB signals are generated which are characteristic of the ignore character. The next occurring BTG resets the flip-flop F377 and causes the setting of the flip-flop F378 whose set input terminal is connected to the ILB signal line. The next occurring BTH causes the resetting of the flip-flop F378 whose zero's output terminal is connected to the input terminal of blocking oscillator BO4–203 which generates a CLE pulse at this time indicating the end of the suffix characters. It should be noted that the flip-flop F378 when set generates the LPL and —LPL signals.

The flip-flop F351 and its associated circuitry is concerned with punched card devices and is not pertinent for this discussion.

C BUFFER CB (FIGURE 23)

The C buffer CB accepts the bits of the character in parallel from the B buffer BB and transfers them in parallel to the tape punch TP under control of timing signals PSS from the tape punch TP during the Receive mode or during the search-edit operation.

Referring more particularly to FIGURE 23, the flip-flops F500 to F506 are bit storage elements which are initially cleared by either a GCL signal or a CPY signal fed via inputs of buffer B504 to amplifier A500, whose output is connected to the reset input terminals of all the flip-flops F500 to F506.

To start the transfer it is necessary that the ENP signal be generated by amplifier A573. During the Receive mode or the search-edit operation, either the RCV or CPP signal will be present at input terminals of buffer B501 causing the generation of an ENP signal. The ENP signal is fed to one input of gate G502. Since the flip-flops F500 to F506 are all initially cleared, a signal will pass through gate G505 to amplifier A504, causing the generation of the CEMP signal, which is fed to a second input of gate G502. When the BTB signal occurs a pulse passes through gate G502 to cause blocking oscillator BO4–501 to generate a pulse that passes through buffer B503, causing blocking oscillator BO4–504 to generate a CLB pulse that is used to start the clearing of the B buffer BB. The CLB pulse is also fed via buffer B502 to amplifier A590 which generates a CLZ pulse which is fed to amplifier A521 whose output is connected to the set input terminals of flip-flops F500 to F506.

These flip-flops will set provided a signal of essentially ground potential is received at their allow set input terminals. It will be noted that the allow set input terminals of the flip-flops F500 to F506 are respectively connected to the —BBA to —BBG signal lines from the respective storage elements of the buffer BB. For example, if a bit is stored in the significant bit storage element of the B buffer BB then at this time the —BBA signal will be at ground potential. Therefore, the flip-flop F500 will set when the CLZ signal is generated. A similar phenomena occurs for the remaining flip-flops F501 to F506. Since at this time under normal conditions at least one of the flip-flops F500 to F506 is set, gate G505 no longer transmits a signal to the amplifier A504 and the CEMP signal terminates.

With the termination of the CEMP signal the amplifier A502 responsive to this signal transmits a permissive signal to gate G501. It should be noted that the ENP signal will be present during the entire operation. Therefore, the gate G501 becomes dependent on its middle input. As the timing signals from the tape punch TP are received as PSS signals they are differentiated by capacitor CAP and resistor R500, causing a pulse to be generated by amplifier A500. This pulse passes through gate G501 and, after a three and a half millisecond delay, is transmitted from delay-flop DF501 to the input of amplifier A503 causing the generation of the CLC and —CLC pulse. The CLC pulse is fed to inputs of mixer gates M555 and M556 which, at this time, will permit the passage of a pulse to the amplifier A520, causing the generation of the PMSP signal.

The PMSP signal is fed to one input terminal of each of the gates G506 to G512. It should be noted that the other input of each of these gates is respectively connected to the one's output of one of the flip-flops F500 to F506. Therefore, the PMSP signal is a strobing pulse which will cause the transmission of a pulse through whichever gates have their second inputs connected to a one's output terminal of a flip-flop which is set. In this manner the contents of the flip-flops F500 to F506 are transferred via the gates G506 to G512, respectively, to the amplifiers A506 to A512, respectively, to become the PDA to PDG signals that activate the associated punch magnets in the tape punch TP. It should also be noted that the PMSP signal is fed to amplifier A505 to generate the PDS signal which moves the paper tape in the tape punch TP to the next character position.

The same CLC pulse that causes the generation of the PMSP signal is fed via blocking oscillator BO4–502 and buffer B504 to amplifier A505 to clear the flip-flops F500 to F506. Of course it should be noted that because of the inherent time delay when the signal passes through blocking oscillator BO4–502, the gates G506 to G512 are strobed before the flip-flops F500 to F506 are reset. In this manner the characters are transferred from the B buffer BB via the C buffer CB to the tape punch TP.

It should be noted that the punch inhibit signal minus PIN fed to the second input of mixer gate M556 is at ground during the search-edit operation when it is desired to delete the punching of certain characters and certain records. The PAL signal present at the other input of mixer gate M555 is present during the search-edit operation to override the effect of the minus PIN signal to permit the punching of certain characters which would be deleted by virtue of the presence of the minus PIN signal. The —RCV and —CPP signals fed to gate G550 which triggers delay-flop DF500 are used to elongate the ENP pulse for fourteen milliseconds beyond receiving or copying to make sure the last character has been punched.

SEARCH EDIT CIRCUITS SE (FIGURE 24)

Figure 7:
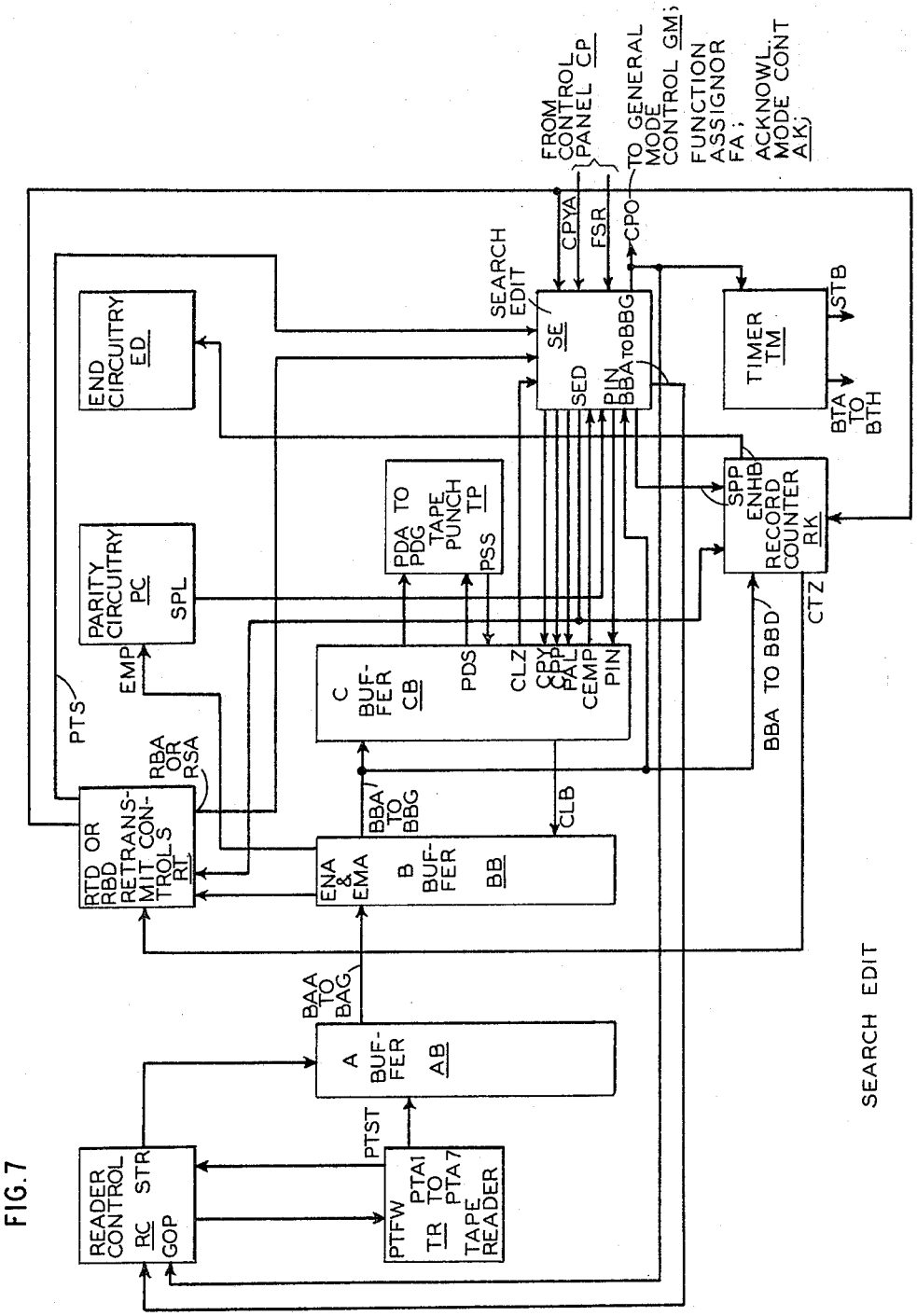
FIGURE 7 shows the signal flow during the Search-Edit mode.

Before proceeding with the description of FIGURE 24, it would be beneficial to review the description of the Search-Edit operation as described with respect to FIGURE 7 and also to review the description of the format of a message as described in the General Structure of Information Section. In particular, it should be recalled that the information is read from the paper tape of the tape punch TP in the reverse direction. Therefore, the first character that can possibly be read would be an ignore character followed by a record count character and three end sentinel characters; then the body of the record followed by the first FST character of the record. The next block is read which again starts with a possible ignore character; a record count character and the three end sentinel characters and the body of the second record which is prefixed by the first FST character.

The search-edit circuits SE performs several functions. It detects, in the precise sequence, the FST, first, character followed by the ignore character. If such a sequence is detected it permits the FST, first, character to be punched but prevents the punching of the ignore character. It then permits the puching of the next three end sentinel characters since the punching cannot wait until the last record of the block for at that time it will be no longer possible to punch the end sentinel characters. After the end sentinel characters have been punched, if the block is to be ignored, it must then generate signals to ignore the remainder of the block.

The apparatus of FIGURE 24 permits the performance of these functions. In particular, when a search-edit operation is to be performed the CPYA and FSR signals will be fed from the control panel CP to the search-edit circuits SE. In particular, the CPYA signal is received at buffer B600 to trigger the blocking oscillator BO4–605 which generates a CPY pulse that is fed to the set input terminal of flip-flop F508 causing the generation of the CPP and —CPP signals. The one's output of the flip-flop F508 is fed to a first input of gate G670 whose second input is receiving the FSR signal at this time. Hence the gate G670 transmits a signal to amplifier A674 causing the generation of the SED signal which is characteristic of the search-edit operation. At the same time, the CPY pulse is fed to an input of buffer B671 to simulate the FST, first, character at this time. It should be noted for succeeding records, the FST signal will be generated by mixer gate M683 which detects the coded combination of BBA to BBF signals from the B buffer BB, which represent the first character of the record. In any event the buffer B671 transmits a pulse to the amplifier A683 which causes the setting of the flip-flop F670. It should be noted that the flip-flop F670 can be set at this time because of the presence of the —FSR signal at its allow set input terminal. The flip-flop F670 remembers the fact that an FST character has been detected. The zero's output terminal of the flip-flop F670 is fed to the allow set input terminal of flip-flop F671. Therefore, if the next character sensed is an ignore character it will be detected by mixer gate M684, causing the generation of the IGR signal which is fed to the set input terminal of flip-flop F671, causing the generation of the ZIG and —ZIG signals. Thus, when the ZIG signal is present it is known that the specific combination of the FST, first, character followed by the ignore character has been detected.

It should be noted that if the FST, first, character is not followed by the ignore character then the —ZIG signal will not be generated, and, therefore, gate G671 will pass the next occurring SPL pulse via buffer B682, amplifier A674 and gate G672 to the reset input terminal of flip-flop F670, causing it to reset which cannot again be set until the detection of another FST first character signal.

If, however, the ZIG and —ZIG signals are generated, gate G673 will transmit the next occurring CLZ pulse to the set input terminals of flip-flop F672 and F673 respectively. The flip-flop F672, accordingly, will start generating the PIN and —PIN signals. It should be noted that the flip-flop F672 can only be set during the presence of the —CPP signal which is received at its allow set input terminal. The PIN signal is fed to the C buffer CB where it will inhibit the punching of any succeeding characters.

It should be noted that the PIN signal is not generated until the FST, first, character has been punched and the ignore character is being transferred from the B buffer BB to the C buffer CB. Therefore, the occurence of the PIN signal prevents the punching of the ignore character. The next character to enter the B buffer BB for transmission to the C buffer CB is an end sentinel character. The end sentinel characters should be punched. Therefore, when an end sentinel character is detected by the end circuitry ED, either an RSA or an RBA signal will be fed respectively to mixer gates M685 and M686 which receive the CLZ pulses at their other inputs and a pulse will be passed to the input of amplifier A685 which generates the PAL signal. The PAL signal is fed to the C buffer CB to override the effect of the PIN signal, and therefore punching will occur while the PAL signal is present in spite of the fact of the presence of the PIN signal. When the third end sentinel character is detected, either the minus RTD or minus RBD signals are generated and a signal passes via gate G680 to the allow set input terminal of flip-flop F674. When the next occurring CEMP signal from the C buffer CB is received at the set input terminal of flip-flop F674, causing the generation of the RIG signal which is fed to the reset input terminal of flip-flop F673. One character time later the CEMP signal is again generated, causing the resetting of the flip-flop F674 and the disappearance of the RIG signal. As the RIG signal terminates just after the third end sentinel is punched, the flip-flop F673 is reset and its one's output terminal prevents recirculation of the PAL signal via mixer gate M687 causing the termination of the PAL signal. Therefore the PIN signal resumes control and all succeeding characters are prevented from being punched. It should be noted that the RIG signal is also fed via buffer B682 and amplifier A674 to one input of gate G672 causing the resetting of flip-flop F670 and also the resetting of flip-flop F671.

When the start of the block is reached and if another ignore character is not detected, then the PTS signal will be present at an input to gate G674. This time, when the RIG signal terminates following the detection of the third end sentinel character a pulse will pass through gate G674 to reset flip-flop F672, terminating the PIN signal and the next block will be punched.

If, however, another ignore character had been detected following the detection of the FST, first, character, the flip-flop F671 would be set as described above and its zero's output terminal would feed a signal to the third input terminal of gate G674 inhibiting this gate from passing a pulse during the occurrence of the PTS signal and the disappearance of the RIG signal.

The search-edit circuits SE include for the sake of convenience, a mixer gate M681 which generates an EDC signal when an error character is detected which is fed from the B buffer BB. Also for the sake of convenience, the search-edit circuits SE include the mixer gate M682 which detects the ignore character to generate an IBC signal and a —ICE signal when it is detected. It should be noted that the mixer gates M681 to M684 inclusive receive inputs as the BBA to BBF signals from the B buffer BB and that the SPL signal operates as a sampling pulse to test for the coded combinations.

APPENDIX

CONTROLLED MULTIVIBRATOR (FIGURE 25)

Figure 25:
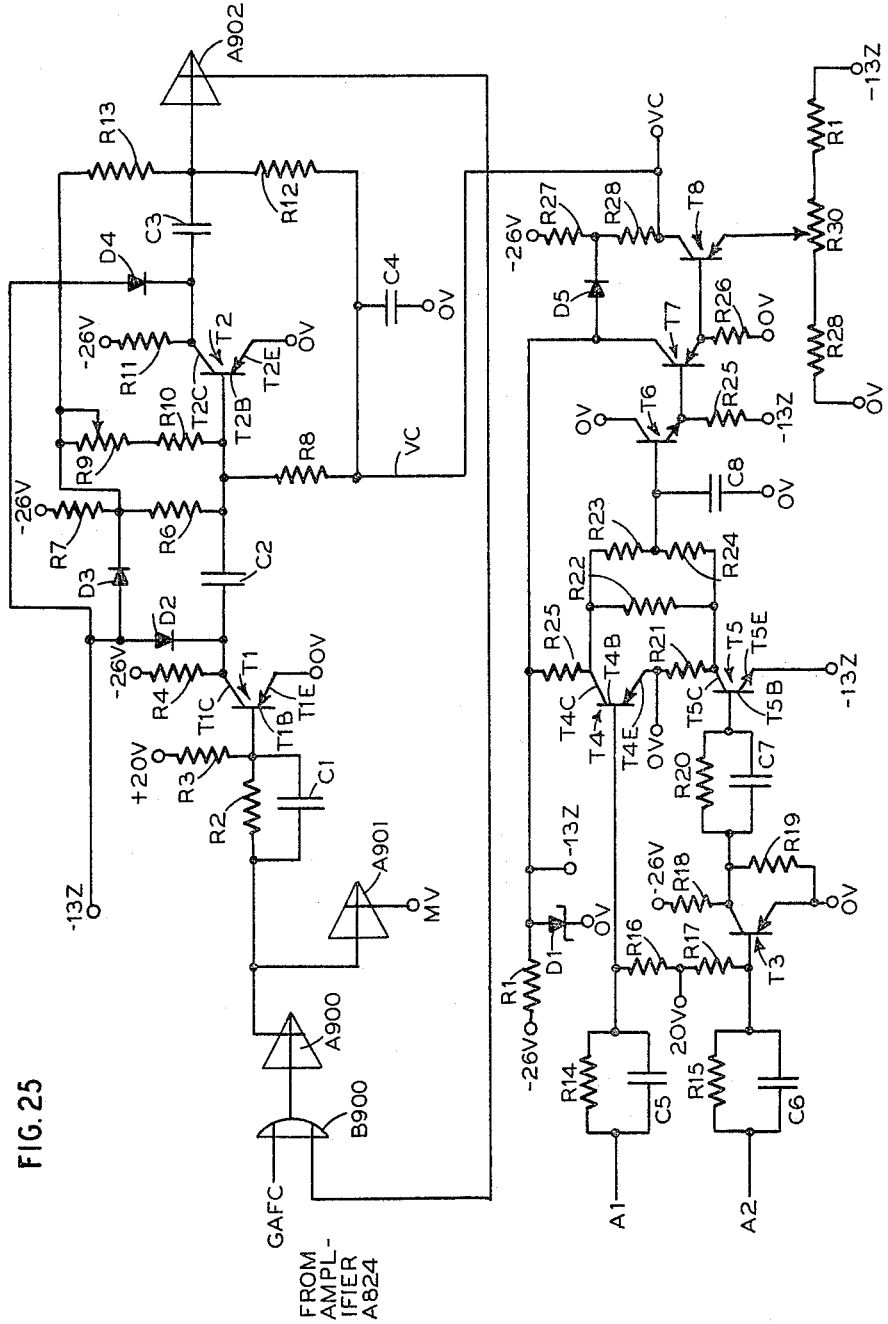
FIGURE 25 is the schematic diagram of the controlled and correctable multivibrator in the timer TM.

Referring to FIGURE 25, the controlled and correctable multivibrator of the timer TM includes the buffer B900 having a first input connected to the GAFC signal line and a second input. The output of buffer B900 is connected to the input of amplifier A900 whose negative output terminal is connected to the input of amplifier A901 and to one end of the speed up resistor-capacitor combination C1–R2. Buffer B900 operates as a gating means in that when its first input terminal is at a negative potential no signals pass from its second input terminal to its output terminal and when its first input terminal is not at a negative potential signals can pass from its second input terminal to the output terminal. The other end of this combination is connected to the base T1B of transistor T1. The base T1B is also coupled via resistor R3 to a plus 20 volt potential. The emitter T1E of transistor T1 is connected to ground potential, and the collector T1C is connected via the resistor R4 to a minus 26 volt potential. Clamping diode D2 connects the collector T1C to a voltage −13Z (a regulated voltage of minus 13 volts). Therefore, the collector T1C can never go below minus 13 volts. Timing capacitor C2 connects the collector T1C to the base T2B of transistor T2. The base, T2B, is connected via resistor R6 to a point having the same potential as the collector T1C when transistor T1 is not conducting. This potential is equal to −13Z less the drop across diode D2 and is obtained by the diode D3 and the resistor R7 connected to minus 26 volts where resistor R7 is the same value as resistor R3 and diodes D2 and D3 are of the same type.

Fine control timing resistors R9 and R10 in series, are connected in parallel with resistor R6. Resistor R8 connects the base T2B to the VC signal line. The emitter T2E of transistor T2 is connected to ground potential and the collector T2C is connected via resistor R11 to a minus 26 volt potential. However, the collector T2C is clamped to a minus 13 volt potential by virtue of the diode D4. Timing capacitor C3 connects the collector T2C to the input of amplifier A902. Timing resistor R13 connects the input of amplifier A902 to the cathode of diode D3 while timing resistor R12 connects the input of amplifier A902 to the VC signal line. The output of amplifier A902 is connected to the second input of buffer B900.

The multivibrator operates in the following manner. Initially, when the GAFC signal is at a negative potential, the multivibrator, which is of the free-running type is immobilized. Since the GAFC signal is at a negative potential, the output of buffer B900 is also at a negative potential causing the output of amplifier A900 to be at substantially ground potential. Therefore, the base TB1 of transistor T1 will be above ground potential, by virtue of the divider action of resistors R2 and R3, cutting off transistor T1. Accordingly, a negative potential will exist at the base T2B of transistor T2, which is therefore conducting since its emitter base junction is forward biased. A negative potential will exist at the input of amplifier A902 which therefore transmits substantially ground potential to the second input of buffer B900, but since the GAFC signal is at a negative potential it overrides the positive potential fed to the second input of buffer B900, and the multivibrator remains in this non-operating state until the GAFC signal goes to ground potential.

At that time the output of buffer B900 goes to ground potential, causing the output of amplifier A900 to assume a negative potential. This negative potential is fed via the parallel combination of resistor R2 and capacitor C1 to the base T1B of transistor T1. Transistor T1 starts conducting, causing the transmission via timing capacitor C2 of a positive going transient to the base T2B of transistor T2, which accordingly cuts-off. When transistor T2 cuts-off, a negative going signal is fed to the input of amplifier A902, since the amplifier A902 had been receiving a negative voltage, nothing further happens to its output. Timing capacitor C2 starts discharging via the timing resistors R6, R8, R9 and R10, until finally, the potential of the base T2B drops to a point sufficient to start conduction in transistor T2. As transistor T2 starts conducting, a positive going transient is fed to the input of amplifier A902 which transmits a negative going signal to the input of buffer B900 which passes this negative going signal to the input of amplifier A900. Amplifier A900 transmits a signal of substantially ground potential to the base of transistor T1, causing the transistor T1 to turn off. The process is regenerative until we reach the point where transistor T1 is completely cut-off and transistor T2 is fully conducting. Timing capacitor C3 starts discharging via timing resistors R12 and R13 and the point is reached where the input to amplifier A902 reaches a potential such that a positive going signal is fed from its output via buffer B900 to amplifier A900 which starts generating a negative going signal, causing the transistor T1 to start conducting. The operation is cumulative until the transistor T1 is completely on, and the transistor T2 is cut-off. The relaxation oscillator will continue until the GAFC signal is returned to a negative potential.

It should be noted that the output of amplifier A900 is connected to the input of amplifier A901, whose output generates the MV signal which is a square wave by virtue of the described operation.

The basic period of the square waves is determined by the capacitor C1 operating in conjunction with resistors R6, R8, R9 and R10, and the capacitor C3 operating with resistors R12 and R13. These elements are chosen so that the free running frequency of the multivibrator is twelve hundred cycles per second plus or minus less than three percent.

In order to constrain the free running frequency of the multivibrator to the frequency of the data bits received from the transmitter, a control voltage VC is generated. Control voltage VC is fed to the free ends of resistors R8 and R12. It should be noted that the effect of this control voltage is to modify the aiming point which the capacitors C2 and C3 discharge towards. The voltage on the VC signal line is a measure of the difference in frequency of the square wave generated by the multivibrator and the frequency of the data bits received from the transmitter. The control voltage VC is generated by the remaining elements of FIGURE 25.

It should be recalled that in the description of the timer TM, the A1 and A2 signals were generated therein in response to, substantially, the comparison of the data bits and the signals derived by the square wave generated by the multivibrator. Signal A1 is a series of pulses which occur in one to one correspondence with the received data edges. The width of these pulses will depend on the phase difference between the counted down multivibrator pulses and the data edges. Signal A2 is a series of pulses of fixed width occurring in a one to one correspondence with the pulses of signal A1. The signal A2 is then subtracted from the signal A1 by the control voltage generating circuitry so that the net result will be a D.C. shift proportional to the phase error and the rate at which data edges are received, i.e., the rate at which phase comparisons are made.

More particularly, the pulse on the A1 signal line are fed via the speedup network comprising capacitors C5 and R14 to the base T4B of transistor T4. The A2 signal is fed via a speedup network comprising resistors C6 and R15 and via the phase inverter comprising the amplifier T3 and the speedup network comprising capacitor C7 and resistor R20 to the base T5B of transistor T5. Therefore, when the base T4B of transistor 4 receives a square wave, the base T5B of transistor T5 will also receive a square wave which is substantially one hundred and eighty degrees out of phase therewith. If the pulses on lines A1 and A2 are exactly in phase, indicating no error, the pulses received at the bases T4B and T5B, respectively, will be exactly one hundred and eighty degrees out of phase. The collectors T4C and T5C of the transistors T4 and T5 feed opposite arms of an algebraic resistance adder comprising serially connected resistors R23 and R24 having equal values and whose junction is connected to a filtering capacitor C8. The transistors T4 and T5 are substantially linear amplifiers. Therefore, a true subtraction is performed and if there is no phase difference between the signals, no direct-current signal is transmitted from the junction of the resistors R23 and R24. However, if there is a phase difference, either a positive or negative direct-current signal component remains which is a measure of the phase difference. This direct-current signal component is fed via the cascaded emitter follower amplifiers T6 and T7 which are used to provide minimum loading of the junction of resistors R23 and R24 by the input to the common base amplifier T8. Common emitter amplifier T8, accordingly amplifies this direct-current signal component and feeds it as the VC signal to the multivibrator.

It should be noted that the transistor T4 which operates as a common emitter amplifier is of the PNP type whose base T4B receives the input signal and whose collector T4C is coupled via a resistor R25 to the −13Z potential line and whose emitter T4E is connected to ground potential. The transistor T5 is of the NPN type which operates as a common emitter amplifier, whose emitter T5E is connected to a −13Z potential line and whose collector T5C is connected via a resistor R21 to ground potential. The values of the resistors R21 and R25 are substantially equal. Therefore, minimum distortion is introduced in the signals received at the collectors T4C and T5C respectively, which are then subtracted by the algebraic adder.

The potential on the line −13Z is generated at the junction of resistor R1 and diode D1. The free end of resistor R1 is connected to a minus 26 volt potential and the free end of diode D1 is connected to ground. The diode D1 is a Zener diode and at this time is in the breakdown condition, establishing a minus thirteen volt potential which is regulated. The initial or quiescent setting of the value for the control voltage VC is obtained by fixing the potential of the emitter T8E of the amplifier T8. The emitter T8E is connected to the center tap of a potentiometer comprising resistors R28, R30 and R31, whose outer arms are connected to ground potential and the −13Z potential line respectively.

TAPE PUNCH TP

The tape punch TP is a Teletype High Speed Tape Punch Set, BRPE) as described in Bulletin 215B entitled, "Technical Manual High Speed Tape Punch Set (BRPE)," copyrighted in 1952, 1954 and 1960 by Teletype Corporation. On pages 6–12 of this bulletin in FIGURES 6–10, entitled, Schematic Wiring Diagram: Typical Tape Punch Set. In this figure, there are shown the inputs to the Tape Punch Set. The following table indicates the connections between the coupler DV and the Tape Punch Set.

TABLE 3

| Tape Punch Set Input: | Signal Leads to the Coupler DV |
|---|---|
| 18 | −28 Volts |
| 5 | PDA |
| 4 | PDB |
| 3 | PDC |
| 2 | PDC |
| 1 | PDE |
| 6 | PDF |
| 8 | PDH |
| 9 | PDS |
| 11 | Ground |
| 12 | Ground |
| 24 | PSS |

TAPE READER TR

A typical tape reader may be the Perforated Tape Reader Model 3500, manufactured by the Digitronics Corporation and described in the publication entitled "Perforated Tape Reader."

MECHANICAL COUNTER

The mechanical counter may be of the type manufactured by the Sodeco Geneve Company under the name of a printing impulse counter "Sedeco-Print."

TRANSCEIVER DF

The transceiver DF is a digital subset model 202A, having the options Z, K, J, G, D and N as manufactured by the American Telephone and Telegraph Company. The digital subset is described completely in a book entitled, Bell System Practices Section 592-012-200, Issue 1, November 1961. The subset is used with equilization and operates in a frequency shift manner between a frequency of 1200 cycles per second and a frequency of 2200 cycles per second. The subset includes a telephone that may be used in the normal manner to establish the connection between the sending and receiving ends of a telephone line. It includes at least three buttons, a data-button, an automatic button and a talk-button. It functions as an ordinary telephone whenever the talk-button is pressed. When the automatic button is pressed the subset can receive calls without the receiver being off the cradle.

The subset is provided with a cinch connector for connection to the customer's equipment. It is necessary to employ a cinch connector DB-19604-432 having a hood DB-51226-1. The following table indicates the connections of the leads from the coupler DV to the terminals of the connector.

TABLE 4

| Connector Terminals: | Signals from Coupler |
|---|---|
| 2 | DAD |
| 3 | DIND |
| 4 | RTSD |
| 5 | STSD |
| 6 | INT |
| 7 | Signal Ground |
| 8 | CAD |
| 19 | DCL2 |
| 20 | DCL1 |
| 21 | *READY |
| 22 | RING-1 |
| 23 | RING-2 |

DESCRIPTION OF SYMBOLS

The schematic equivalents of the symbols which are hereinafter employed to simplify the detailed description of the units of the system which have been illustrated in block form are shown in FIGURES 26 to 38. For convenient reference, all positive and negative supply buses will generally be identified with a number corresponding with their voltage. The circuitry terminals corresponding to the same symbol terminals are identified by the same character reference numbers.

Gate (FIGURE 26)

The gates ("and" gates) used in the disclosed system are of the "coincidence" type, each comprising a crystal diode network which functions to receive input signals via a plurality of input terminals and to pass the most positive signal.

The symbol for a representative gate 1001, having by way of example, three input terminals 1002, 1003, and 1004 is shown in FIGURE 26A. Since the signal potential levels in the system are minus six volts and zero volts, the potentials of the signals which may exist at the input terminals 1002, 1003, 1004 are thereby limited.

If a potential of zero volts is present at one or more of the input terminals 1002, 1003, 1004, a potential of zero volts will exist at the output terminal 1005. Therefore, if one of the input signals to the input terminals 1002, 1003, 1004 is "negative" (minus six volts) and one or more of the other signals are "positive" (zero volts), the positive signals are passed and the negative signal is "blocked."

When there is a coincidence of negative signals at all three input terminals 1002, 1003 and 1004, a negative signal is transmitted from the output terminal 1005. In such case, it may be stated that a negative signal is "gated" or "passed" by the gate 1001. When all of the input signals to a gate except one are made negative, in preparation for passing a negative signal when the remaining input signal is made negative, the gate may be described as being "primed."

The schematic details of the gate 1001 are shown in FIGURE 26B. Gate 1001 includes the crystal diodes 1012, 1013 and 1014. The input terminals 1002, 1003, 1004 are respectively coupled to the crystal diodes 1012, 1013, 1014. The latter diodes comprise respectively in order: anode 1012A and cathode 1012C, anode 1013A and cathode 1013C, and anode 1014A and cathode 1014C. More particularly, the input terminals 1002, 1003, 1004 are respectively coupled to the anodes 1012A, 1013A, 1014A of respective crystal diodes 1012, 1013, 1014. The cathodes 1012C, 1013C, 1014C are interconnected at the junction 1015, which in turn is connected to the negative voltage bus —26 via a resistor 1016.

The negative supply bus —26 tends to make the cathodes 1012C, 1013C, 1014C more negative than the anodes 1012A, 1013A, 1014A, respectively, causing all three crystal diodes 1012, 1013, 1014 to conduct.

When negative six volt signals are simultaneously present at all three input terminals 1002, 1003, 1004, the crystal diodes 1012, 1013, 1014 are conductive, and the potential of the cathodes 1012C, 1013C, 1014C approaches the potential of the anodes.

If the potential at one of the input terminals 1002, 1003, 1004 increases to zero volts, the potential at the junction 1015 approaches zero volts level, as this voltage is passed through the conducting diode 1012, 1013 or 1014 to which the zero volt potential is applied. The other two diodes stop conducting, since their anodes become more negative than the junction 1015. As a result, a "positive" potential of zero volts appears at the output terminal 1005.

If zero volt potentials are simultaneously fed to two or all three of the input terminals 1002, 1003, 1004, a zero volt potential will appear at the output terminal 1005, since respectively two or all three diodes 1012, 1013, 1014 will remain conducting. Thus the gate 1001 functions to pass the most positive signal received via the input terminals 1002, 1003, 1004.

In the above described manner, the gate 1001 is frequently used as a switch to govern the passage of one signal by the presence of one or more signals which control the operation of the gate 1001.

It should be understood that the potentials of zero volts and minus six volts used for purpose of illustration are approximate, and the exact potentials will be affected in two ways. First, they will be affected by the value of the resistance 1016 and its relation to the impedances of the input circuits connected to the input terminals 1002, 1003, 1004. Second, they will be affected by the fact that a crystal diode has some resistance (i.e., is not a perfect conductor) when its anode is more positive than its cathode. Nevertheless, the assumption that signal potentials are either zero or minus six volts is sufficiently accurate to serve as a basis for the description of the operation taking place in the disclosed system. Although the gate 1001 is shown as having three input terminals 1002, 1003, 1004 connected through diodes 1012, 1013, 1014 respectively to junction 1015, it will be understood that any reasonable number of terminals may be similarly connected through diodes to junction 1015 and that the junction will remain at the voltage of the most positive source connected to any of the input terminals. Many of the gates in the following description are shown as having two or more than three input terminals and such gates are to be taken as having a similar number of diodes connected to an output terminal as 1015.

It should be noted that the disclosed system employs "negative" logic. Therefore, the "and" gate described in this section is deemed "open" when all its input signals are negative, whence its output signal will also be negative. The "and" gate is "closed," when at least one input signal is positive, whence the output signal is also positive. The "and" gate thus corresponds to an "or" gate (buffer) of "positive" logic systems. Conversely, the buffer of the disclosed negative logic system corresponds to the "and" gate of positive logic systems. The buffer utilized in the disclosed system is described in the next section.

*Buffer (FIGURE 27)*

The buffers utilized are also known as "or" gates. Each buffer comprises a crystal diode network which functions to receive input signals via a plurality of input terminals and to pass the most negative signal.

The symbol for a representative buffer 1021, having by way of example three input terminals 1022, 1023, 1024, and output terminal 1025, is shown in FIGURE 27A. Since the signal potential levels of the system are minus six volts and zero volts, either one of these potentials may exist at the input terminals 1022, 1023, 1024.

If a potential of minus six volts is present at one or more of the input terminals 1022, 1023, 1024, a potential of minus six volts exists at the output terminal 1025. Therefore, if one or more of the input signals to input terminals 1022, 1023, 1024 is negative, the negative signal is passed to the output terminal 1025, and the "or" gate is said to be open, notwithstanding the fact that the input signals to the remaining input terminals are "positive" (zero volt potential).

When there is coincidence of "positive" (zero volt) signals at all three input terminals 1022, 1023, 1024, a "positive" signal is transmitted from the output terminal 1025, and the "or" gate is said to be closed.

The schematic details of the buffer 1021 are shown in FIGURE 27B. Buffer 1021 includes the crystal diodes 1032, 1033, 1034. The input terminals 1022, 1023, 1024 are respectively coupled to the crystal diodes 1032, 1033, 1034. The latter diodes comprise respectively in order: cathode 1032C and anode 1032A, cathode 1033C and anode 1033A, and cathode 1034C and anode 1034A. More particularly, the input terminals 1022, 1023, 1024 are respectively coupled to the cathodes 1032C, 1033C, 1034C of respective diodes 1032, 1033, 1034. The anodes 1032A, 1033A, 1034A of respective diodes 1032, 1033, 1034 are interconnected at the junction 1035 which is coupled to output terminal 1025, and which connects to the positive supply bus +20 via a resistor 1036.

If negative potentials are simultaneously present at all three input terminals 1022, 1023, 1024, all three diodes 1032, 1033, 1034 will conduct, since the positive supply bus +20 tends to make the anodes 1032A, 1033A, 1034A more positive. The voltage at the junction 1035 will then be minus six volts since, while conducting, the anodes 1032A, 1033A, 1034A of the crystal diodes 1032, 1033, 1034 assume the potentials of the associated cathodes 1032C, 1033C, 1034C.

When a positive signal is fed to one or two, but not all three of the input terminals 1022, 1023, 1024, the respective one or two of cathodes 1032C, 1033C, 1034C are raised to potential of zero volts and therefore more positive than their respective anodes. However, the cathode of the remaining one or two crystal diodes remains at the negative potential of minus six volts, and therefore the potential of the junction 1035 also remains at minus six volts.

When the signals present at all three input terminals 1022, 1023, 1024 are positive, the anodes 1032A, 1033A, 1034A are raised to approximately the same potentials of zero volts as their respective cathodes 1032C, 1033C, 1034C, and the potential at the junction 1035 rises to zero volts.

The potential which exists at the junction 1035 is transmitted from the buffer 1021 via the connected output terminal 1025.

The showing herein of a buffer with two or more than three input leads is to be understood to mean that there are as many diodes having their anodes connected to an output terminal as there are input leads.

*Mixer gate (FIGURE 28)*

The symbol for a representative mixer gate 1040, having by wa yof example three input terminals 1041, 1042, 1043, and output terminal 1044, is shown in FIGURE 28A. The schematic details are shown in FIGURE 28B, wherein a regular gate 1045 is illustrated in the symbolic form previously employed. The practice of representing the circuit details of a unit shown in symbolic form, by symbols representing previously described units, will be followed hereinafter.

As may be seen from FIGURE 28B, the input terminals 1041, 1042, 1043 serve as input terminals for gate 1045, and the output of gate 1045 is coupled to the cathode of a diode 1046, whose anode is in turn coupled to the output terminal 1044. The mixer gate is generally utilized in conjunction with one or more further mixer gates each having two or more input terminals. The output terminals of the several mixer gates are coupled together. Hence the individual gates (corresponding to gate 1045) of the several mixer gates function in the usual "and" circuit fashion. The several diodes corresponding to diode 1046 constitute a buffer common to the individual gates.

Amplifier (FIGURE 29)

The symbol for a representative amplifier 1050 having input terminal 1051A, "negative" output terminal 1052A, and "positive" output terminal 1052B, is shown in FIGURE 29A. Output terminal 1052A is negative in the sense that it delivers an output signal that is reversed in polarity with respect to an input signal applied to input terminal 1051A. By the same token, the output signal at positive output terminal 1052B will be in phase with an input signal applied to terminal 1051A.

The circuitry of amplifier 1050 is shown in FIGURE 29B. Amplifier 1050 is essentially a two-stage transistor amplifier. It comprises pnp transistors 1060A and 1060B, each connected as a grounded emitter stage. Consistent with the usual convention, pnp junction transistors, such as transistors 1060A and 1060B are illustrated with an arrow at the emitter electrode pointing toward the base electrode. On the other hand, npn junction transistors encountered hereinafter are shown with the arrow at the emitter electrode pointing away from the base electrode. The type of transistor, that is pnp or npn may be recognized from the illustration and will not be explicitly stated except where warranted.

The two stages of amplifier 1050 are structurally similar. The members of the first stage are identified by reference numerals followed by the letter A, and the corresponding parts of the second stage are represented by like numerals followed by the letter B. Only the first stage will be described explicitly; the description of the second stage is by way of implicit substitution of the letter B for the letter A. It should be observed that the output terminal 1052A of the first stage constitutes the input terminal 1051B of the second stage.

The input signal that is to be amplified is applied from a source external of amplifier 1050, to input terminal 1051A, from which it is transmitted to the base of transistor 1060A via series connected resistors 1053A and 1055A. These signals utilized in the disclosed system are generally of the pulse type, and as such have steep leading and trailing edges. To maintain the sharp pulse shape, there is provided a speed-up capacitor 1057A which shunts the series combination of resistors 1053A and 1055A. Quiescent base current is established by means of a resistor 1059A, which intercouples the base of transistor 1060A and the +20 volt bus.

The emitter of transistor 1060A is grounded, whereas its collector connects through load resistor 1061A to the −26 volt bus. To limit the negative voltage swing of the collector to −6 volts, the collector of transistor 1060A is coupled to the cathode of a clamping diode 1063A, whose anode connects to the −6 volt bus. Positive voltage swing of the collector is reduced by means of a diode 1064A whose anode is coupled to the collector of transistor 1060A and whose cathode is coupled to the junction of resistors 1063A and 1055A. Diode 1064A thus provides unidirectional and therefore non-linear degenerative feedback for positive output signals at the output terminal 1052A which is tied to the collector of transistor 1060A.

Counter reset (FIGURE 30)

The "counter reset" is a special purpose amplifier which is utilized in the disclosed system as a source of clearing signals for flip-flops and counters described in the following sections, and occasionally for other purposes. It is a non-inverting amplifier in the sense that the output signal is in phase with the input signal. The symbol for a representative counter reset 1070, having a single input terminal 1071 and a single output terminal 1072, is shown in FIGURE 30A.

Figure 30B:
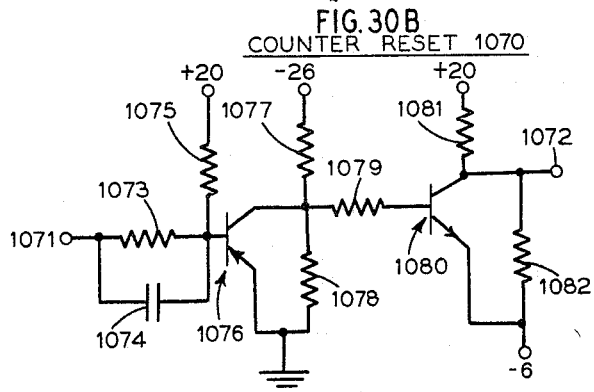
FIGURES 30A and 30B show the logical symbol and the schematic diagram for a counter reset amplifier.
Figure 30A:
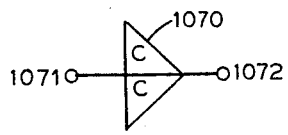

The circuitry of counter reset 1070 is shown in FIGURE 30B. The counter reset is also a two-stage direct coupled common emitter amplifier; however, the two stages are somewhat dissimilar; in particular, the first stage includes pnp transistor 1076, whereas the second stage includes npn transistor 1080. Therefore both stages will be explicitly described.

Input signal applied to input terminal 1071 is transmitted to the base of transistor 1076 via the shunt combination of resistor 1073 and speed-up capacitor 1074. Quiescent base current is established by means of a resistor 1075 which intercouples the base of transistor 1076 and the +20 volt bus. The collector load impedance is formed of a voltage divider that includes resistors 1077 and 1078, which are connected serially from the −26 volt bus to ground and whose junction is tied to the collector of transistor 1076. The emitter of transistor 1076 is grounded.

The amplified output voltage appearing at the collector of transistor 1076 is inverted with respect to the input signal at terminal 1071, and is reinverted by means of the second stage of the counter reset 1070. The collector output signal of transistor 1076 is coupled to the base of transistor 1080 via resistor 1079. The emitter of transistor 1080 is returned to the −6 volt bus. The collector load impedance for transistor 1080 consists of a voltage divider which is comprised of serially connected resistors 1081 and 1082 which span the +20 volt and −6 volt buses. The collector of transistor 1080 is coupled to the junction of resistors 1081 and 1082, and also to the output terminal 1072.

Counter (FIGURE 31)

Figure 31A:
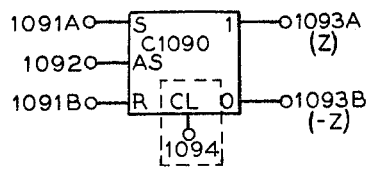
FIGURES 31A and 31B show the logical and schematic diagrams respectively of a counter employed throughout the system. (When the portions thereof within the dotted lines are deleted, the element is termed a flip-flop.)

The symbol for a representative counter 1090 is shown in FIGURE 31A. Counter 1090 is provided with a set (S) input terminal 1091A, a reset (R) input terminal 1091B, an allow set (AS) input terminal 1092, a "1" or set output terminal 1093A, a "0" or reset output terminal 1093B, and a clear (CL) input terminal 1094. It is a bistable device; that is, it admits of two stable states of operation, the set state and the reset state. When the counter 1090 is in the reset state, the output signal at the "0" terminal 1093B will be "negative" (at a potential of −6 volts) and the output signal at the "1" terminal 1093A will be "positive" (at a potential of 0 volts). The counter output signals are also specified as complementary pairs upon occasion, as for example by Z for the set terminal output signal 1093A and by −Z at the reset output terminal 1093B in FIGURE 31A. In the reset condition of the counter 1090 the −Z signal is deemed to be present or "on." The Z signal is deemed to be absent or "off," although then "positive." In the set state, the −Z signal will be "positive" (at a potential of 0 volts) and deemed absent or "off"; the Z signal will be deemed present or "on," even though then "negative."

The "normal" potential prevailing at the set input terminal 1091A, the reset input terminal 1091B, and the allow set input terminal 1092, is 0 volts. Under these conditions the set and reset signals are deemed to be absent, and the allow set signal to be present. The clear input signal is "normally" absent and at a potential level of 0 volts. When present, the clear signal terminal 1094 assumes a negative potential value of −6 volts, or even below −6 volts.

While in the reset state, changes in the conditions of the reset or allow set input signal levels will not alter the reset state of counter 1090. Assuming that the allow set signal has been present for at least four microseconds, application of a (negative) set pulse at input terminal 1091A of at least four microseconds duration will transfer the counter 1090 to the set state at the termination of such set pulse, that is at its positive-going trailing edge. The Z signal will be "on" and the −Z signal will be "off."

Once in the set state, changes in the conditions of the set and allow set input signals will not alter the set state of counter 1090. However, application of a (negative) reset input signal to terminal 1091B of at least four microseconds duration will transfer flip-flop 1090 to the reset state at the termination of such reset pulse, that is at its positive-going trailing edge. The Z signal will be "off" and the −Z signal will be "on." Application of the (negative) clear signal will place flip-flop 1090 in the reset state.

Figure 31B:
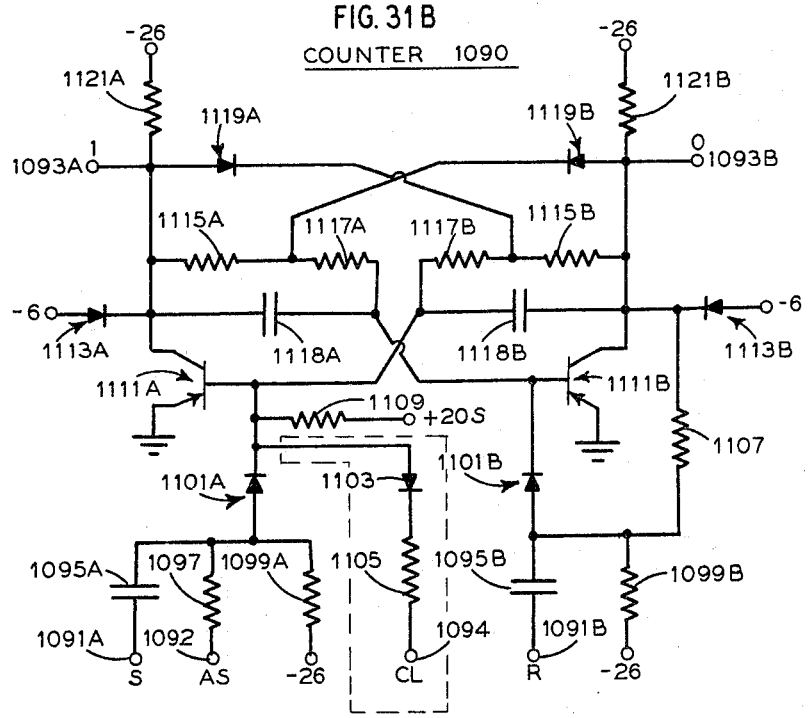

The schematic details of counter 1090 are shown in FIGURE 31B. The circuit is a transistor type Eccles-Jordan circuit which includes grounded emitter connected transistors 1111A and 1111B. Regenerative cross-coupling is provided between the collector of each transistor and the base of the other transistor. The counter circuit is composed of two half-circuits, one associated with transistor 1111A and the other with transistor 1111B. The half circuits are to greater extent symmetrical; the symmetrical components of the two half-circuits may be recognized by inspection in that a component of the left half-circuit is identified by a given reference numeral followed by the letter A and its symmetrical component in the right half-circuit is identified by the same reference numeral followed by the letter B. Therefore the following explicit description of the half-circuits is basically given for only one half-circuit, and the description of the other is given implicitly by substitution of "A" for "B," and "B" for "A." Unsymmetrical parts are labeled by reference numeral without suffix letter, and are explicitly described for both half-circuits.

In the reset state transistor 1111A conducts at collector current saturation, and its collector electrode which constitutes the "1" terminal is at 0 volt potential. Such collector potential is transmitted via series resistors 1115A and 1117A to the base of transistor 1111B, thereby placing transistor 1111B in a non-conducting state (collector current cut-off). The collectors are coupled to the −26 volt bus through respective resistors 1121A and 1121B. To limit the potential of the collector of transistor 1111B to −6 volts, such collector connects to the −6 volt bus through the cathode and then the anode of a clamping diode 1113B. The collector of transistor 1111B constitutes the "0" output terminal 1093B. The series combination of resistors 1115A and 1117A is shunted by a speed-up capacitor 1118A to accelerate switching from one counter state to the other. To prevent deep saturation of the conducting transistor, the collector of transistor 1111A connects through the anode and then the cathode of a diode 1119A to the junction of resistors 1115B and 1117B, so as to provide nonlinear degenerative feedback for positive-going collector potential from collector to base of transistor 1111A via diode 1119A and resistor 1117B.

The set signal is applied at set input terminal 1091A via differentiating capacitor 1095A and the anode and then the cathode of diode 1101A to the base of transistor 1111A. A differentiating resistor 1099A connects from the anode of diode 1101A to the −26 volt bus. Diode 1101A blocks the differentiated negative-going leading edge of the incoming set signal, and transmits the positive-going leading edge to initiate the flipping action, assuming that the counter is then reset. The rise in base potential decreases the collector current of transistor 1111A, so that its collector potential decreases. Such decrease in collector potential is coupled via resistors 1115A and 1117A to the base of transistor 1111B to initiate its collector current flow and rise in collector potential. Such latter rise in collector potential is coupled via resistors 1115B and 1117B to the base of transistor 1111A to re-enforce the initial action of the set pulse. The effect is cumulative and ultimately transistor 1111A is cut off and transistor 1111B is saturated. The counter 1090 is now in the set state. It may be reset by application of a reset pulse to the reset input terminal 1091B through an analagous chain of events, noting the symmetrical components 1095B, 1099B, 1101B. When a set and a reset pulse are applied concurrently, the counter 1090 will change its state. This is because the set pulse will not affect a previously set counter, but the reset pulse will. Similarly the reset pulse will not affect a previously reset pulse, but the set pulse will. This phenomenon forms the basis of the operation of a binary counter, described in the next section.

The allow set terminal 1092 is coupled to the anode of diode 1011A through a resistor 1092. Application of a −6 volt potential to the allow set terminal 1092 will place the anode of diode 1101A at a potential below that of its cathode and thereby preclude the set pulse from reaching the base of transistor 1111A, and consequently setting of the counter 1090. The allow set signal thus may be used to gate the set signal.

The clear terminal 1094 is coupled to the base of transistor 1111A via resistor 1105 and the anode and then the cathode of diode 1103. Application of the (negative) clear signal will initiate conduction of a previously cut-off transistor 1111A. This will be followed by the usual regenerative flipping action previously described to reset counter 1090. The clear signal will override a concurrent setting signal, noting that the clear signal is applied without differentiation.

The base of transistor 1111A is additionally coupled through a resistor 1109 to a potential source +20S, which is normally maintained at a potential of +20 volts. However, when power is first turned on to the system, or at any other time when it is desired to clear the flip-flop, the potential of source +20S is momentarily changed to −26 volts through a suitable switch (not shown) to clear initially the counter 1090 to the reset state.

The collector of transistor 1111B is coupled to the anode of diode 1101B through a resistor 1107 to off-set the unbalance of the two half-circuits due unsymmetrical components 1097, 1105, 1109 in the left half-circuit.

The system also includes units called flip-flops such as flip-flop F117. The flip-flops are identical to the described counter C1090 except that the CL terminal is deleted along with its associated diode 1103 and resistor 1105.

*Binary counter (FIGURE 32)*

The exemplary binary counter 1130, sometimes referred to simply as counter, is shown symbolically in FIGURE 32A and in block form in FIGURE 32B as composed of two stages 1131 and 1132. It has a counting capacity of four numbers (zero to three). A counter may be composed of a single stage with a counting capacity of two numbers (zero to one). Each additional stage doubles the capacity of the counter; thus a three-stage counter will have a capacity of eight numbers (zero to seven).

As may be seen from FIGURE 32B, each counter stage includes a flip-flop whose set input and reset input terminals are tied together, and whose set output ("1") terminal and allow set terminal are tied together. The "1" output of a given stage is tied to the set input terminal of the next higher stage in the counting chain. The input terminal 1133 of counter 1130 is also identified as input signal; it is connected to the set and reset input terminals of the initial stage 1131. The "1" and "0" terminals of stage 1131 are deemed to be the sources of signals A and —A respectively; those of stage 1132 the source of signals B and —B respectively, and so forth for any added stages. The alphabetically ordered signals are a concept that is useful in the description of counter 1130 and of the decoder and parity checker units given in subsequent sections.

The several counter stages are cleared to zero by application of a negative signal to the input terminal 1137 of counter clear 1138, whose output terminal is coupled via line 1139 to the clear terminals of the several counter stages, thus clearing (resetting) them. The fact of reset states prevailing in all counter stages is interpreted as the number zero. In such reset state, each counter stage is in an allow set condition by virtue of intercoupling of the "1" and allow set terminals. Therefore the positive-going trailing edge of the next incoming signal applied to terminal 1133 will set stage 1131, even though it is applied to both the set and reset input terminals of stage 1131. This follows from the discussion of simultaneous application of set and reset signals to a flip-flop given in the preceding section.

The "1" terminal of stage 1131 is now at negative potential; that is, the A signal is now present. This is of significance in several respects. The A signal serves as setting signal for the second stage 1132, but not at this time as yet, recalling that it is the positive-going trailing edge of a setting signal which is effective to set. Thus stage 1132 remains reset, and the fact of stage 1131 set and stage 1132 reset is interpreted as the number one. Secondly, the allow set terminal of stage 1131 is now at negative potential, so that the positive-going trailing edge of the next incoming second signal cannot set stage 1131, but will reset it.

The resetting of stage 1131 by the second signal terminates the A signal, which is now positive-going and therefore sets stage 1132, even though the A signal is applied to both the set and reset terminals of stage 1132. The fact of stage 1132 set and stage 1131 reset is interpreted as the number two. It is seen that stage 1132 is in exactly the same condition as stage 1131 upon receipt of the first signal. The B signal is now present. Also stage 1131 is now in exactly the same condition as it was prior to the first A signal. Therefore the next (third) signal will set stage 1131. The attendant initiation of the A signal does not affect stage 1132 (termination of the A signal subsequently will). Stage 1132 therefore remains set, and the fact of both stages 1131 and 1132 being set is interpreted as the number three. It is seen that the counter 1130 counts the number of signals.

The counter 1130 has now reached the limit of its two-stage capacity. The next (fourth) signal will reset stage 1131. The attendant termination of the A signal now also resets the second stage 1132, so that we have reverted to the initial condition corresponding to the count of zero. However, the attendant termination also of the B signal would set a third counter stage coupled to stage 1132, and such set state coupled with the reset state of stages 1131 and 1132 would be interpreted as the number four. Stages 1131 and 1132 are now ready for another cycle of counts one, two, three, zero as before. In the case of an added third stage, such counts would be interpretable as five, six, seven, zero respectively.

*Monostable multivibrator type circuits*

The disclosed system utilizes several monostable type multivibrator circuits, namely a delay flop (FIGURE 33), a gated delay flop (FIGURE 34), a retriggerable delay flop (FIGURE 35) and a blocking oscillator (FIGURE 36). These circuits function generally in the same manner, in that upon receipt of an input trigger signal they will generate an output pulse of predetermined duration. Structurally the circuits are also similar to a certain extent. The delay flop circuit shown in FIGURE 33B is composed of two blocks designated as 1144 and 1145A. The retriggerable delay flop circuit of FIGURE 35B is composed of two blocks designated as 1207 and 1145B. The blocking oscillator circuit of FIGURE 36B is composed of block 1144 of the basic delay flop circuit and of a block 1145C which is essentially a simple modification of blocks 1145A and 1145B. The blocks 1145A and 1145B contain similar structure and corresponding components therein are designated by like reference numeral followed by suffix letters A and B respectively. Components individual to the blocks are designated by reference numeral without suffix letter. The following description will be simplified having regard to the noted similarities.

THE DELAY FLOP (FIGURE 33)

The symbol for a representative delay flop 1140 is shown in FIGURE 33A. The delay flop includes input terminal 1141 and output terminal 1142.

The schematic details of the delay flop 1140 are shown in FIGURE 33B. The input signal to terminal 1141 proper for operation of the delay flop 1140 is a positive signal of at least four microseconds duration. The delay flop responds to the negative-going trailing edge of such trigger input signal. The negative-going trailing edge must have a fall time of less than 0.5 microsecond. The mentioned time limitation of four and 0.5 microseconds will assure reliable triggering.

The proper operating level at input terminal 1141 is established by a resistor 1146, which connects from terminal 1141 to the +20 volt bus. The input signal is coupled by means of a capacitor 1148 to the base of transistor 1156 which is connected as an emitter follower. However, the input signal is modified by the action of a network which is connected from the base of transistor 1156 to ground and includes resistor 1154 shunted by the series combination of diode 1150 and resistor 1152. The anode of diode 1150 is tied to the base of transistor 1156. The positive-going leading edge of the incoming trigger pulse is presented with a short-time constant differentiating network including capacitor 1148 and resistor 1152, and is therefore attenuated. The negative-going trailing edge cannot pass through diode 1150, and therefore the impedance it sees is that of coupling capacitor 1148 and resistor 1154 in shunt with the input impedance of the emitter follower transistor 1156, whose time constant is substantially greater. The negative-going trailing edge is therefore not attenuated to substantial degree.

The collector of transistor 1156 is coupled to the —6 volt bus, whereas its emitter is coupled through load resistor 1158 to the +20 volt bus. This completes the description of the elements constituting block 1144. The emitter of transistor 1156 produces a replica of the signal voltage appearing at its base, and this is passed to the cathode of a diode 1160A in block 1145A.

Diode 1160A suppresses transmission of the residual positive swing of the signal developed at the emitter of transistor 1156, but passes the negative-going trailing edge part to an integrating network composed of shunt-connected resistor 1162A and capacitor 1164, whose ends are respectively connected to the anode of diode 1160A and the base of transistor 1166A, which is connected as a grounded emitter amplifier. Proper operating potential for transistor 1166A is established by means of a resistor 1165A which intercouples the transistor base and the +20 volt bus. The collector load resistor 1168A of transistor connects to the —26 volt bus. Transistor 1166A is normally biased to collector current cut-off, but is turned on by the incoming base signal.

The inverted (positive) integrated signal developed at the collector of transistor 1166A is passed through capacitor 1170A to the base of transistor 1176A, which functions as the monostable multivibrator proper. Capacitor 1170A in cooperation with series-connected resistors 1172A and 1174A constitute a charging network, which determine the duration of the output pulse at output terminal 1142. Capacitor 1170A is selected to provide the desired pulse duration which is expressed for a given delay flop in milliseconds (ms.) in the symbolic form shown in FIGURE 33A.

Resistors 1172A and 1174A intercouple the base of transistor 1176A and the −26 volt supply. The base of transistor 1176A is grounded, while its collector is coupled through load resistor 1178A to the −26 volt bus and is conductor coupled to the output terminal 1142. The negative excursion of the collector potential is limited to −6 volts by means of a clamping diode 1180A whose anode is tied to the collector and whose cathode is tied to the −6 volt supply.

Resistors 1172A and 1174A normally bias transistor 1176A to saturation, so that its collector is at most positive potential. The positive signal applied to its base via capacitor 1170A initially reduces the collector current, so that the collector potential begins to drop, and such drop is regeneratively enhanced by means of a feedback diode 1182A whose anode is coupled to the collector and whose cathode is tied to the cathode of diode 1160A. The diodes 1160A and 1182A are connected as a buffer. By virtue of the regenerative feedback provided by diode 1182A through the integrating network (resistor 1162A and capacitor 1164), transistor 1166A, and capacitor 1170A, transistor 1176A is practically instantly driven to collector current cut-off. Its collector voltage drops and remains at the level of −6 volts until the circuit recovers. Such recovery is due to the charging of capacitor 1170A through resistors 1172A and 1174A. As capacitor 1170A charges, collector current begins to flow once more in transistor 1176A, and it rapidly returns to saturated condition. The regenerative feedback action ends. The collector voltage goes positive again, and to minimize overshoot, a non-linear negative feedback diode 1184A is provided. The anode of diode 1184A is tied to the collector of transistor 1176A, and its cathode to the junction of resistors 1172A and 1174A. The negative feedback path is from the collector via diode 1184A and resistor 1172A to the base of transistor 1176A. The circuit recovery is not complete until capacitor 1170A is charged to normal voltage and such charging depends on the resumption of normal collector potential of transistor 1166A, which in turn depends on the time constant of the integrating network composed of resistor 1162A and capacitor 1164.

GATED DELAY FLOP (FIGURE 34)

The symbol for the representative gated delay flop 1190 is shown in FIGURE 34A. The gated delay flop is similar to the basic delay flop described in the preceding section, and corresponding parts are designated by like reference numerals followed by the suffix letter C. In particular, the gated delay flop 1190 is provided with an input terminal 1141C and output terminal 1142C, and with an additional gating input terminal 1192.

The schematic details of the gated delay flop are shown in FIGURE 34B. It comprises a delay flop 1140C intermediate input and output terminals 1141C and 1142C. The delay flop is of the kind described in the preceding section, except that the conductor connection (FIGURE 33A) between output terminal 1142 and the anode 1182A is broken, and is replaced in the gated delay flop (FIGURE 34B) by a diode 1193, whose cathode is tied to the cathode of diode 1182A. Gating input terminal 1192 connects via the anode and then the cathode of diode 1196 to the cathodes of diodes 1182A and 1193, and operating potential is established by means of resistor 1194 which connects the cathodes of the three diodes 1182A, 1193, 1196 to the −26 volt supply.

The gated delay flop operates normally in the same manner as the basic delay flop. It would appear that diode 1193 is poled in opposition to the transmission of the negative pulse regeneratively fed back via diode 1182A; however, it should be remembered that the output terminal 1142C is clamped to −6 volts, whereas the cathode of diode 1193 is biased to −26 volts, so that normally the feedback signal is transmitted. However, upon application of a positive inhibiting signal to gating input terminal 1192 diode 1193 is blocked, regeneration is interrupted, and the gated delay flop is prematurely reset. Stated conversely, normal delay flop action is possible, so long as the normal negative gating signal is applied to input terminal 1192, and is otherwise inhibited or interrupted prematurely.

RETRIGGERABLE DELAY FLOP (FIGURE 35)

The symbol for the representative retriggerable delay flop 1200 is shown in FIGURE 35A and comprises input terminal 1202, and output terminals 1204 and 1206. The retriggerable delay flop 1200 functions generally as follows. In response to receipt of a negative input pulse at terminal 1202, a positive output pulse will be delivered at output terminal 1206. This output pulse will have a predetermined duration; however, if an additional negative input pulse is applied at terminal 1202 before termination of the output pulse, such positive output pulse will be sustained beyond its normal predetermined duration, and will continue to be sustained upon receipt of additional negative input pulses at terminal 1202. Upon cessation of such negative input pulses, the positive output pulse at terminal 1206 will terminate, and such termination will induce generation of a negative output pulse of predetermined duration at terminal 1204.

The schematic details of the retriggerable delay flop 1200 are shown in FIGURE 35B, and are shown in two blocks 1207 and 1145B, for convenience. The negative input pulse applied at terminal 1202 is coupled via resistor 1208 to the base of a grounded emitter connected transistor 1214, which functions as an inverting stage. Base operating potential is established by means of a resistor 1210 which intercouples the base of transistor 1214 and the +20 volt supply. The collector load resistor 1216 connects to the −26 volt supply. The negative excursion at the collector is limited to a level of −6 volts by means of a clamping diode 1218, whose cathode connects to the collector of transistor 1214 and whose anode is tied to the −6 volt supply.

The resultant positive signal at the collector of transistor 1214 is transmitted through the anode and then the cathode of a diode 1220 and resistor 1226 to the base of a transistor 1228, modified however by the action of a charging network which includes capacitor 1222 and resistor 1226. The upper ends of the latter two elements are connected to the anode of diode 1220; the other ends of capacitor 1222 and resistor 1224 are respectively connected to ground and to the −26 volt supply. The values of resistor 1222 and of capacitor 1224 are selected in accordance with the expected frequency of input pulses in accordance with the following considerations.

Transistor 1228 is quiescently maintained in conduction by means of a voltage divider which comprises resistors 1230 and 1232. The latter two resistors connect in order from the −26 volt bus to ground, and their junction is tied to the emitter of transistor 1228. The collector load resistor 1234 of transistor 1228 connects to the −26 volt supply.

Upon receipt of the initial negative pulse at input terminal 1202 capacitor 1222 will charge, and will cut off transistor 1228 as long as the capacitor charge remains positive with respect to the emitter of transistor 1228. If input pulses appear at terminal 1202 with a period smaller than the recovery time of capacitor 1222, the capacitor charge is replenished, and transistor 1228 remains cut off. As will now be seen, the duration of the output pulse at terminal 1206 corresponds to the duration of cut off of transistor 1228.

Cut off of transistor 1228 produces a negative pulse at its collector. The negative swing is limited to −6 volts by means of a clamping diode 1236, whose cathode is tied to the collector and whose anode is tied to the −6 volt supply.

The negative pulse signal from the collector of transistor 1234 is transmitted to the base of a grounded emitter stage connected transistor 1237 via series resistors 1238 and 1240 shunted by speed-up capacitor 1242. Transistor 1237 had been quiescently cut off by provision of resistor 1244 which couples the transistor base to the +20 volt supply. Load resistor 1246 connects the collector of transistor 1237 to the −26 volt supply.

Transistor 1237 is turned on for so long as the negative signal is received from the collector of transistor 1228, and its collector swings positive, giving rise to the positive output signal at terminal 1206 which is tied to the collector of transistor 1237. To prevent deep saturation, a non-linear negative feedback is provided from the collector via the anode and then the cathode of a diode 1250 to the junction of resistors 1238 and 1240, and then via the latter resistor to the base of transistor 1237. The collector positive signal terminates upon termination of the negative signal from the collector of transistor 1228. To limit the negative-going return swing of the output voltage at terminal 1206 to −6 volts, the collector of transistor 1237 connects through the cathode and then the anode of a clamping diode 1248 to the −6 volt supply.

The signal at the collector of transistor 1237 is transmitted via a differentiating capacitor 1252 to the cathode of a diode 1160B (in block 1145B), which cathode is returned to ground via a cooperating differentiating resistor 1254. Thus diode 1160B passes only the negative-going trailing edge of the output signal from the collector of transistor 1237. This completes the description of the block 1207.

The circuitry of the block 1145B is structurally very similar to the circuitry of the block 1145A described in connection with the basic delay flop of FIGURE 33, with the following minor differences. Unlike resistor 1162A, the resistor 1162B in block 1145B is not shunted by a capacitor. Thus the integrating feature of the basic delay flop is lacking, and output signal is realized at terminal 1204 as soon as the output at terminal 1206 ends. For the same reason the circuit of block 1145B recovers somewhat more quickly than the circuit of block 1145A. Secondly, there is connected from the collector of transistor 1166B a resistor 1260 to ground, which has no counterpart in the block 1145A. Resistor 1260 is provided for proper biasing, and does not affect the monostable operation of block 1145B, which is essentially the same as that of block 1145A except for quicker recovery as stated.

BLOCKING OSCILLATOR (FIGURE 36)

The symbol for a representative blocking oscillator 1270, having input terminal 1271 and output terminal 1272, is shown in FIGURE 36A. The corresponding details are shown in symbolic form in FIGURE 36B, from which it may be seen that the blocking oscillator 1270 is structurally and functionally similar to the basic delay flop of FIGURE 33. The blocking oscillator 1270 is composed of blocks 1144 and 1145C. Block 1144 is structurally the same as the like-numbered block in FIGURE 33. Block 1145C is also structurally the same as block 1145A, except that a resistor corresponding to resistor 1260 in block 1145B of FIGURE 35 is included. Functionally the blocking oscillator is the same as the basic delay flop of FIGURE 33; however, its circuit constants are selected to produce output pulse of substantially shorter duration than that of the basic delay flop.

Decoder (FIGURE 37)

The symbol for a representative decoder 1299 is shown in FIGURE 37A. In the description of the decoder 1299, and also of the parity checker in the next section, it will be convenient to identify terminals and the signals that are applied to or delivered at such terminals by one and the same reference characters. For example, decoder 1299 accepts pairs of complementary input signals A and −A, B and −B, and C and −C. It delivers output signals 0 to 7. The input signals A and −A are deemed to be applied to input signal terminals A and −A respectively.

The decoder is commonly used in conjunction with a binary counter of the kind described in a previous section, or with some similar static register, and its purpose is to provide an output signal at that one of the particular output terminals which corresponds numerically to the count stored in the static register. Thus, the decoder 1299 is deemed to derive its signals by way of example from a three-stage binary counter of counting capacity 0 to 7. The complementary signal pairs, A, B, C are deemed to be derived from the three stages respectively, as described in connection with the binary counter. The following description of the details of decoder 1299 (FIGURE 37B) will further elucidate this concept.

Decoder 1299 includes eight gates 1300 to 1307, whose outputs are connected to the input terminals of eight amplifiers 1310 to 1317 respectively. The latter amplifiers deliver at their negative output terminals the count pulses 0 to 7 respectively.

Each of the gates 1300 to 1307 has three inputs to which are applied one or the other signal in each of the pairs A, B and C. All like labeled input terminals are deemed to be interconnected, although the interconnections are omitted in the interest of clarity. For example, input terminals −A are shown for gates 1300, 1302, 1304 and 1306, and are deemed to be interconnected. It should be recalled that the +A signal is derived from the first stage of the binary counter and therefore represents the least significant bit (binary digit) of the stored count; similarly the +B signal represents the second least significant bit, and the +C signal the third least significant bit. Also the minus sign corresponds to the bit 0 and the absence of the minus sign represents the bit 1 (recall the designations of the output terminals of a counter stage as "0" and "1"). The functioning of the decoder may now be determined by inspection, since in each of gates 1300 to 1307 the stored number passed by a given gate is indicated in binary representation, least significant bit vertically below the A input terminal, second least significant bit vertically below the B input terminal, and third least significant bit vertically below the C input terminal. Additionally there is inscribed in each gate the passed number in decimal representation. Consider gate 1303 which passes the count 3. The binary representation for 3 is 011. For this number to be passed, the +A and +B signals must be present and the +C signal absent, which means that the −C signal must be present, as shown. The remaining gates follow the same pattern.

It will be recalled that a gate, when transmissive, passes a negative output signal. The fact that the output signal from amplifiers 1310 to 1317 is taken from the negative output terminals, implies that when a given gate is open, its associated amplifier will produce a positive output count signal. This is desirable, as decoder 1299 commonly feeds positive logic circuits. If negative logic circuits are to be driven, the in-phase outputs of amplifiers 1310 to 1317 may be utilized.

Parity checker (FIGURE 38)

Figure 38B:
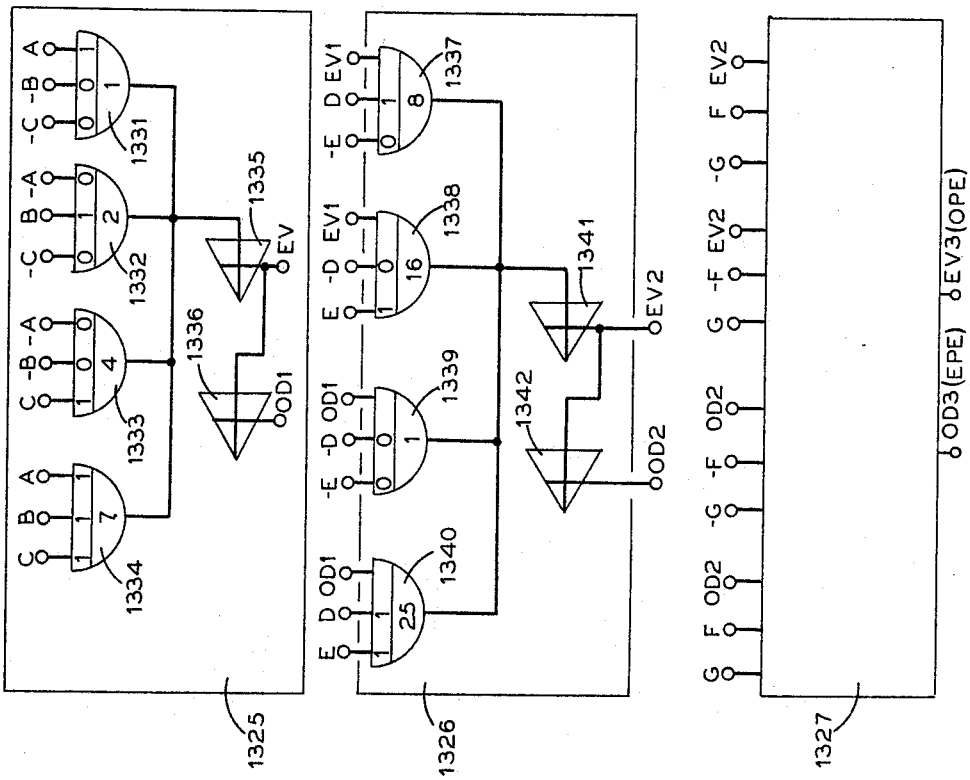
FIGURES 38A and 38B show the symbol and the logical elements of a parity checker employed by the system.
Figure 38A:
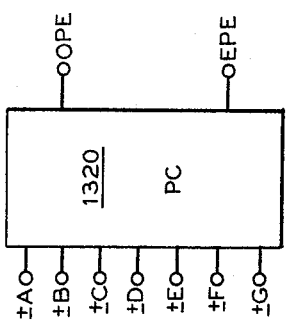

The symbol for a representative parity checker 1320 is shown in FIGURE 38A. Parity checker accepts pairs of complementary input signals +A to +G, these lettered input signals having the same significance as in the preceding section. They are derived from a seven-stage static register. For simplicity, only one input terminal is shown per given complementary signal pair.

The parity checker 1320 is commonly used to indicate whether the number of bits 1 of a character sorted in the seven stage static register is odd or even. The disclosed system may be operated in a manner such that the number of bits 1 should be always odd. Therefore, if parity checker 1320 reflects an even number of bits 1, an error has occurred. Instead of odd parity, the disclosed system may be operated on even parity, in which case an indication by parity checker 1320 of an odd number of bits 1 is an error indication. The output signals OD3 and EV3 reflect odd and even number of bits 1 respectively. The significance of the suffix numeral 3 in these output signals will be apparent from the description of the details of the parity checker 1320 (FIGURE 38B) which now follow.

In FIGURE 38B, the parity checker 1320 is conveniently divided into three blocks 1325, 1326 and 1327. Block 1325 comprises mixer gates 1331 to 1334, whose outputs are tied together and connected to the input of amplifier 1335. Output signal EV1 is derived from the negative output terminal of amplifier 1335, and when negative in potential, implies that the number of bits in the three least significant orders of the number stored in the binary counter is even. Signal EV1 is applied as input signal to a second amplifier 1336, from whose negative output terminal the output signal OD1 is derived. Signal OD1, when negative, signifies that the number of bits 1 in the three lowest binary denominations of the number stored in the binary counter is odd. In this connection, it should be noted that signal EV1 is the logical "negation" of the input to amplifier 1335, and signal OD1 is the logical "negation" of signal EV1 and therefore the logical "double negation" or "affirmation" of the input signal to amplifier 1335.

Mixer gates 1331 to 1334 receive as input signals the A, B and C signals with polarity as indicated. The conventions of implicit interconnection of like-lettered input terminals applies as in the preceding section. Also like-lettered terminals in blocks 1325 and 1326, and in blocks 1326 and 1327 are deemed to be interconnected. Also, the convention of representation of the numbers corresponding to the three input signals of a given gate, expressed both in binary and decimal fashion, is applicable to mixer gates 1331 to 1334. The operation of block 1325 may now be inferred practically by inspection recalling that each mixer gate acts as an "and" gate in respect to the input signal it receives, and acts in "or" gate fashion in conjunction with the other mixer gates. The mixer gates 1331 to 1334 will pass counts 1, 2, 4 and 7, these being all the three-bit numbers having odd number of bits 1 (see the binary expressions inscribed in the mixer gates). When negative input signal is applied to amplifier 1335, output signal OD1 will be negative, signifying odd parity. When the input signal to amplifier 1335 is positive, implying that mixer gates 1331 to 1334 are closed, output signal EV1 will be negative, implying even parity.

Block 1326 comprises mixer gates 1337 to 1340, whose common output signal serves as input signal to amplifier 1341. Output signal EV2 from amplifier 1341 is taken from the negative output terminal of the latter, and serves as input signal for amplifier 1342. Output signal OD2 is taken from the negative output terminal of amplifier 1342. Signals EV2 and OD2 have even and odd parity significance, but now with respect to the five least significant bits of the stored number. This arises from the fact that each of the mixer gates 1337 to 1340 receives the D and E signals with polarity as indicated, and additionally receives the EV1 or OD1 signal.

In block 1326 the convention of binary representation is adhered to in respect to the D and E signals; blanks are left in locations corresponding to the OD1 and EV1 terminals. The decimal numbers inscribed in mixer gates 1337 to 1340 are the lowest decimal numbers passed. The logical scheme applicable to block 1326 is readily evolved from the following considerations. If the stored number has an even number of bits in the three lowest binary denominations (signal EV1 present) there will be odd parity if either the +D signal is present (mixer gate 1337) or the +E signal is present (mixer gate 1338), but not both. If on the other hand there is odd parity in the three lowest binary denominations, odd parity will be present if neither the +D nor the +E signal is present (mixer gate 1339), or both the signals are present (mixer gate 1340). When odd parity exists for the lowest five binary denominations, the input signal to amplifier 1341 will be negative and hence output signal OD2 will be negative. Failing this condition, the EV2 signal is negative and even parity exists.

Block 1327 is structurally identical to block 1326, and is therefore not illustrated in detail. In lieu of the D, E, EV1, OD1, input signals received by block 1326, the block 1327 receives at corresponding locations input signals F, G, EV2, OD2. Its output signals OD3 and EV3 correspond to output signals OD2 and EV2 of block 1326. Signals OD3 and EV3, when present, reflect respectively odd and even parity for the full seven binary denominational orders.

CONCLUSION

Although only one embodiment of the various aspects of the invention has been shown and described in detail, there will now be obvious to those skilled in the art many modifications and variations which satisfy many or all of the objects, and to which accrue the advantages of the invention, but which do not depart from the spirit of the invention as defined by the appended claims.

What is claimed is:

1. A system for serially transmitting units of information that are grouped into words wherein each word includes at least one end of word marker comprising means for transmitting each unit of information, means for generating a count signal for each unit of information which is transmitted, means for accumulating said count signals, means for generating a gating signal after a predetermined number of count signals have been accumulated, means for sensing for the end of word signals, and means for generating a block signal at the occurrence of the first end of word signal during the presence of the gating signal.

2. In a system for serially transmitting units of information that are grouped into words wherein each word includes at least one end of word marker at the end thereof, apparatus, in a transmitter, for grouping said words into a plurality of blocks comprising first means for generating a time interval of given duration upon receipt of a start of time interval signal, second means for transmitting an initial start of time interval signal to said first means at the start of transmission of information, third means for sensing for only said end of word markers, fourth means responsive to said first and third means for generating an end of block signal indicating a block of units of information, said fourth means generating said end of block signal at the occurrence of an end of word marker after the end of said time interval, and fifth means responsive to said end of block signal for transmitting a subsequent start of time interval signal to said first means.

3. The apparatus of claim 2 wherein said first means for generating a time interval includes means for counting a predetermined number of units of information to establish said time interval.

4. In a system for serially transmitting units of information that are grouped into words wherein each record includes at least one end of word marker at the end thereof, apparatus for grouping said words into a plurality of blocks comprising first means for generating an end of time interval signal at a given period of time after receipt of a start of time interval signal, second means for transmitting an initial start of time interval signal to said first means at the start of transmission of information, third means responsive to said first means for storing said end of time interval signal, fourth means for sensing for only the end of word markers and generating an end of word signal when an end of word marker is sensed, fifth means responsive to said third and fourth means for generating an end of block signal indicating the end of a block of units of information, said fifth means generating said end of block signal when said end of word signal and said end of time interval signal are both present and sixth means responsive to said end of block signal for transmitting a subsequent start of time interval signal to said first means for starting another time interval and for ending the storage of said end of time interval signal by said third means.

5. The apparatus of claim 4 further comprising means of generating a count signal when each unit of information is transferred and wherein said first means includes means for accumulating said count signals to generate said end of time interval signal when a predetermined number of count signals have been accumulated, and wherein said sixth means includes means for clearing said accumulating means.

6. Apparatus for establishing the positional significance of received units of information consisting of coded combinations of $n$ bits in series represented by signals of first and second kinds wherein, at least, the first unit of information consists of $(n-1)$ bits represented by signals of said first kind, and the bit at one end represented by a signal of said second kind, and the other units of information consisting of a bit at said same one end represented by a signal of said second kind and the remaining bits being represented by coded combinations of signals of said first and second kind, said apparatus comprising an $n$-stable state means changing stable states as each bit is received for generating a bit position indicating signal when in the $m$th stable state, presetting means for presetting said $n$-stable state means to the $p$-stable state, and means responsive to said $n$-stable state means and the received bits to activate said presetting means when said bit position indicating signal is absent and the bit being received is represented by a signal of said second kind is present to force the $n$-stable state means into synchronization with the positional significance of the received units of information.

7. Apparatus for establishing the positional significance of received units of information consisting of coded combinations of $n$ bits in series represented by signals of first and second kinds wherein, at least, the first unit of information consists of $(n-1)$ bits represented by signals of said first kind and the bit at one end being represented by a signal of said second kind and the other units of information consisting of a bit at said same one end represented by a signal of said second kind and the remaining bits being represented by coded combinations of signals of said first and second kind, comprising an $n$-stable state means for generating a bit position indicating signal when in the $m$th stable state, means for stepping said $n$-stable state means sequentially through the stable states in synchronism with the received bits, presetting means for presetting said $n$-stable state means to the $p$-stable state, first means responsive to said $n$-stable state means to activate said presetting means when said bit position indicating signal is absent and a bit represented signal of said second kind is being received to force the $n$-stable state means into synchronization with the positional significance of the received units of information, and second means responsive to said $n$-stable state means to inhibit said presetting means after having preset said $n$-stable state means.

8. Apparatus for establishing the positional significance of received units of information consisting of coded combinations of $n$ bits in series represented by signals of first and second kinds wherein, at least, the first unit of information consists of the first $(n-1)$ bits of the series being represented by signals of said first kind and the last bit of the series being represented by a signal of said second kind and the other units of information consisting of the last bit of the series being represented by a signal of said second kind and the remaining bits being represented by coded combinations of signs of said first and second kind, comprising an $n$-stable state means for generating a bit position indicating signal when in the $n$th stable state, presetting means for presetting said $n$-stable state means to the first stable state, and activating means responsive to said $n$-stable state means and the received bits to activate said presetting means when said bit position indicating signal is absent and the bit being received is represented by a signal of said second kind is present to force the $n$-stable state means into synchronization with the positional significance of the received units of information.

9. The apparatus of claim 8 including further means responsive to said $n$-stable state means to inhibit said activating means after having preset said $n$-stable state means.

10. In a system for transferring units of data and reference information from a first to a second station, wherein each unit of data information consists of a coded combination of $n-1$ bits represented by signals of first and second kinds occurring serially at a given bit rate, apparatus for establishing the same bit positional significance between the units of information received at said second station with the units of information transmitted from said first station comprising: at said first station, means for initially transmitting units of reference information consisting of $n-1$ bits represented by said first kind of signal and one bit represented by said second kind of signal at a first end of said $n-1$ bits, means for introducing a bit represented by said second kind of signal at said first end of each of subsequently transferred units of data information, and at said second station, means responsive to the received bits for generating pulses occurring at said bit rate, an $n$-stable state means responsive to said pulses for generating an $m$th position signal during the $m$th stable state, presetting means for presetting said $n$-stable state means to the $(m+1)$ stable state, and activating means responsive to the received units of information and the $m$th position signal to activate said presetting means when $m$th position signal is absent and a bit represented by signal of the second kind is present to force the $n$-stable state means into synchronization with the positional significance of the received units of information.

11. In a system for transferring units of data and reference information from a first to a second station, wherein each unit of data information consists of a coded combination of $n-1$ bits represented by signals of first and second kinds occurring serially at a given bit rate, apparatus for establishing the same bit positional significance between the units of information received at said second station with the units of information transmitted from said first station comprising: at said first station means for initially transmitting units of reference information consisting of $n-1$ bits represented by said first kind of signal and one bit represented by said second kind of signal at a first end of said $n-1$ bits, means for introducing a bit represented by said second kind of signal at said first end of each of the transferred units of data information, and means for inserting units of reference information between units of data information; and, at said second station $n$-stable state means which changes stable states at said bit rate for generating $n$ different position signals each representative of one of the bit positions of a unit of information, the $m$th position signal being associated with the bit position at said one end of the units of information, presetting means for presetting said $n$-stable state means to the stable state wherein the $(m+1)$ position signal is generated, activating means responsive to the received units of information and the $m$th position signal to activate said presetting means when $m$th position signal is absent and a bit represented by a signal of the second kind is received, a bistable means having first and second stable states, second means responsive to said $m$th signal and said units of information for causing said bistable means to assume the first stable state when said $m$th signal is simultaneously present with a bit represented by said second kind of signal, third means for causing said bistable means to assume the second stable state when the $m$th signal is simultaneously present with a bit represented by said first kind of signal, means for activating said presetting means when said bistable means switches from said second stable state to said first stable state, and means responsive to said bistable means for inhibiting said activating means while said bistable means is in the first stable state.

12. In a system for transferring units of data and reference information from a first to a second station, wherein each unit of data information consists of a coded combination of $(2^n-1)$ bits represented by signals of first and second kinds occurring serially at a given bit rate, apparatus for establishing the same bit positional significance between the units of information received at said second station with the units of information transmitted from said first station comprising: at said first station, means for initially transmitting units of reference information consisting of $(2^n-1)$ bits represented by said first kind of signal and one bit represented by said second kind of signal after said $(2^n-1)$ bits, means for introducing a bit represented by said second kind of signal after transferred units of data information, and means for inserting units of reference information between units of data information; and, at said second station, means for generating pulses occurrnig at said bit rate, an $n$ stage binary counter having $2^n$ stable states for counting said pulses, means responsive to said $n$-stage binary counter for generating $2^n$ different position signals each representative of one of the bit positions of a unit of information, the $n$th position signal being associated with the last bit position of the units of information, presetting means for presetting said $n$-stage binary counter to the first stable state, activating means responsive to the received units of information and the $n$th position signal to activate said presetting means when $n$th position signal is absent and a signal of the second kind is present, a bistable means having first and second stable states, means responsive to said $n$th position signal and said units of information for causing said bistable means to assume the first stable state when said $n$th position signal is simultaneously present with a bit represented by said second kind of signal, means for causing said bistable means to assume the second stable state when the $n$th position signal is simultaneously present with a bit represented by said first kind of signal, means for activating said presetting means when said bistable means switches from said second stable state to said first stable state, and means responsive to said bistable means for inhibiting said activating means while said bistable means is in the first stable state.

13. Apparatus for generating pulses for sampling bits of information represented by a signal shifting between two levels and having a transmission rate of $n$ bits per second, said apparatus comprising: first means including an input terminal for receiving the signal and an output terminal for transmitting a pulse for each level transition; second means for generating a signal alternating between different characteristics and having a natural frequency of substantially $2n$ cycles per second, said second means including a frequency control input terminal for causing the frequency to change in accordance with the magnitude of a characteristic of a received control signal, and an output terminal for transmititng the alternating signal; third means responsive to said second means and including an input terminal for receiving a signal alternating between different characteristics, a first output terminal for transmitting a signal when the characteristics of the received signal alternates in one direction, and a second output terminal for transmitting a signal when the characteristics of the received signal alternates in the other direction; first and second bistable means each having first and second stable states and including a first input terminal for receiving signals to cause the second stable state whenever a signal level transition in a first direction occurs, a reset input terminal to receive signals for causing the first stable state whenever a signal level transition of the first direction occurs, and an output terminal for transmitting a signal of a first level during the first stable state and a second level during the second stable state; means for coupling the output terminal of said first means to the input terminal of said first bistable means; means for coupling the output terminal of said first bistable means to the input terminal of said second bistable means; means for coupling the first output terminal of said third means to the reset input terminal of said first bistable means; means for coupling the second output terminal of said third means to the reset input terminal of said second bistable means; signal comparing means for comparing the time duration of two different signals and generating a control signal having a characteristic whose magnitude is proportional to the difference in time duration, including first and second input terminal for receiving signals to be compared and an output terminal for transmitting the control signal; means for coupling the output terminal of said first bistable means to the first input terminal of said signal comparing means; means for coupling the output terminal of said second bistable means to the second input terminal of said signal comparing means; and means for coupling the output terminal of said signal comparing means to the frequency control input terminal of said second means; the pulses from the second output terminal of said third means being the sampling pulses.

14. The apparatus of claim 13 wherein said second means generates a symmetrical square wave.

15. Apparatus for generating pulses for sampling bits of information represented by a signal shifting between two levels and having a transmission rate of $n$ bits per second, said apparatus comprising: first means including an input terminal for receiving the signal and an output terminal for transmitting a pulse for each transition between levels; second means including an input terminal for receiving pulses and an output terminal for transmitting a control signal after the receipt of a pulse; means for connecting the output terminal of said first means to the input terminal of said second means; a gated free-running means for generating a symmetrical square wave signal alternating betwen different levels and having a natural frequency of substantially $2n$ cycles per second, said gated free-running means including a first input terminal for causing said gated free-running means to free run when a control signal is received, a frequency control input terminal for causing the free-running frequency to change in accordance with the magnitude of a received direct current signal, and an output terminal for transmitting the square wave signal; means for connecting the output terminal of said second means to the first input terminal of said gated free-running means; third means including an input terminal for receiving a signal shifting between two levels, a first output terminal for transmitting a pulse when the received signal shifts in one direction, and a second output terminal for transmitting a pulse when the received signal shifts in the other direction; first and second bistable means each having first and second stable states and including a first input terminal for receiving signals to cause the second stable state whenever a signal level transition in a first direction occurs, a reset input terminal to receive pulses for causing the first stable state, and an output terminal for transmitting a signal of a first level during the first stable state and a second level during the second stable state; means for coupling the output terminal of said first means to the input terminal of said first bistable means; means for coupling the output terminal of said first bistable means to the set input terminal of said second bistable means; means for coupling the first output terminal of said third means to the reset input terminal of said first bistable means; means for coupling the second output terminal of said third means to the reset input terminal of said second bistable means; signal comparing means for comparing the time duration of two different signals and generating a direct current signal which is proportional to the difference in time duration, including first and second input terminal for receiving signals to be compared and an output terminal for transmitting the direct current signal; means for coupling the output terminal of said first bistable means to the first input terminal of said signal comparing means; means for coupling the output terminal of said second bistable means to the second input terminal of said signal comparing means; means for coupling the output terminal of said signal comparing means to the frequency control input terminal of said gated free-running means; the pulses from the second output terminal of said third means being the sampling pulses.

16. The apparatus of claim 15 wherein said gated free-running means is a gated free-running multivibrator.

17. Apparatus for generating pulses for sampling information represented by a signal wherein a first level of signal represents a binary zero and a second level represents a binary one and including data edges when said signal shifts between said levels, said signal having a bit transmission rate of $n$ bits per second, said apparatus comprising: first means including an input terminal for receiving said signals and an output terminal for transmitting a pulse for each data edge; a first flip-flop having first and second stable states and including at least a set input terminal for receiving pulses for causing said first flip-flop to switch from said first stable state to said second stable state when the first pulse is received, a first output terminal for transmitting a signal having said second level during said second stable state, and a second output terminal for transmitting a signal having said first level during said second stable state; means for connecting said set input terminal to the output terminal of said first means; a gated free-running multivibrator for generating a symmetrical square wave signal alternating between said first and second levels and having a natural frequency of substantially $2n$ cycles per second, said multivibrator including a first input terminal for causing said multivibrator to free run when a signal of said second level is received by said input terminal, a frequency control input terminal for causing the frequency of said multivibrator to change in accordance with the magnitude of a received direct current signal, and an output terminal for transmitting said square wave signal; means for coupling the second output terminal of said first flip-flop to the first input terminal of said multivibrator; a binary counter having first and second stable states and including an input terminal for receiving a signal and first and second output terminals for transmitting signals wherein said binary counter changes stable states whenever the received signal shifts between levels in a second direction, the first output terminal transmitting a signal having said first level and the second output terminal transmitting a signal having said second level during the first stable state, and the first output terminal transmitting a signal having said second level and the second output terminal transmitting a signal having said first level during the second stable state; first and second pulse generators each including an input terminal for receiving signals and an output terminal for transmitting a pulse each time the received signal shifts between levels in a given direction; means for connecting the first output terminal of said binary counter to the input terminal of said first pulse generator; means for connecting the second output terminal of said binary counter to the input terminal of said second pulse generator; second and third flip-flops each having first and second stable states and including a set input terminal for receiving signals to cause the second stable state whenever the received signal shifts between levels in a given direction; a reset input terminal for receiving pulses to cause the first stable state whenever a pulse is received, and an output terminal for transmitting a signal at one level during the first stable state and at another level during the second stable state; means for coupling the output terminal of said first means to the set input terminal of said second flip-flop; means for connecting the output terminal of said second flip-flop to the set input terminal of said third flip-flop; means for connecting the output terminal of said first pulse generator to the reset input terminal of said second flip-flop; means for connecting the output terminal of said second pulse generator to the reset input terminal of said third flip-flop; signal comparing means for comparing the time duration of first and second signals and for generating a direct current signal which is proportional to the difference in time duration of said first and second signals, said signal comparing means including first and second input terminals for receiving the first and second signals and an output terminal for transmitting the said direct current signal; means for coupling the output terminal of said second flip-flop to the first input terminal of said signal comparing means; means for coupling the output terminal of said third flip-flop to the second input terminal of said signal comparing means; and means for connecting the output terminal of said signal comparing means to the frequency control input terminal of said multivibrator; the pulses transmitted by the output terminal of said second pulse generator being the sampling pulses.

18. Apparatus for generating pulses for sampling information represented by a non-return-to-zero signal wherein a first level of signal represents a binary zero and a second level represents a binary one, having a bit transmission rate of $n$ bits per second, said apparatus comprising: first means including an input terminal for receiving said signals and first and second output terminals for transmitting said signal in inverted and uninverted form respectively; first and second pulse generators each including an input terminal for receiving a signal and an output terminal for transmitting a pulse each time the signal received at the input terminal shifts between levels in a first direction; means for connecting the input terminal of said first pulse generator to the first output terminal of said first means; means for connecting the input terminal of said second pulse generator to the second output terminal of said first means; a first flip-flop having first and second stable states and including at least a set input terminal for receiving pulses for causing said first flip-flop to switch from said first stable state to said second stable state when the first pulse is received, a first output terminal for transmitting a signal having said second level during said second stable state, and a second output terminal for transmitting a signal having said first level during said second stable state; means for connecting the set input terminal of said first flip-flop to the output terminal of said first pulse generator; a gated free-running multivibrator for generating a symmetrical square wave signal alternating between said first and second levels and having a natural frequency of substantially $2n$ cycles per second, said multivibrator including a first input terminal for causing said multivibrator to free run when a signal of said second level is received by said input terminal, a frequency control input terminal for causing the frequency of said multivibrator to change in accordance with the amplitude of a received direct-current signal, and an output terminal for transmitting said square wave signal; means for coupling the second output terminal of said first flip-flop to the first input terminal of said multivibrator; a binary counter having first and second stable states and including an input terminal for receiving a signal and first and second output terminals for transmitting signals wherein said binary counter changes stable states whenever the received signal shifts between levels in a second direction, the first output terminal transmitting a signal having said first level and the second output terminal transmitting a signal having said second level during the first stable state, and the first output terminal transmitting a signal having said second level and the second output terminal transmitting a signal having said first level during the second stable state; third and fourth pulse generators each including an input terminal for receiving signals and an output terminal for transmitting a pulse each time the received signal shifts between levels in said first direction; means for connecting the first output terminal of said binary counter to the input terminal of said third pulse generator; means for connecting the second output terminal of said binary counter to the input terminal of said fourth pulse generator; a fifth pulse generator including an input means for receiving pulses and an output terminal for transmitting a pulse when a pulse is received at the input terminal; means for connecting the output terminals of said first and second pulse generators to the input means of said fifth pulse generator; gating means including first and second input terminals, an output terminal for transmitting a pulse only when the first input terminal is receiving a pulse and the second input terminal is receiving a signal having said second level; means for connecting the first output terminal of said first flip-flop to the first input terminal of said gating means; means for connecting the output terminal of said fifth pulse generator to the second input terminal of said gating means; second and third flip-flops each having first and second stable states and including a set input terminal for receiving signals to cause the second stable state whenever the received signal shifts between levels in said second direction, a reset input terminal for receiving pulses to cause the first stable state, and an output terminal for transmitting a signal at one level during the first stable state and at another level during the second stable state; means for coupling the output terminal of said fifth pulse generator to the set input terminal of said second flip-flop; means for connecting the output terminal of said second flip-flop to the set input terminal of said third flip-flop; means for connecting the output terminal of said third pulse generator to the reset input terminal of said second flip-flop; means for connecting the output terminal of said fourth pulse generator to the reset input terminal of said third flip-flop; signal comparing means for comparing the time duration of first and second signals and for generating a direct current signal which is proportional to the difference in time duration of said first and second signals, said signal comparing means including first and second input terminals for receiving first and second signals respectively and an output terminal for transmitting a direct current signal; means for coupling the output terminal of said second flip-flop to the first input terminal of said signal comparing means; means for coupling the output terminal of said third flip-flop to the second input terminal of said signal comparing means; and means for connecting the output terminal of said signal comparing means to the frequency control input terminal of said multivibrator; the pulses transmitted by the output terminal of said fourth pulse generator being the sampling pulses.

References Cited by the Examiner
UNITED STATES PATENTS

| | | | |
|---|---|---|---|
| 2,527,567 | 10/1950 | Munck | 178—3 |
| 2,967,296 | 1/1961 | Chien et al. | 340—172.5 |
| 2,972,127 | 2/1961 | Lukoff et al. | 340—172.5 |
| 2,975,228 | 3/1961 | Doty et al. | 178—3 |
| 2,988,596 | 6/1961 | Van Dalen | 178—23.1 |
| 2,998,483 | 8/1961 | Curtis | 178—23.1 |
| 3,017,093 | 1/1962 | Rowley | 235—92 |
| 3,025,341 | 3/1962 | Wright et al. | 178—3 |
| 3,038,145 | 6/1962 | Laurer | 340—172.5 |
| 3,054,987 | 9/1962 | Lawrence | 340—172.5 |
| 3,067,343 | 12/1962 | Roscoe | 307—88.5 |
| 3,115,289 | 12/1963 | Namenyi-Katz | 226—42 |
| 3,131,310 | 4/1964 | Verstraeten | 307—88.5 |
| 3,134,962 | 5/1964 | Froehlich | 340—172.5 |
| 3,139,607 | 6/1964 | Grondin | 340—172.5 |
| 3,141,151 | 7/1964 | Gilson | 340—172.5 |
| 3,185,963 | 5/1965 | Peterson | 340—168 |

ROBERT C. BAILEY, *Primary Examiner.*

NEIL C. READ, R. H. ROSE, *Examiners.*

R. B. ZACHE, T. A. ROBINSON, A. J. DUNN,
*Assistant Examiners.*